(12) United States Patent
Okawara

(10) Patent No.: US 6,963,366 B2
(45) Date of Patent: *Nov. 8, 2005

(54) IMAGE PICKUP APPARATUS

(75) Inventor: Hiroto Okawara, Toride (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/877,728

(22) Filed: Jun. 18, 1997

(65) Prior Publication Data
US 2002/0041334 A1 Apr. 11, 2002

(30) Foreign Application Priority Data
Jun. 19, 1996 (JP) .............................. 8-158310
Jun. 19, 1996 (JP) .............................. 8-158311
Jul. 24, 1996 (JP) .............................. 8-212205

(51) Int. Cl.$^7$ .................. H04N 5/262; H04N 5/225
(52) U.S. Cl. .................. 348/240.99; 348/240.3; 348/335
(58) Field of Search .................. 348/345, 358, 348/240.99, 207.99, 240.3, 335; 396/85, 86, 87, 88

(56) References Cited

U.S. PATENT DOCUMENTS

| 5,159,370 A | * | 10/1992 | Takahashi | 396/86 |
| 5,161,026 A | * | 11/1992 | Mabuchi et al. | 348/335 |
| 5,278,601 A | * | 1/1994 | Kawanami | 396/87 |
| 5,475,456 A | * | 12/1995 | Haraguchi et al. | 396/85 |
| 5,485,200 A | * | 1/1996 | Shimizu | 348/207 |
| 5,648,836 A | * | 7/1997 | Sato et al. | 396/86 |

* cited by examiner

Primary Examiner—Wendy R. Garber
Assistant Examiner—Luong T. Nguyen
(74) Attorney, Agent, or Firm—Fitzpatrick, Cella, Harper & Scinto

(57) ABSTRACT

A lens exchangeable image pickup apparatus capable of changing the relationship between the rotation direction of a zoom ring and the motion direction of a zoom lens and changing the response characteristics of the zoom lens relative to the rotation of the zoom ring.

41 Claims, 32 Drawing Sheets $$a_x = a_k - \frac{(z_k - z_x)(a_k - a_{k-1})}{(z_k - z_{k-1})}$$

$$b_x = b_k - \frac{(z_k - z_x)(b_k - b_{k-1})}{(z_k - z_{k-1})}$$

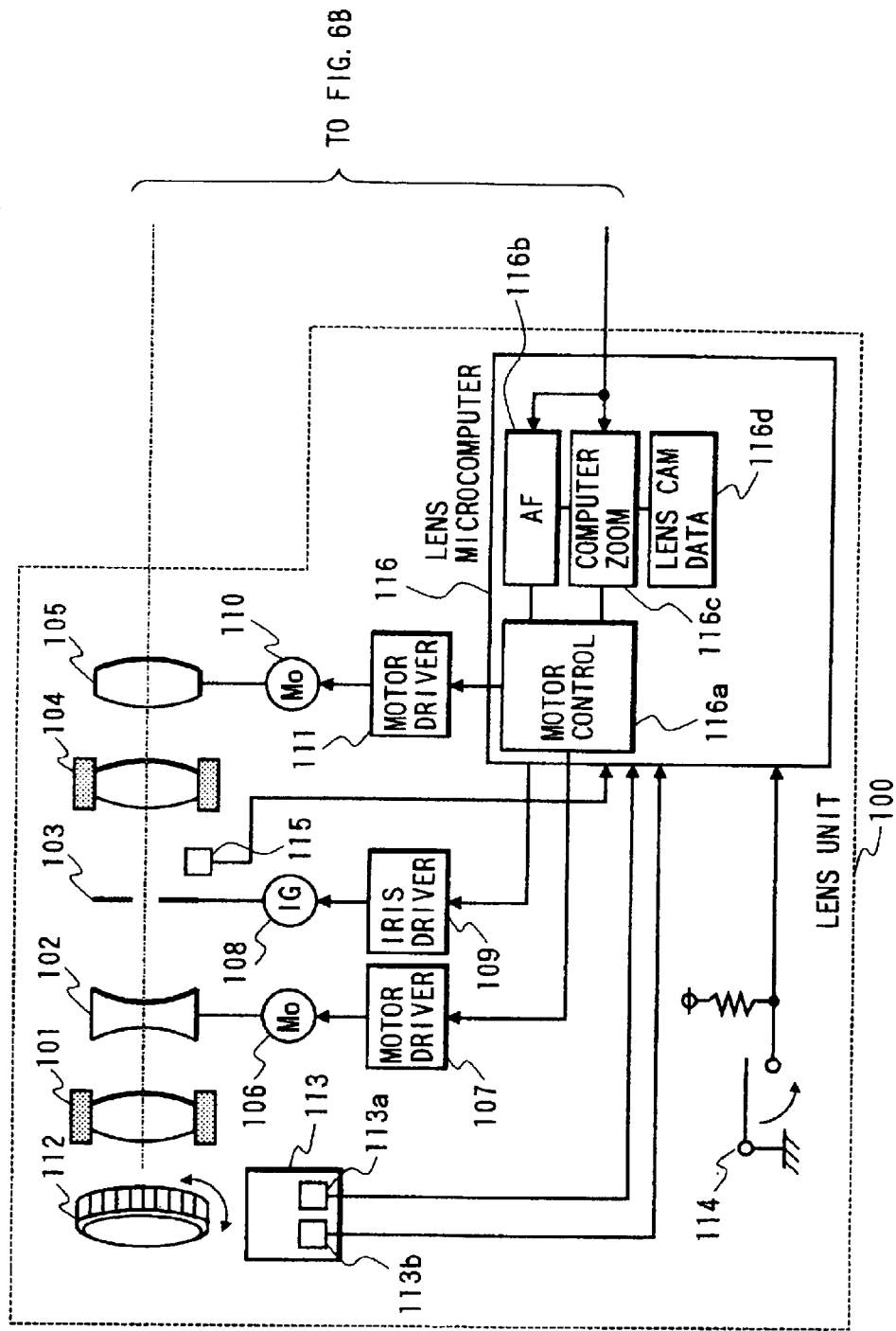

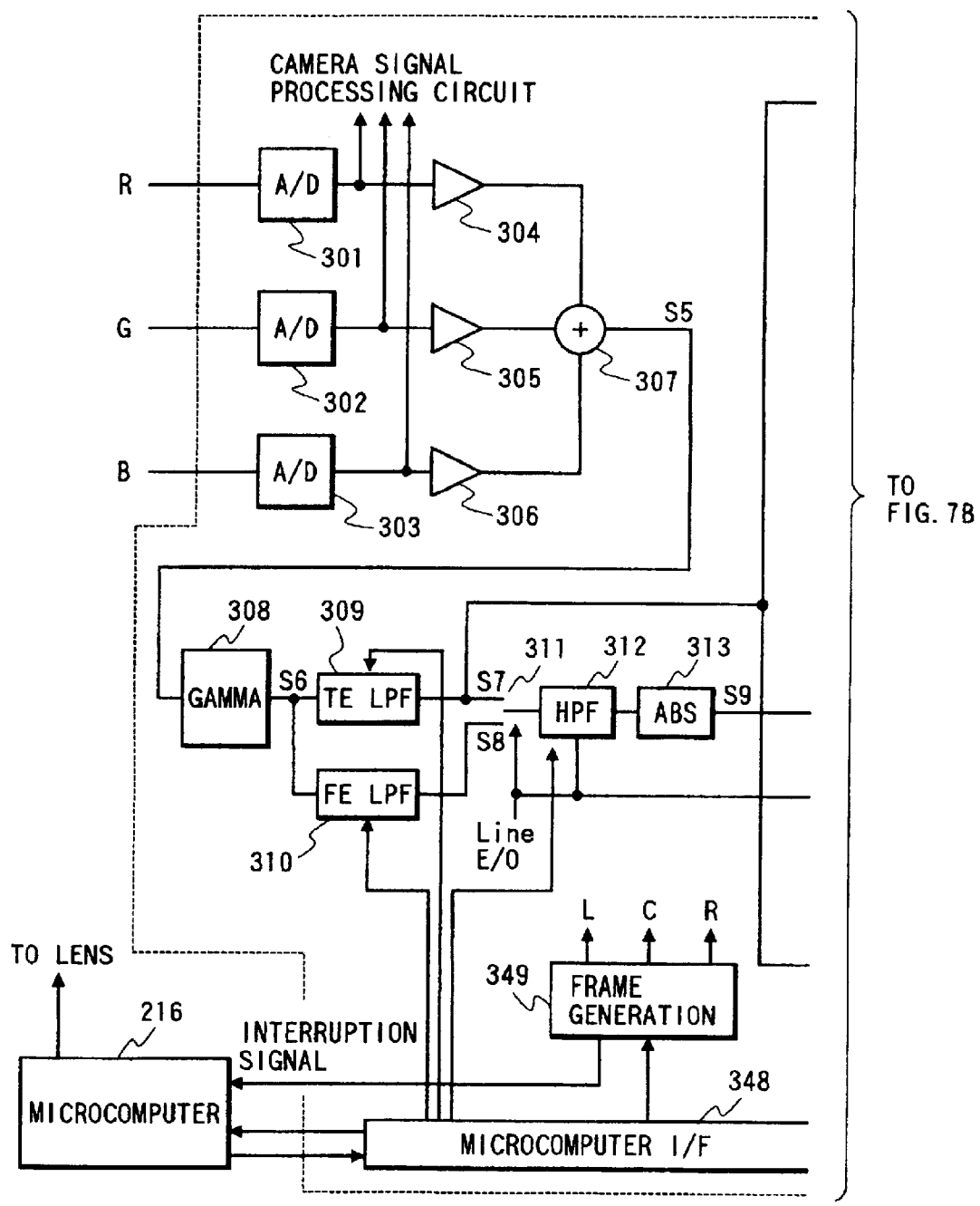

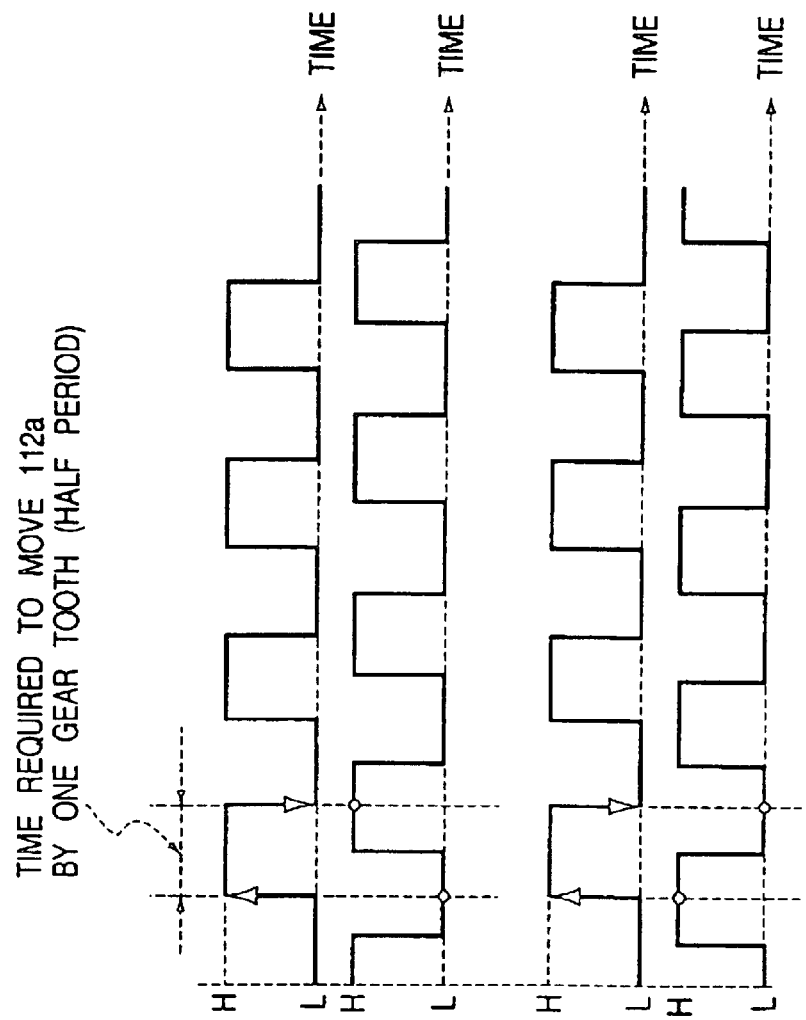

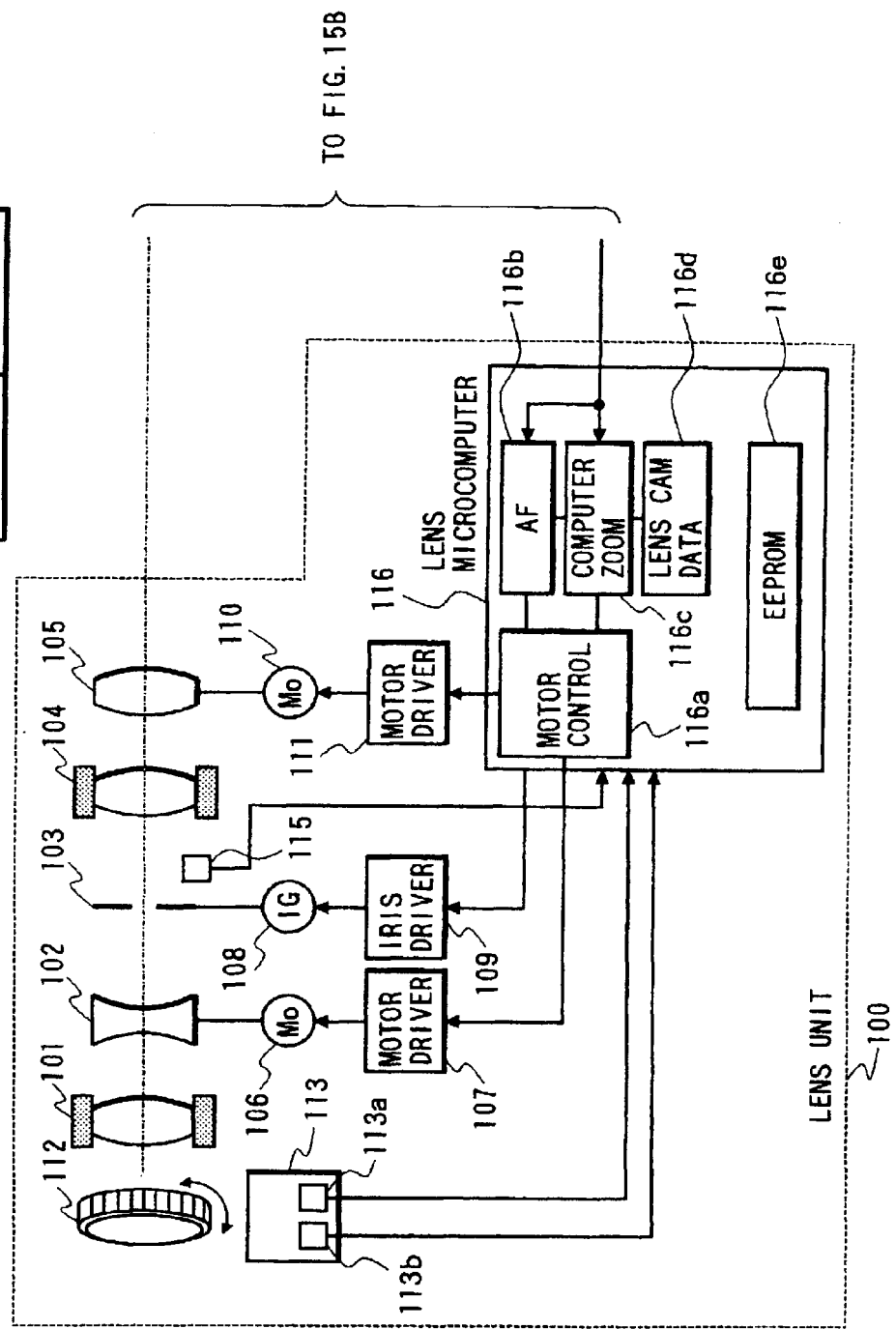

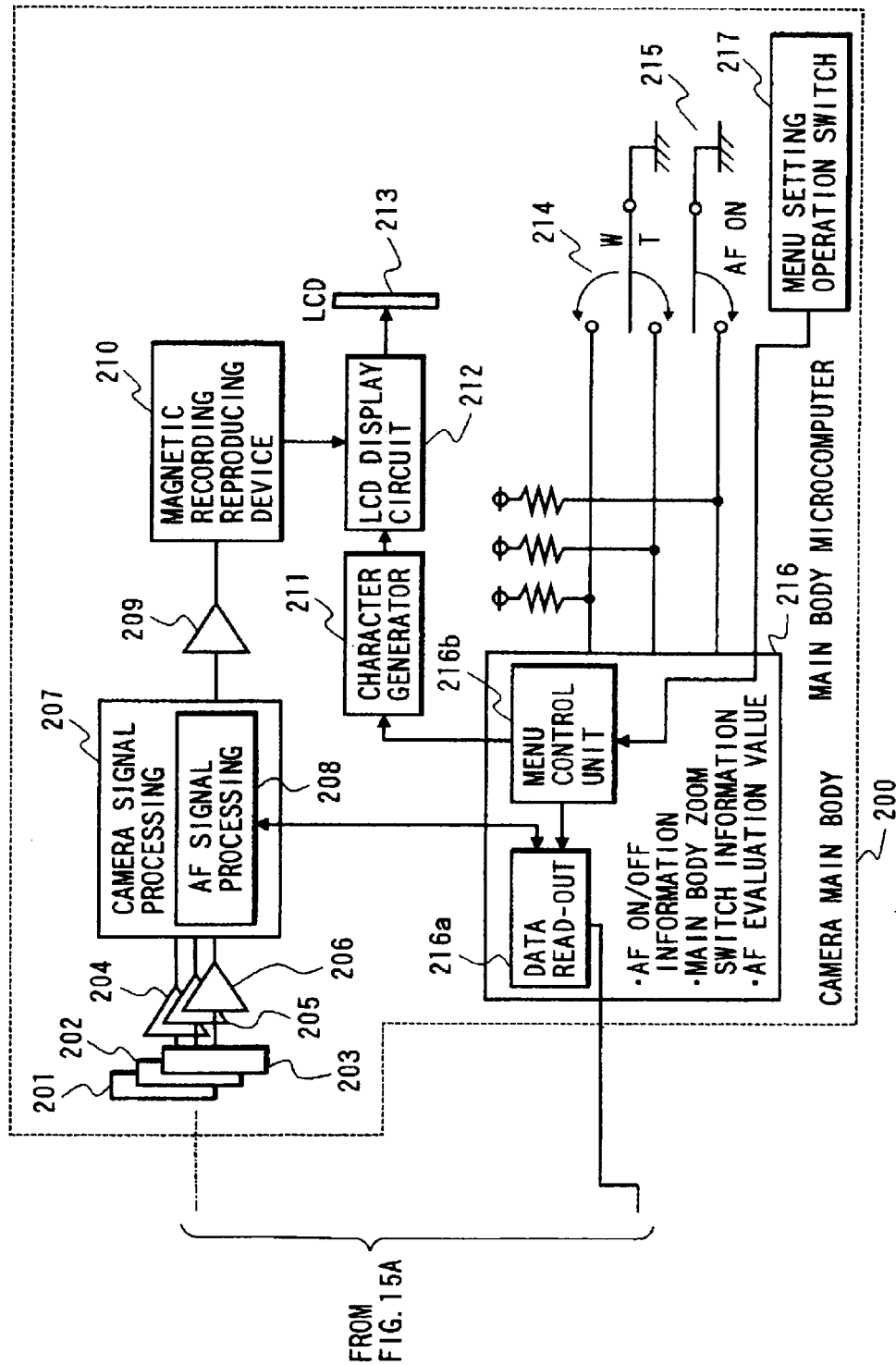

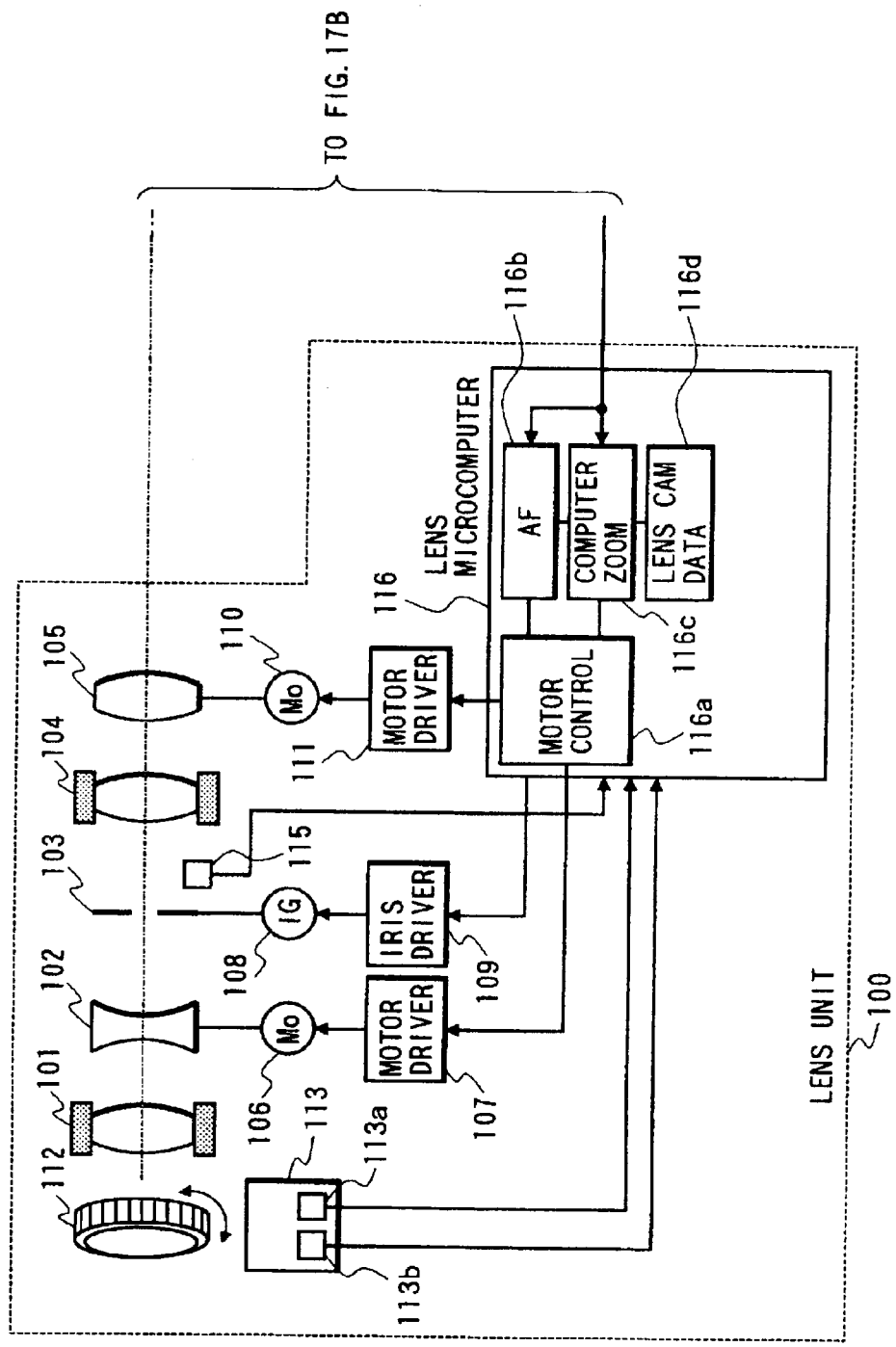

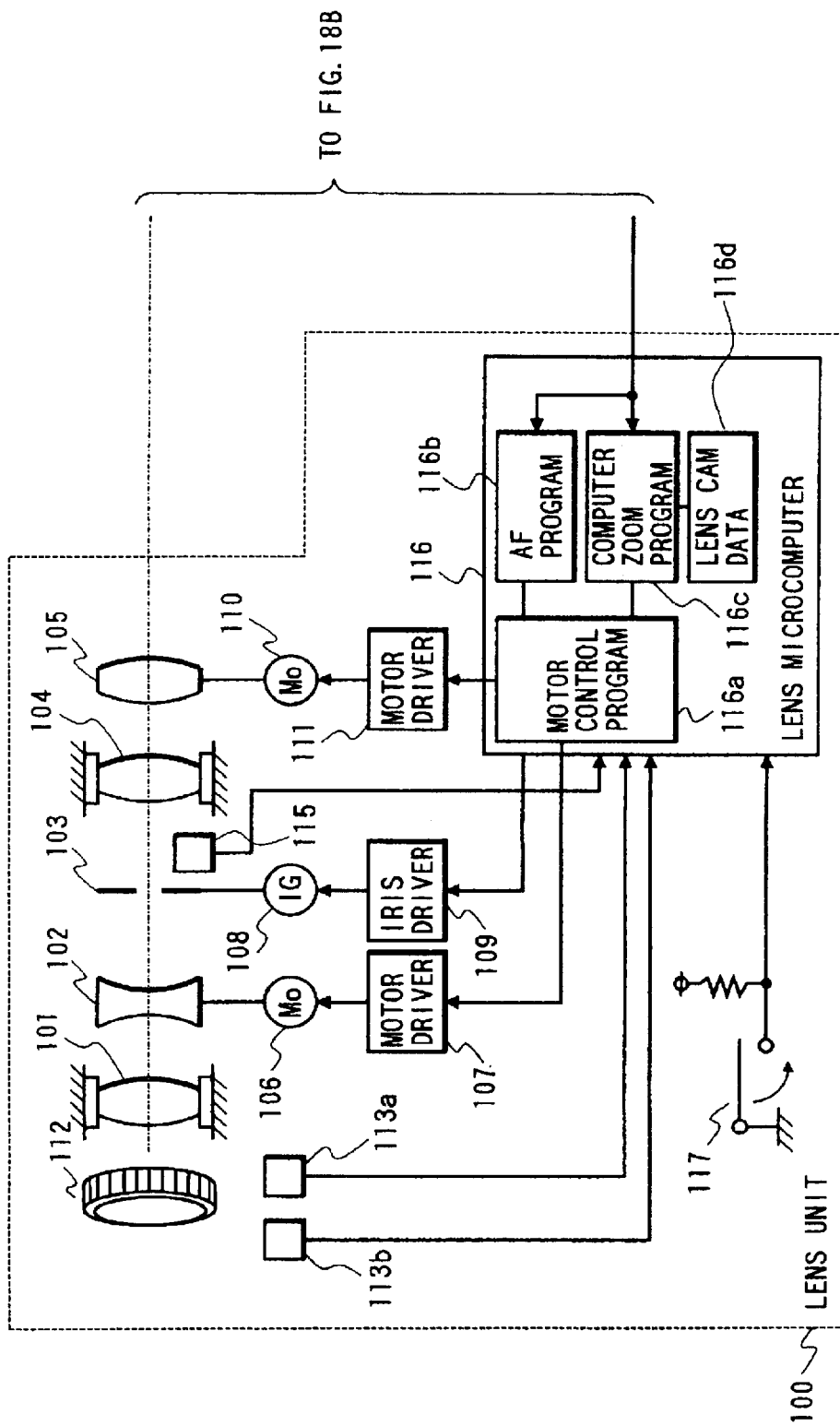

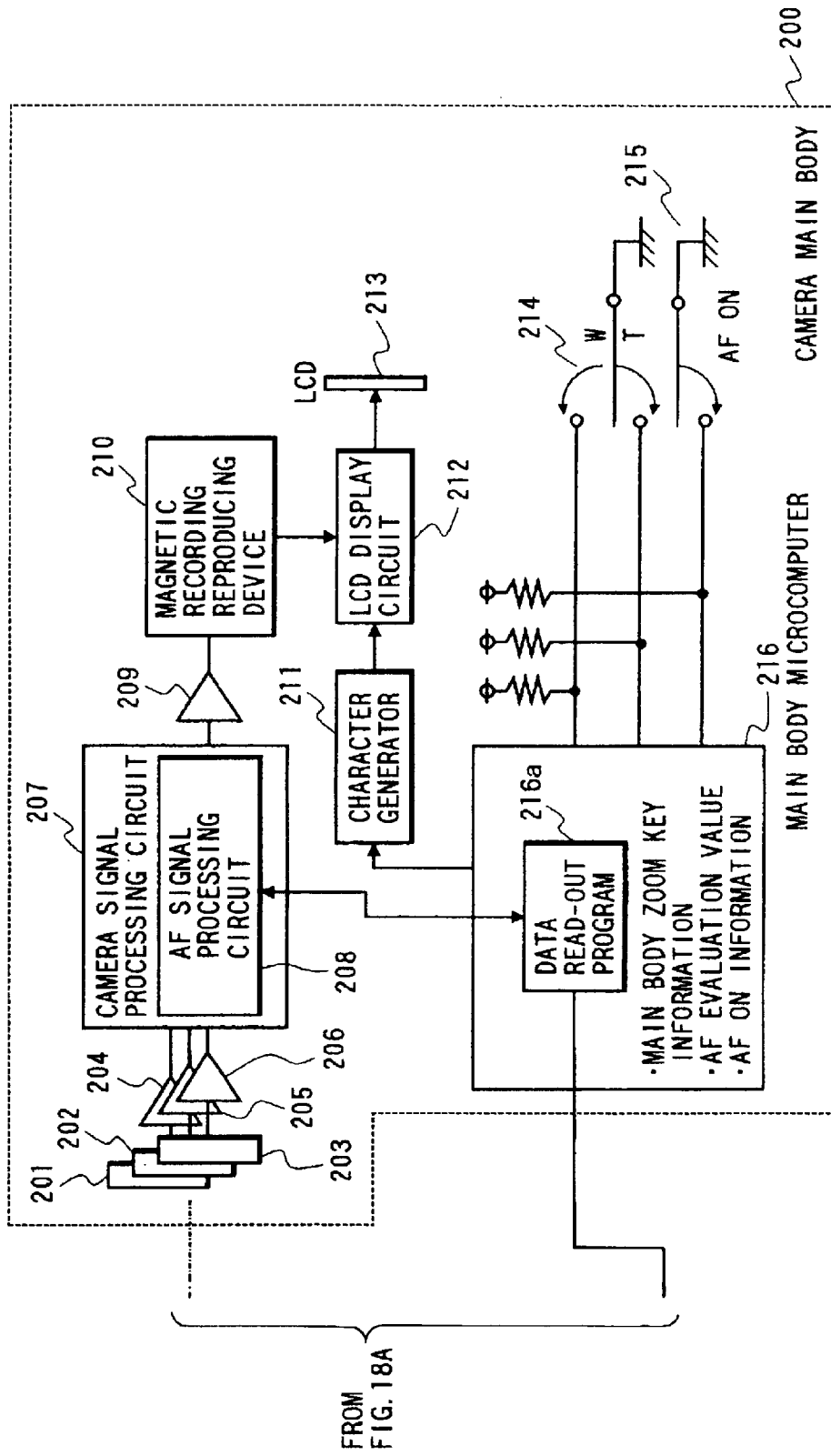

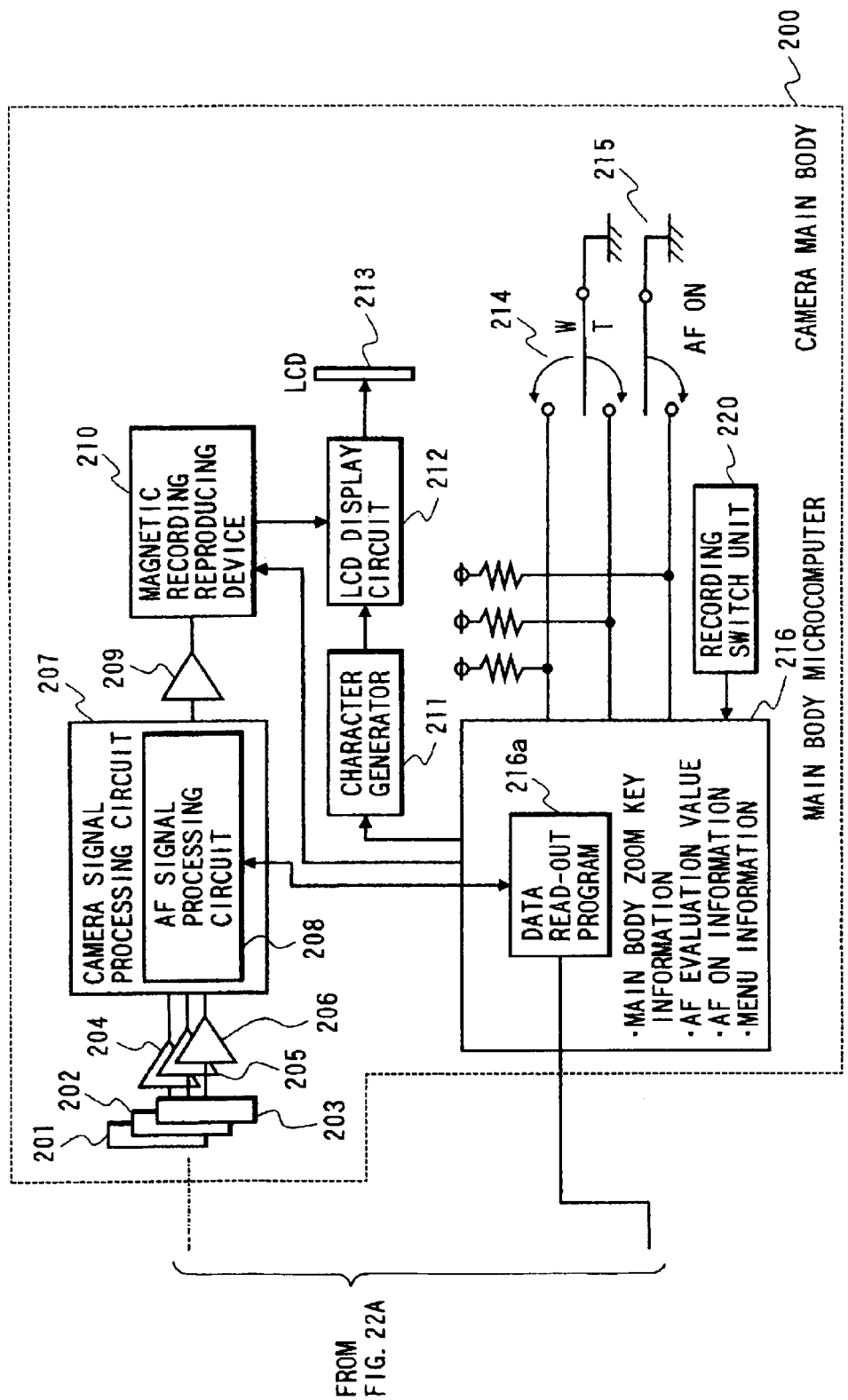

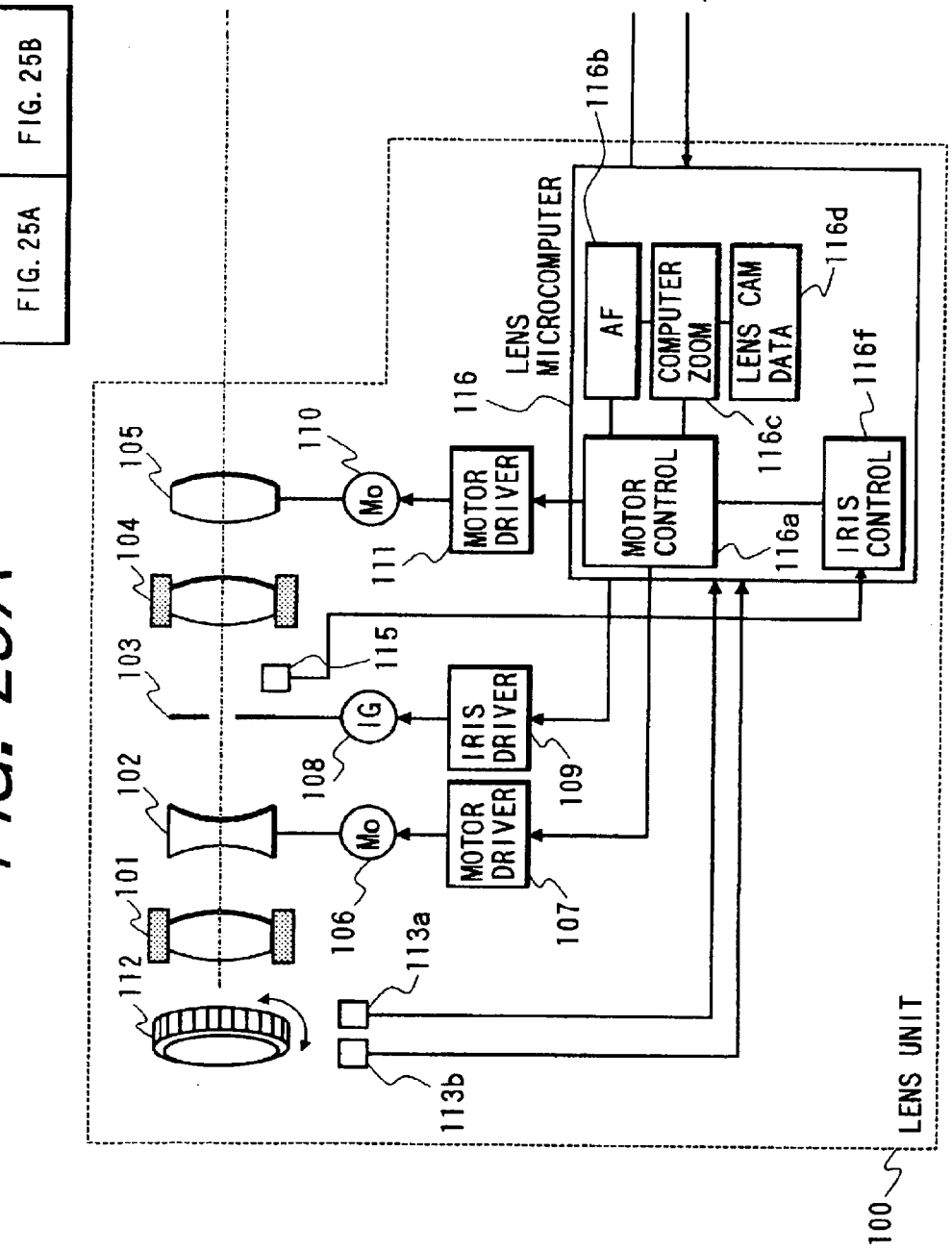

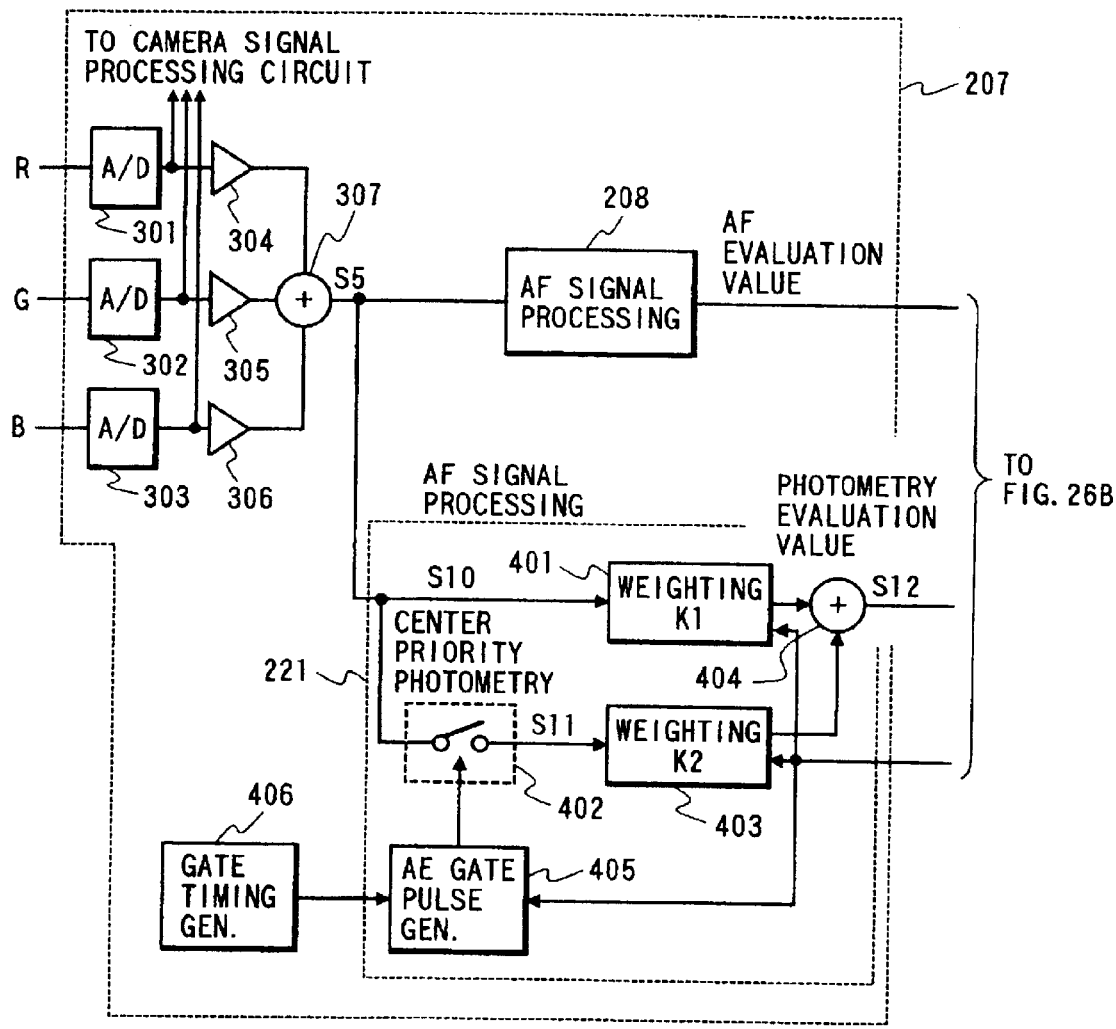

IMAGE PICKUP APPARATUS

BACKGROUND OF THE INVENTION

1. Field of the Invention

The present invention relates to an image pickup apparatus and more particularly to an image pickup apparatus with a function of manually moving a lens.

2. Related Background Art

A conventional lens exchangeable system of an image pickup apparatus such as a video camera will be described with reference to the block diagram shown in FIG. 1. In a conventional lens unit whose magnification can be changed, a magnification lens 802 and a correction lens 803 are mechanically coupled by a cam. Upon manual or electrical operation of variable magnification, the magnification lens 802 and correction lens 803 move in unison.

A combination of the magnification lens 802 and correction lens 803 is generally called a zoom lens. In such a lens system, a front lens 801 is used as a focus lens and a focus is adjusted by moving it in the optical axis direction. Light passed through this lens group is focussed on an image plane of an image pickup element 804, and photoelectrically converted into electric signals which are output as video signals.

This video signal is sampled and held by a CDS/AGC 805, thereafter amplified to a predetermined level, and converted into a digital video signal by an A/D converter 806. Thereafter, this digital video signal is input to a processing circuit of a camera for converting it into a standard television signal, and also to a band-pass filter (BPF) 807.

The high frequency components of the video signal are derived by BPF 807, and signals corresponding only to a focus detection area in an image frame are picked up by a gate circuit 808. The peak of this picked-up signal is held by a peak-hold circuit 809 at an interval synchronous with an integer multiple of the vertical (V) sync signal to thereby generate an AF evaluation value.

This AF evaluation value is supplied to a main body AF microcomputer 810 in the camera main body. This AF microcomputer 810 determines a focussing speed corresponding to an in-focus state a motor drive direction increasing the AF evaluation value, and transmits the speed and direction of a focus motor to a lens microcomputer 811.

The lens microcomputer 811 controls the speed and direction of a motor 813 via a motor driver 812 in accordance with instructions from the main body microcomputer 810 so as to move the focus lens 801 in the optical axis direction and adjust the focus.

In response to the operation of a zoom switch 818, the main body microcomputer 810 supplies the drive speed and direction of the zoom lenses 802 and 803 to a zoom motor driver 814 in the lens unit 816 to control a zoom motor 815 and drive the zoom lenses 802 and 803 to thereby conduct zooming. The camera main body 817 is so constructed that the lens unit 816 is dismounted therefrom and it is replaced by another lens unit to allow a user to take variety of photograph scenes.

In the case of integral type cameras of public use, the magnification lens 802 and correction lens 803 are not mechanically coupled by a cam but a motion locus of the correction lens is stored in the microcomputer as lens cam data, in order to make the camera compact and allow a user to take a scene just in front of the lens.

The correction lens 803 is driven in accordance with the stored lens cam data and is constructed so as to perform focussing by itself. This lens system so called an inner focus type is becoming the main trend, and has advantages of low cost, system simplicity, and small and light lens barrel.

FIG. 2 briefly shows the structure of a conventional inner focus type lens system. In FIG. 2, reference numeral 901 represents a first fixed lens group, reference numeral 902 represents a second magnification lens group, reference numeral 903 represents an iris, reference numeral 904 represents a third fixed lens group, reference numeral 905 represents a fourth lens group (hereinafter called a focus lens) with a focussing function and a function called a compensation function of compensating for a change in the focus plane position caused by magnification, and reference numeral 906 represents an image plane of an image pickup element.

In the lens system constructed as shown in FIG. 2, the fourth lens group 905 has both the compensation function and the focussing function. Therefore, even if the focal length is the same, the position of the fourth lens group 905 for the control of focussing to the image plane 906 changes with the subject distance.

The graph shown in FIG. 3 shows the positions of the fourth lens group 905 for focussing to the image plane 906, the positions being continuously plotted as the subject distance is changed at each focal length. The fourth lens group 905 moves during magnification on one of loci shown in FIG. 3 identified by the subject distance so that zooming without unsharp focus is possible.

In the lens system of a front lens focus type, the compensation lens is provided independently from the magnification lens, and the magnification lens and compensation lens are mechanically coupled by a cam ring.

For example, if a manual zoom knob is mounted on this cam ring and even if it is moved fast to manually change the focal length, the cam ring rotates following the motion of the knob and the magnification lens and compensation lens move along the cam groove of the cam ring. Therefore, if the focus lens is set just in-focus, the above operation will not make unsharp focus.

In contrast, for the general control of the inner focus type lens system, information of a plurality of locus shown in FIG. 3 is stored in a certain form (loci themselves or a function of loci using a lens position as a variable), and in accordance with the positions of the focus lens and magnification lens, the locus is selected along which zooming is performed.

Further, the position of the focus lens relative to the position of the variable lens is read from a memory and used for the control of lenses. It is therefore necessary to read the position of each lens at some degree of precision. As seen from FIG. 3, if the magnification lens moves at a speed, particularly at a constant speed or near it, the slope of the locus of the focus lens changes from time to time as the focal length changes.

This means that the speed and motion of the focus lens changes from time to time. In other words, an actuator for the focus lens is required to have a precise speed response in the range from 1 Hz to several hundreds Hz.

As an actuator meeting such requirements, stepping motors are generally used for the focus lens group of the inner focus lens system. Each stepping motor rotates in complete synchronization with stepping pulses supplied from a lens control microcomputer or the like. Since the stepping angle per one pulse is constant, it is possible to realize high speed response characteristics, high stop precision and high position precision.

Since the rotary angle of a stepping motor is proportional to the number of stepping pulses, these pulses themselves can be used for an increment type encoder without using an additional position encoder.

As described above, in order to perform magnification while maintaining in-focus state by using a stepping motor, it is necessary to store locus information shown in FIG. 3 in a microcomputer or the like in some form (loci themselves or a function of loci using a lens position as a variable), to read the locus information in accordance with the position of the magnification lens or its motion speed, and to move the focus lens in accordance with the read information.

FIG. 4 is a graph illustrating an example of a conventional locus tracing method. In FIG. 4, $Z_0, Z_1, Z_2, \ldots, Z_6$ represent the positions of the magnification lens, $a_0, a_1, a_2, \ldots, a_6$ and $b_0, b_1, b_2, \ldots, b_6$ represent the typical locus positions stored in a microcomputer, and $p_0, p_1, p_2, \ldots, p_6$ represent the locus positions calculated by the above two sets of locus positions.

The calculation equation of the loci is given by $$p(n+1) = |p(n) - a(n)|/|b(n) - a(n)| \times \\ |b(n+1) - a(n+1) - a(n+1)| + a(n+1) \quad (1)$$

According to this equation (1), if the focus lens is at the position, for example, $p_0$ in FIG. 4, an interior division ratio of $p_0$ to a line segment $b_0$–$a_0$ is calculated and a point $p_1$ as an interior division of a line segment $b_1$–$a_1$ is calculated by using the calculated interior division ratio. The motion speed of the focus lens for maintaining an in-focus state can be calculated from the position difference $p_1$–$p_0$ and the time required for the magnification lens to move from $Z_0$ to $Z_1$.

Next, it is assumed that there is no such a limit as the stop position of the magnification lens is only on the boundary represented by the stored typical locus data. FIG. 5 is a graph illustrating an interpolation method for calculating the position of the magnification lens, this graph showing part of the graph of FIG. 4 and illustrating the calculation of an optional intermediate position of the magnification lens.

In FIG. 5, the ordinate represents the focus lens position and the abscissa represents the zoom lens position. The typical locus positions (focus lens positions relative to the magnification lens) stored in the lens control microcomputer are indicated at the magnification lens positions $Z_0, Z_1, \ldots, Z_{k-1}, Z_k, \ldots, Z_n$. The corresponding positions of the focus lens for respective subject distances are indicated as:

$a_0, a_1, \ldots, a_{k-1}, a_k, \ldots, a_n$, and
$b_0, b_1, \ldots, b_{k-1}, b_k, \ldots, b_n$.

Assuming that the magnification lens position is at $Z_x$ not on the zoom boundary corresponding to the stored typical locus position and the focus lens position is $p_x$, then $a_x$ and $b_x$ are given by:

$$a_x = a_k - (Z_k - Z_x) \times (a_k - a_{k-1})/(Z_k - Z_{k-1}) \quad (2)$$

$$b_x = b_k - (Z_k - Z_x) \times (b_k - b_{k-1})/(Z_k - Z_{k-1}) \quad (3)$$

The positions $a_x$ and $b_x$ can therefore be calculated by interiorly dividing pairs of the stored four typical locus position data $(a_k, a_{k-1}, b_k, b_{k-1})$ at the same subject distance by the interior division ratio obtained by the present magnification lens position and two zoom boundary positions (e.g., $Z_k$ and $Z_{k-1}$ shown in FIG. 5) on both sides of the present magnification lens position.

The positions $p_k$ and $p_{k-1}$ can be calculated by interiorly dividing pairs of the stored four typical locus position data $(a_k, a_{k-1}, b_k, b_{k-1})$ at the same subject distance by the interior division ratio obtained from $a_x$, $p_x$ and $b_x$ as in the equation (1).

For the zooming in the direction from a wide end to a telephoto end, the motion speed of the focus lens for maintaining an in-focus state can be calculated from the position difference between the target focus position $p_k$ and the present focus position $p_x$ and the time required for the magnification lens to move from $Z_x$ to $Z_k$. For the zooming in the direction from the telephoto end to the wide end, the motion speed of the focus lens for maintaining an in-focus state can be calculated from the position difference between the target focus position $p_{k-1}$ and the present focus position $p_x$ and the time required for the magnification lens to move from $Z_x$ to $Z_{k-1}$. The above locus tracing method has been proposed heretofore.

As described earlier, in the inner focus type lens unit, a stepping motor is used as an actuator to make the driver system compact and simple. Further, stepping pulses of the stepping motor can be generated easily in the lens control microcomputer. Therefore, by counting the number of stepping pulses output from the lens control microcomputer, the position of a lens can be known precisely without using an additional encoder or the like for lens position detection.

In a front lens focus type lens system, a general zooming mechanism of moving a zoom lens mechanically connected to a zoom sleeve by rotating the zoom sleeve fitted in a lens barrel, is excellent in the following points and other points.

(1) The lens moves proportional to a rotation amount.

(2) Therefore, zooming can be performed smoothly in the range from coarse to fine adjustment.

However, in the inner focus type lens system, it is difficult to mechanically couple a lens to a zoom sleeve and move it with an external force and to attain manual zooming, from the following reasons and others.

(1) Movable lenses are all mounted in a lens barrel.

(2) If a lens is rotated by a cam ring or the like mechanically coupled thereto without using a specific control circuit, a difference may be generated between the count of drive pulses of a stepping motor and the actual lens position.

(3) The drive system of a simple structure is not suitable for manual operation.

If a zoom handling member is not provided on the lens side of a camera, particularly a lens exchangeable camera shown in FIG. 1, a user must hold the camera with its lens barrel although depending upon the type of mounted lens. Therefore, a user is required to temporarily stop viewing the finder and find a zooming operation switch on the main body for the view angle adjustment. In such a case, a camera shake may occur or smooth photographing may be hindered.

To solve the above problems, another system has been proposed in which an encoder is fitted in a lens barrel and the zoom lens is moved by electrically detecting the direction and speed of the encoder. In this specification, a zoom sleeve not mechanically coupled to the zoom lens is called a "zoom ring". The structure of a zoom ring will be described with reference to FIGS. 12, 13, 14A and 14B.

In FIG. 12, reference numeral 112 represents a rotary type encoder to be fitted in a lens barrel, and reference numeral 112a represents a comb structure of the encoder constituted of a light transmitting portion and a light reflecting portion. Reference numerals 113a and 113b each represent a photo-detector (sensor) comprising a light projector 120 and a light detector 121. An output signal of the photodetector 113a changes its state between when it receives light reflected from the comb structure 112a and when it does not receive the reflected light (FIG. 13 is an enlarged view of a portion 122 surrounded by a broken line in FIG. 12).

As the encoder 112 rotates, the output signals generated by the photodetectors 113a and 113b change as shown in FIG. 14A or 14B. The positional relationship between the photodetectors 113a and 113b is determined so that the phases of two output signals shift by a proper amount. The rotation speed is detected from a period of the output signal, and the rotation direction is detected from a phase relationship between two signals.

Specifically, the output waveforms shown in FIG. 14A stand for the normal rotation of the encoder, and the output waveforms shown in FIG. 14B stand for the reverse rotation of the encoder. By picking up the output signals from a combination of the photodetectors 113a and 113b, the drive direction and speed of the lens are determined from the picked-up signals.

As the zoom ring with the encoder illustrated in FIGS. 12, 13, 14A and 14B rotates, a lens actuator such as a stepping motor is driven. Although this lens system is of an inner focus type, the operation performance thereof is similar to a front lens focus type lens system and zooming can be performed smoothly through power zooming.

If a video camera of general use having the above-described manual zooming mechanism is held with the left hand of a user and the zoom sleeve is rotated with the right hand, the zoom lens is rotated in a clockwise direction toward the telephoto end with the user's arm being opened, and rotated in the counter-clock wise direction toward the wide end with the arm being closed, in order to make it easy to use the wide/macro function of the front lens focus type.

In contrast, in the case of video cameras for business use, the zoom lens is rotated in the counter-clockwise direction with the arm being closed for the telephoto end in order to suppress camera shake. As above, the motion direction of the zoom lens relative to the rotation direction of the manual zooming operation member has been mechanically or electrically fixed depending upon the use application of cameras.

Therefore, depending upon photographing purpose and upon which hand is used, the camera operation and photographing may become difficult. If a user wants a specific camera easy to use, the camera must be ordered as a custom made and becomes very expensive.

A camera, particularly a camera of a lens exchangeable system capable of using an ultra-wide or ultra-telephoto lens, may often be used both for general and business uses. It is therefore undesirable to fix the motion direction of the zoom lens relative to the rotation direction of the zoom sleeve.

SUMMARY OF THE INVENTION

In view of the above circumstances, it is a first object of the present invention to solve the above problems and realize a zooming operation most suitable for each user.

It is a second object of the invention to make variable the drive characteristics of a lens relative to the operation of an operation member.

In order to achieve the above objects, a preferred embodiment of the invention discloses an image pickup apparatus comprising a ring member disposed concentrically about a lens optical axis, detection means for detecting a change amount of rotation of the ring member, control means for performing motion/stop control of at least a magnification lens group along the optical axis, and motion direction setting means for allowing a user to set as desired the motion direction of the magnification lens group relative to the rotation direction of the ring member.

Another preferred embodiment of the invention discloses a video camera in which as a ring member disposed concentrically is rotated, a change amount of the rotation is detected with detecting means, the magnification lens group is moved in accordance with the detected change amount, and a user can freely determine the motion direction of the magnification lens group.

Another preferred embodiment of the invention discloses a video camera with motion direction setting means which provides simple operation and structure so that as a user operates upon an operation member, the motion direction of a magnification lens group relative to the rotation direction of the ring member is changed in accordance with the state of the user operation.

It is a third object of the present invention to realize a custom function desired by a user by making variable the lens response characteristics relative to the operation of an operation member.

It is a fourth object of the present invention to improve operation performance and feeling of a control system without mechanical coupling between the operation member and lens, by optimizing the relationship between the operation of an operation member and a lens drive/stop operation.

The other objects and features of the invention will become more apparent from the following description of embodiments and the accompanying drawings.

BRIEF DESCRIPTION OF THE DRAWINGS

FIGS. 14A and 14B show waveforms of signals output from combinations of photodetectors.

FIG. 15 comprised of FIGS. 15A and 15B, is a block diagram showing the structure of an image pickup apparatus according to a second embodiment of the invention.

FIG. 18 comprised of FIGS. 18A and 18B, is a block diagram showing the structure of an image pickup apparatus according to a fourth embodiment of the invention.

DETAILED DESCRIPTION OF THE PREFERRED EMBODIMENTS

Embodiments which applied the invention to a lens exchangeable system will be described with reference to the accompanying drawings.

Figure 6B:
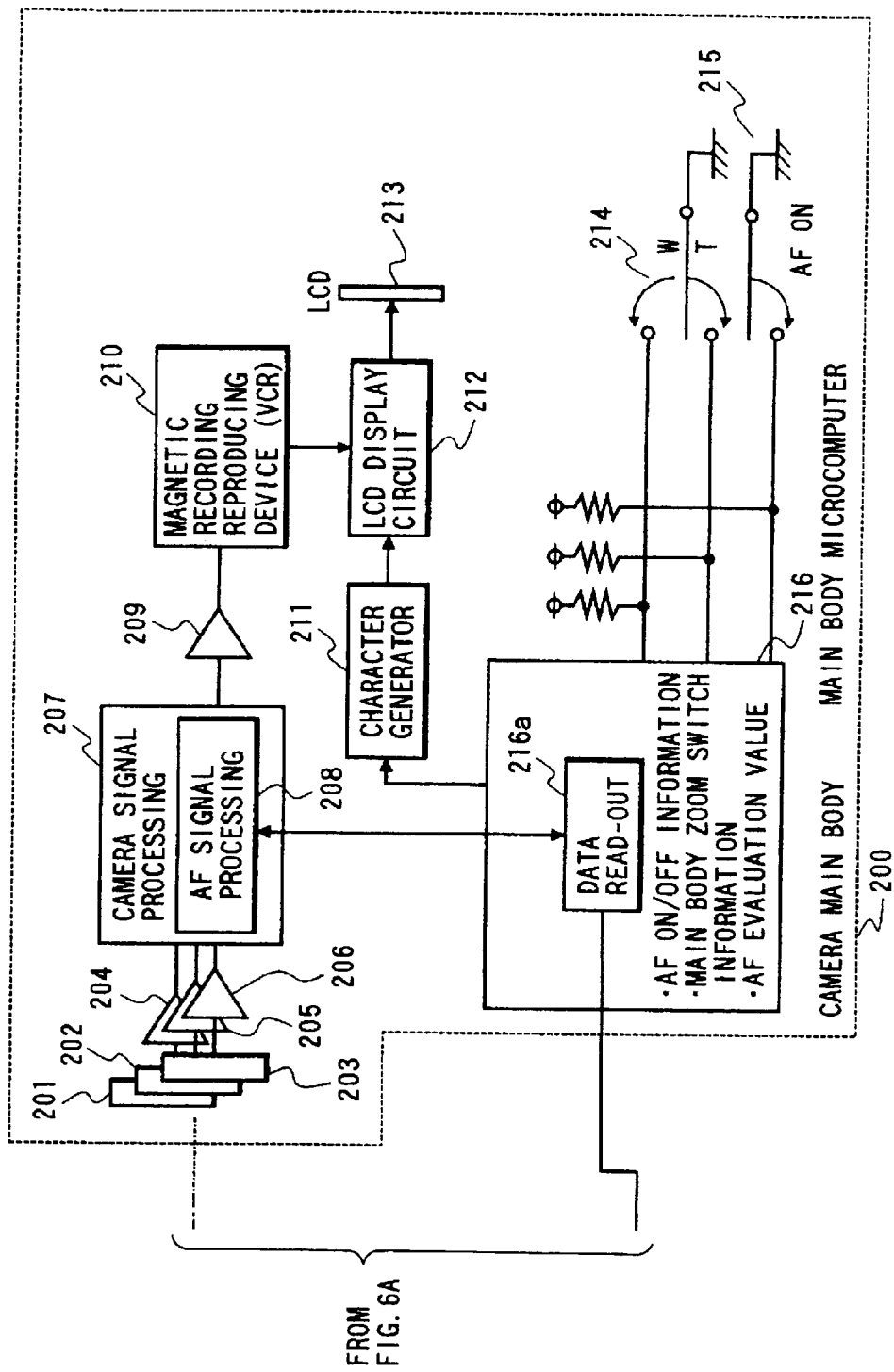
FIG. 6 comprised of FIGS. 6A and 6B, is a block diagram showing the structure of an image pickup apparatus according to a first embodiment of the invention.

FIGS. 6A and 6B are block diagrams showing the structure of a lens exchangeable video camera according to the first embodiment of the invention.

In FIGS. 6A and 6B, reference numeral 100 represents a lens unit, reference numeral 101 represents a first fixed lens group, reference numeral 102 represents a second lens group (hereinafter called a zoom lens) for magnification, reference numeral 103 represents an iris, reference numeral 104 represents a second fixed lens group, reference numeral 105 represents a fourth lens group (hereinafter called a focus lens) having both a focussing function and a compensating function of compensating for a focal plane shift caused by magnification operation.

Reference numeral 106 represents a zoom motor such as a stepping motor for driving the zoom lens 102, reference numeral 107 represents a zoom motor driver for controlling the zoom motor in accordance with an instruction from a lens microcomputer 116 to be described later, reference numeral 108 represents an IG meter for driving the iris 103, reference numeral 109 represents an iris driver for controlling the IG meter 108 in accordance with an instruction from the lens microcomputer, reference numeral 110 represents a focus motor such as a stepping motor for driving the focus lens 105, reference numeral 111 represents a focus driver for controlling the focus motor 110 in accordance with an instruction from the lens microcomputer 116, and reference numeral 115 represents an iris encoder for detecting an iris opening amount (aperture value).

An encoder used for detecting the positions of the zoom lens 102 and focus lens 105 can detect the positions by counting drive pulses of the stepping motor with a counter in the lens microcomputer.

Reference numeral 112 represents a zoom ring as an operation member for driving zoom lens 102 on the lens unit side. Sensors 113a, 113b of a rotation detection circuit portion 113 as an encoder detect the rotation of the zoom ring, and information on the rotation amount and direction is supplied to the lens microcomputer 116.

Reference numeral 114 represents a zoom direction selection switch for switching the relationship between the rotation direction of the zoom ring 112 and the motion direction of the zoom lens 102, and information on the operation state of the zoom direction selection switch 114 is supplied to the lens microcomputer 116.

Figure 1:
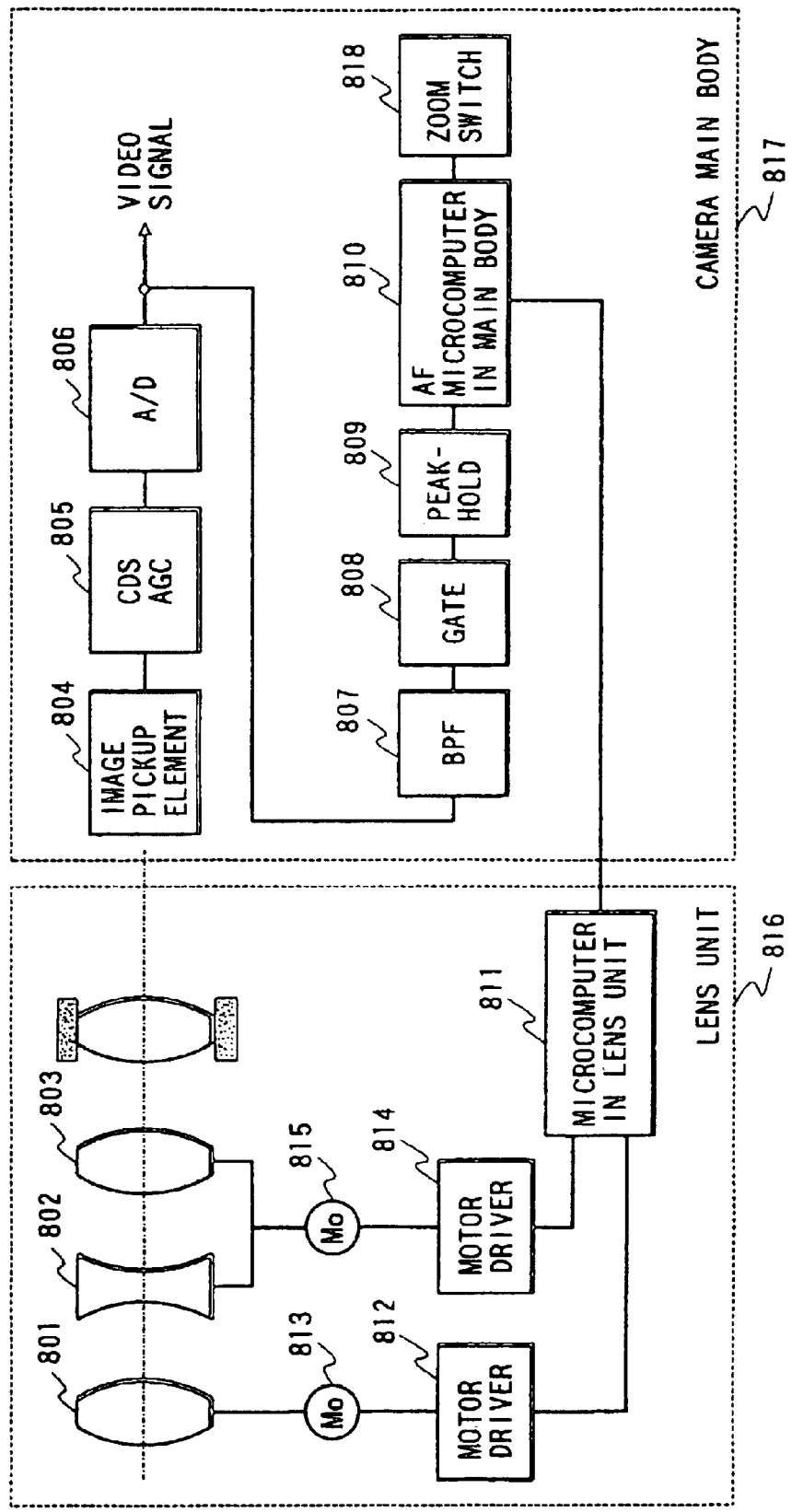
FIG. 1 is a block diagram showing a general structure of a lens exchangeable system.
Figure 2:
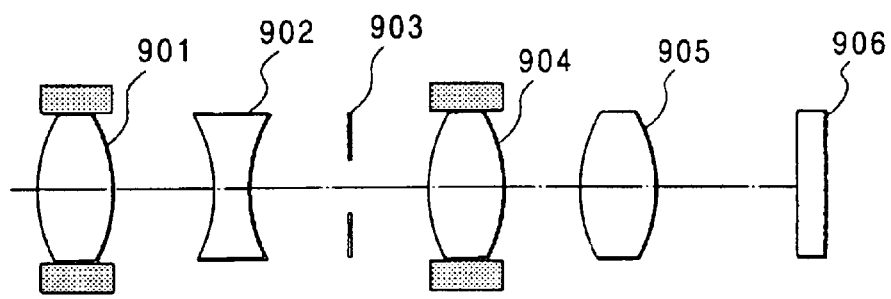
FIG. 2 is a schematic diagram showing the brief structure of an inner focus type lens system.
Figure 3:
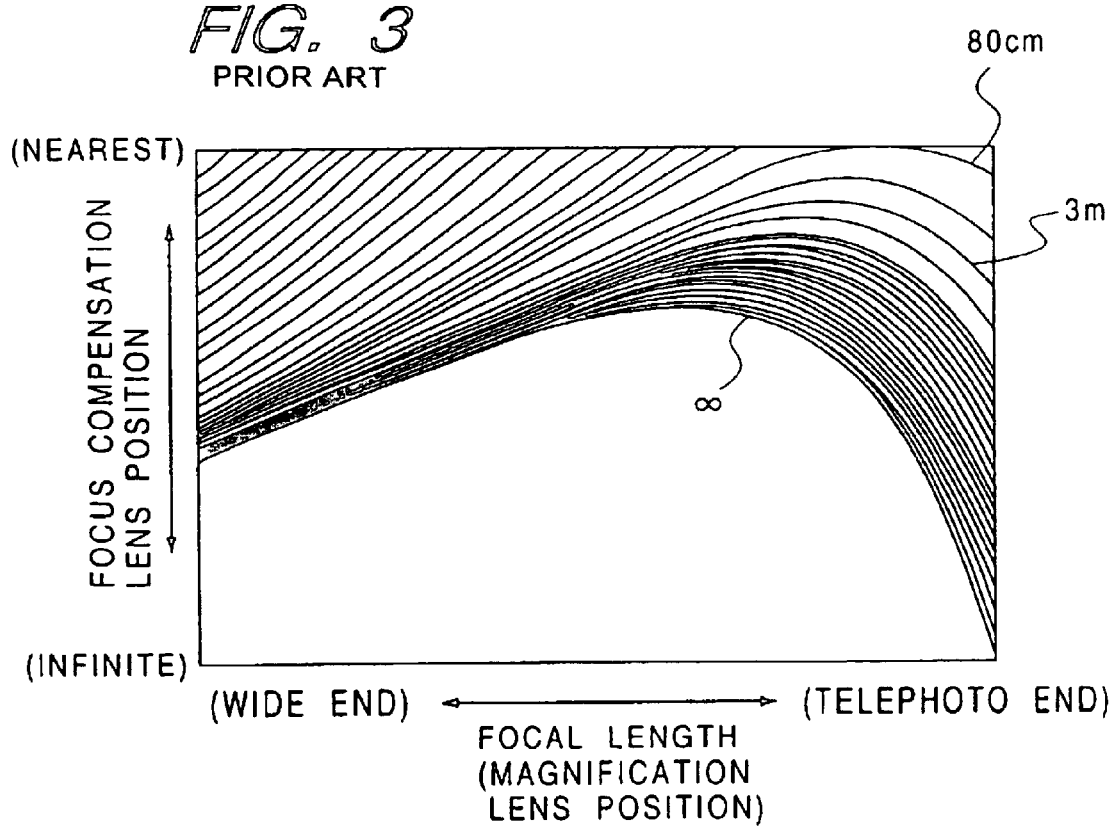
FIG. 3 is a graph showing the positions of a fourth lens group for focussing to the image plane, the positions being plotted as the subject distance is changed.
Figure 4:
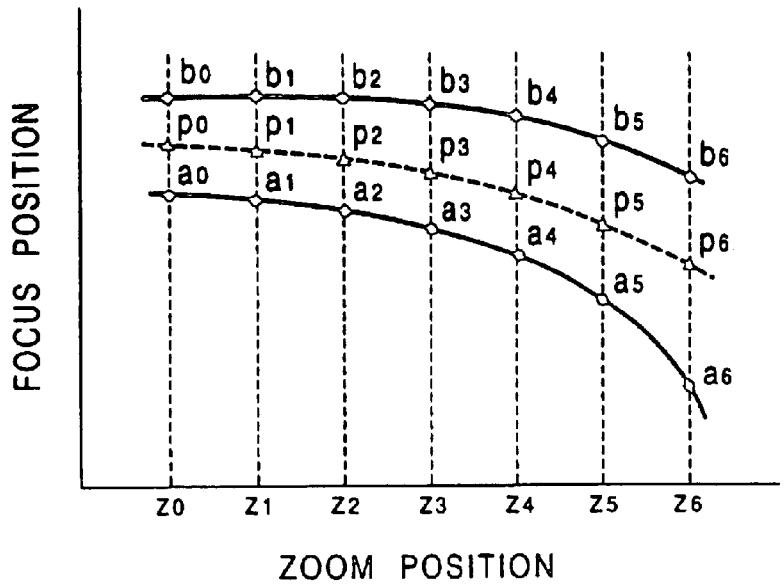
FIG. 4 is a graph illustrating an example of a cam locus tracing method.
Figure 5:
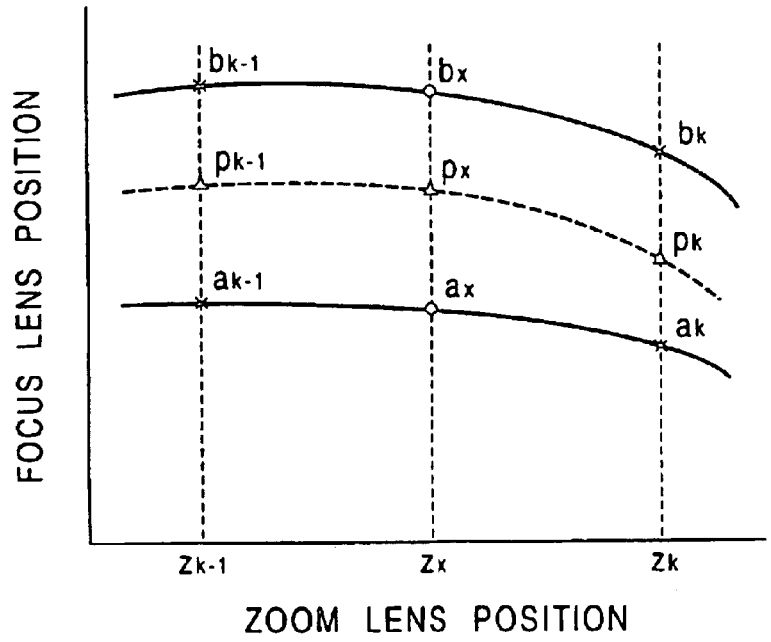
FIG. 5 is a graph illustrating an interpolation method for calculating an intermediate position of a cam locus.

The lens microcomputer 116 controls the whole system of the lens unit 100. The lens microcomputer 116 has therein various devices including: a motor control block 116a for controlling the zoom motor driver 107 and focus motor driver 111; an AF block 116b for calculating focus lens control information in accordance with various focus evaluation values supplied from a camera main body 200 to be described later and supplying the calculated focus motor control information to the motor control block 116a; a computer zoom block 116c for calculating control information of the zoom lens 102 in accordance with operation information of the zoom ring 112 or of a zoom switch 214 received from the camera main body to supply the calculated control information to the motor control block 116a, and for calculating control information of the focus lens 105 for compensating for the focal plane change caused by the motion of the zoom lens 102 to supply the calculated control information to the motor control block 116a; and a lens cam data (ROM) for storing lens cam locus data such as shown in FIG. 3. The computer zoom block 116c reads the cam locus information identified by the positions of the zoom lens 102 and focus lens 105 to make the focus lens follow the read cam locus relative to the motion of the zoom lens 102. In this manner, the in-focus state can be maintained even during zooming operation.

In accordance with luminance level information (Y peak information to be described later) supplied from the camera main body side, the microcomputer 116 calculates iris control information which is used for controlling the iris 103 so as to set the average luminance level to a predetermined constant level, and supplies the calculated iris control information to the iris driver.

The circuit portion characteristic to this invention executes optimum zooming operation by obtaining the rotation state of the zoom lens 112 from the rotation detection circuit portion 113, the operation state of the zoom switch on the camera main body side from the information transmitted from the camera main body side, and the operation state of the zoom direction selection switch 114.

Next, the structure of the camera main body 200 will be described.

The camera main body 200 includes: image pickup elements 201, 202 and 203 such as CCD's serving as image pickup means for picking up red, green and blue components of light incident from the lens unit 100; amplifiers 204, 205 and 206 for amplifying outputs from the image pickup means; a camera signal processing circuit 207 for generating standard video signals from outputs of the amplifiers; an AF signal processing circuit 208 provided in the camera signal processing circuit 207; a microcomputer (hereinafter called a main body microcomputer) for controlling the whole system of the camera main body 200; an amplifier 209 for amplifying an output of the camera signal processing circuit 207; a magnetic recording/reproducing device 210 such as a VTR for video signal recording/reproducing; an LCD display circuit 212 for displaying a video signal output from the camera signal processing circuit 207 or a video signal reproduced by the recording/reproducing device 210 on a monitor; a display 213 such as an LCD (liquid crystal display) as the monitor; a character generator 211 for displaying various types of information and characters singularly or in a manner superposed upon video signals, in accordance with a command from the main body microcomputer 216; a zoom switch 214 for controlling the zoom lens from the camera main body side; and an AF switch 215 for controlling an on/off of AF.

The main body microcomputer 216 has a data read program 216a to supply information on the zoom switch 214, information on the AF switch 215, and AF evaluation value output from the AF signal processing circuit 208, respectively to the lens microcomputer 116.

Specifically, the main body microcomputer 216 reads various focus evaluation values (to be described later) detected by the AF signal processing circuit 208 of the camera signal processing circuit 207 by using the data read program 216a, and transmits them to the lens microcomputer 116 to conduct the AF control. Further, the main body microcomputer 216 transmits information on the operation states of the zoom switch 214 and AF switch 215 to the lens microcomputer 116 to conduct the zooming operation control.

With the above system configuration, if the AF switch 215 is off (in a manual focus mode) and the zoom ring 112 is rotating or the zoom switch 214 is being operated, in accordance with the information supplied from the main body microcomputer 216 the lens microcomputer 116 drives the zoom lens 102 in the direction same as the rotation of the zoom ring 112 or as the operation direction of the zoom switch 214, and the computer zoom block 116c reads from the lens cam data ROM 116d the cam locus identified from the positions of the zoom lens 102 and focus lens 105 to thereby control via the motor control block 118 the focus lens 105 and trace the identified cam locus.

In the above manner, while the zoom lens 102 is driven by the zoom motor 106, a drive signal is supplied to the focus motor driver 111 to drive the focus motor 110 and focus compensation lens 105 to thereby conduct magnification operation while maintaining an in-focus state.

If the AF switch 215 on the camera main body side is on and the zoom ring 112 is rotating or the zoom switch 214 is being operated, it is necessary to retain the in-focus state. In this case, therefore, the computer zoom block 116c refers not only to the lens cam data 116d preset in the lens microcomputer 116 but also to the AF evaluation value signal supplied from the main body microcomputer 210 to conduct the magnification operation so as to maximize the AF evaluation value. The drive amount of the focus lens 105 by the lens cam locus is superposed upon the drive amount set by AF.

If the zoom ring 112 is rotating and also the zoom switch 214 is being operated, i.e., if both the lens unit side and the camera main body side conduct the zooming operation at the same time, the operation of the zoom ring 112 is preferentially performed to realize an operation performance similar to the front lens focus system.

If the AF switch 215 is on and the zoom ring 112 is not rotated or the zoom switch 214 is not operated, the AF block 116b of the lens unit supplies a signal via the motor control block 116a to the focus motor driver 111 to drive the focus motor 110 and focus compensation lens 105 so as to maximize the AF evaluation signal supplied from the main body microcomputer 216 and conduct the automatic focussing operation.

As one aspect of this embodiment, the motion direction of the magnification lens toward the telephoto or wide end relative to the rotation direction of the zoom ring 112 can be switched in accordance with the state of the zoom direction selection switch 114 operated upon by a user. Therefore, the motion direction of the magnification lens can be selected in accordance with user choice or photographing state.

Figure 7B:
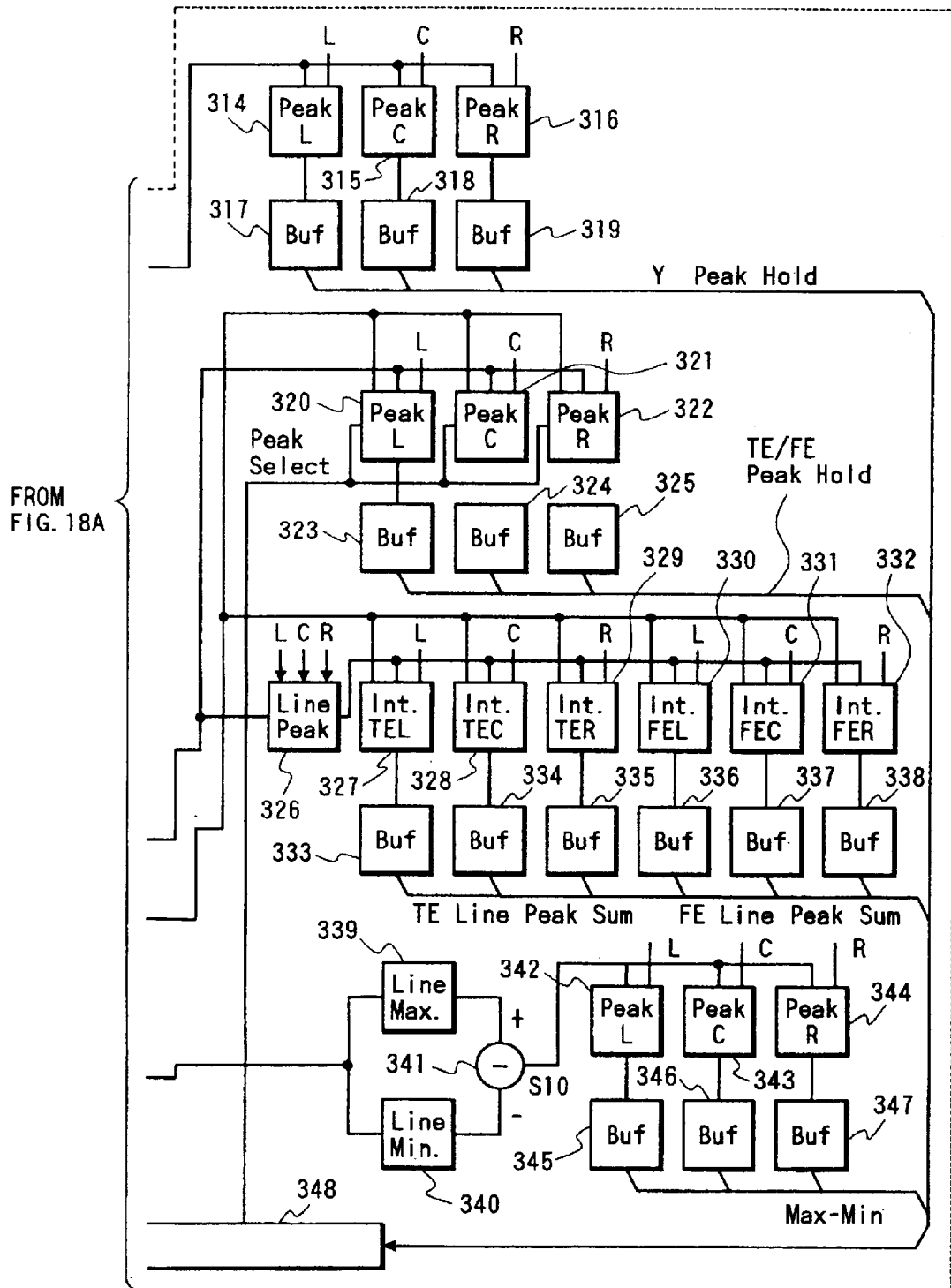
FIG. 7 comprised of FIGS. 7A and 7B, is a block diagram showing the structure of an AF signal processing circuit.

Next, the AF signal processing circuit 208 will be described with reference to FIGS. 7A and 7B.

Outputs from the red (R), green (G) and blue (B) image pickup elements amplified to optimum levels by the red image signal amplifier 204, green image signal amplifier 205 and blue image signal amplifier 206 are supplied to circuit portions of the camera signal processing circuit 207, and to the AF signal processing circuit 208 and converted into digital signals by A/D converters 301, 302 and 303 and properly amplified by succeeding stage amplifiers 304, 305 and 306 and added together by an adder 307 to thereby generate an automatic focussing luminance signal S5.

The automatic focussing luminance signal S5 is input to a gamma circuit 308 to be gamma converted in accordance with a preset gamma curve to thereby generate a signal S6 with emphasized low luminance signal components and suppressed high luminance signal components.

The gamma converted signal S6 is input to a low-pass filter (LPF) TE_LPF 309 having a high cut-off frequency and to an LPF TE_LPF 310 having a low cut-off frequency to derive the low frequency components in accordance with the filter characteristics determined by the main body microcomputer 216 via a microcomputer interface to thereby generate signals S7 and S8 respectively output from TE_LPF 309 and TE_LPF 310.

One of these signals S7 and S8 is selected alternately between odd and even horizontal lines by a switch 311 to which a horizontal line selection signal Line E/O signal is applied, and input to a high-pass filter (HPF) 312.

Namely, for the even line, the signal S7 is supplied to HPF 312, whereas for the odd line the signal S8 is supplied to HPF 312. HPF 312 derives only the high frequency components in accordance with the odd/even line filter characteristics determined by the main body microcomputer 216 via the microcomputer interface 348, and an absolute circuit 313 generates a positive signal S9.

This positive signal S9 is input to peak-hold circuits 320, 321 and 322 and to a line peak-hold circuit 326.

Figure 8:
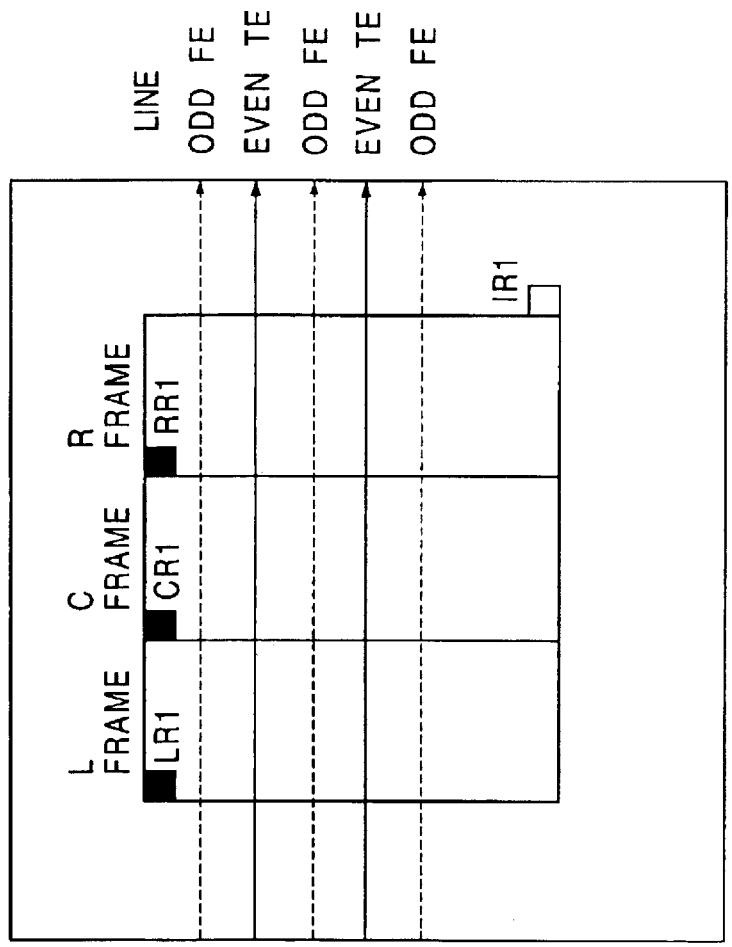
FIG. 8 is a diagram illustrating a focussing gate signal generated by a frame generating circuit.

A frame generation circuit 349 generates L, C and R frame signals as focussing gate signals which are used for generating range finding frames L, C and R at frame positions shown in FIG. 8.

The peak-hold circuit 320 receives the L frame signal output from the frame generation circuit 349 and the Line E/O signal judging whether the horizontal line is even or odd, is initialized at the upper left point LR1 which is the start of the focussing L frame as shown in FIG. 8, holds the peak of the signal S9 in the frame of the even or odd line designated by the main body microcomputer 216 via the microcomputer interface 348, and transfers the peak-hold value in the frame to a buffer 323 in response to a data transfer signal IR1 (refer to FIG. 8) to thereby generate a TE/FE peak evaluation value.

Similarly, the peak-hold circuit 321 receives the C frame signal output from the frame generation circuit 349 and the Line E/O signal, is initialized at the upper left point CR1 which is the start of the focussing C frame as shown in FIG. 8, holds the peak of the signal S9 in the frame of the even or odd line designated by the main body microcomputer 216 via the microcomputer interface 348, and transfers the peak-hold value in the frame to a buffer 324 in response to the data transfer signal IR1 to thereby generate the TE/FE peak evaluation value.

Similarly, the peak-hold circuit 322 receives the R frame signal output from the frame generation circuit 349 and the Line E/O signal, is initialized at the upper left point RR1 which is the start of the focussing R frame as shown in FIG. 8, holds the peak of the signal S9 in the frame of the even or odd line designated by the main body microcomputer 216 via the microcomputer interface 348, and transfers the peak-hold value in the frame to a buffer 325 in response to the data transfer signal IR1 to thereby generate the TE/FE peak evaluation value.

The line peak-hold circuit 326 receives the signal S9, L, C and R frame signals output from the frame generation circuit 349, is initialized at the start in each frame in the horizontal direction, and holds a one-line peak value of the signal in each frame.

Integrator circuits 327, 328, 329, 330, 331 and 332 each receive an output of the line peak-hold circuit 326 and the Line E/O signal judging whether the horizontal line is even or odd, and at the same time the integrator circuits 327 and 330 receive the L frame signal from the frame generation circuit 349, the integrator circuits 328 and 331 receive the C frame signal, and the integrator circuits 329 and 332 receive the R frame signal.

The integrator circuit 327 is initialized at the upper left LR1 which is the start of the focussing L frame, adds the output of the line peak-hold circuit to an internal register immediately before the even line in each frame terminates, and transfers the peak-hold value to a buffer 333 in response to the data transfer signal IR1 to thereby generate a line peak integration evaluation value.

The integrator circuit 328 is initialized at the upper left CR1 which is the start of the focussing C frame, adds the output of the line peak-hold circuit to an internal register immediately before the even line in each frame terminates, and transfers the peak-hold value to a buffer 334 in response to the data transfer signal IR1 to thereby generate the line peak integration evaluation value.

The integrator circuit 329 is initialized at the upper left RR1 which is the start of the focussing R frame, adds the output of the line peak-hold circuit to an internal register immediately before the even line in each frame terminates, and transfers the peak-hold value to a buffer 335 in response to the data transfer signal IR1 to thereby generate the line peak integration evaluation value.

Instead of data addition of even lines by the integrator circuits 327, 328 and 329, the integrator circuits 330, 331 and 332 each add data of odd lines, and transfer the addition results to buffers 336, 337 and 338.

The signal S7 is also input to peak-hold circuits 314, 315 and 316 and line maximum and minimum value hold circuits 339 and 340.

The peak-hold circuit 314 receives the L frame signal output from the frame generation circuit 349, is initialized at the upper left LR1 which is the start of the L frame, and holds the peak value of the signal S7 in each frame. The peak-hold value is transferred to a buffer 317 in response to the data transfer signal IR1 to thereby generate a Y peak evaluation value.

Similarly, the peak-hold circuit 315 receives the C frame signal output from the frame generation circuit 349, is initialized at the upper left CR1 which is the start of the C frame, and holds the peak value of the signal S7 in each frame. The peak-hold value is transferred to a buffer 318 in response to the data transfer signal IR1 to thereby generate the Y peak evaluation value.

Similarly, the peak-hold circuit 316 receives the R frame signal output from the frame generation circuit 349, is initialized at the upper left RR1 which is the start of the C frame, and holds the peak value of the signal S7 in each frame. The peak-hold value is transferred to a buffer 319 in response to the data transfer signal IR1 to thereby generate the Y peak evaluation value.

The line maximum value hold circuit 339 and line minimum value hold circuit 340 each receive the L, C and R frame signals output from the frame generation circuit 348, are initialized at the start points in each frame in the horizontal direction, and hold the maximum and minimum values of one line of the signal S7 in each frame. The held maximum and minimum values are input to a subtractor 341 to calculate a (maximum−minimum) signal S10 which is then input to peak-hold circuits 342, 343 and 344.

The peak-hold circuit 342 receives the L frame signal output from the frame generation circuit 349, is initialized at the upper left LR1 which is the start of the L frame, holds the peak value of the signal S10 in each frame, and transfers the peak-hold value to a buffer 345 in response to the data transfer signal IR1 to thereby generate a (Max−Min) evaluation value which is a difference between the maximum and minimum luminances in the C frame.

Similarly, the peak-hold circuit 343 receives the C frame signal output from the frame generation circuit 349, is initialized at the upper left CR1 which is the start of the C frame, holds the peak value of the signal S10 in each frame, and transfers the peak-hold value to a buffer 346 in response to the data transfer signal IR1 to thereby generate the (Max−Min) evaluation value.

Similarly, the peak-hold circuit 344 receives the R frame signal output from the frame generation circuit 349, is initialized at the upper left RR1 which is the start of the R frame, holds the peak value of the signal S10 in each frame, and transfers the peak-hold value to a buffer 347 in response to the data transfer signal IR1 to thereby generate the (Max−Min) evaluation value.

At the same time, data is transferred to the buffers 317, 318, 319, 323, 324, 325, 333, 334, 335, 336, 337, 338, 345, 346 and 347 in response to the data transfer signal IR1, an interrupt signal is transmitted from the frame generation circuit 349 to the main body microcomputer 216.

Upon reception of this interrupt signal, the main body microcomputer 216 reads the data in each of the buffers 317, 318, 319, 323, 324, 325, 333, 334, 335, 336, 337, 338, 345, 346 and 347 after the present frame processing is completed and before the data of the next frame is transferred, and transfers the read data to the lens microcomputer 116.

FIG. 8 is a diagram illustrating the timings of the AF signal processing circuit 208. The outer most frame indicates an effective image screen for each of the red, green and blue image pickup elements 201, 202 and 203. The inner three-division frames indicate focussing gate frames for which a left L frame signal, a center C frame signal and a right R frame signal are supplied from the frame generation circuit 349. At the start position of each of these frames, a reset signal is output for each of the L, C and R frames to generate LR1, CR1, and RR1 signals to reset the above-described integrator circuits, peak-hold circuits and the like.

At the termination of each frame, the data transfer signal IR1 is generated to transfer each integration value and each peak-hold value to corresponding buffers. Scanning of an even field is indicated by a solid line, and that of an odd field is indicated by a broken line. Both in the even and odd fields, the TE_LPF output is selected for the even line and the FE_LPF output is selected for the odd line.

Next, the description will be made as to how the microcomputer performs the automatic focussing operation by using for each frame the TE/FE peak evaluation value, TE line peak integration evaluation value, FE line peak integration evaluation value, Y peak evaluation value, and Max–Min evaluation value.

The TE/FE evaluation value shows an in-focus degree and a peak-hold value. Therefore, this value depends relatively less on subjects and are less affected by camera shake or the like, so that it is optimum for in-focus judgement and restart judgement. Although the peak TE line peak integration evaluation value and FE line peak integration evaluation value also show an in-focus degree, these values are stable with small noises because of integration so that they are optimum for direction judgement.

The TE peak evaluation value and line peak integration evaluation value derive frequency components higher than FE, and so they are optimum for near at the in-focus. Conversely, the FE peak evaluation value and line peak integration evaluation value are optimum for large unsharpness far from the in-focus state.

The Y peak evaluation value and Max–Min evaluation value depend on subjects although they depend less on the in-focus state so that they are optimum for checking subject states to reliably perform the in-focus state judgement, restart judgement and direction judgement.

In summary, it is most suitable to judge from the Y peak evaluation value whether the subject is a high or low luminance subject and to judge from the Max–Min evaluation value whether the contrast is large or small in order to estimate the peak magnitudes of the TE/FE peak evaluation value, TE line peak integration evaluation value and FE line peak integration evaluation value and compensate for these peak magnitudes.

These evaluation values are transferred from the camera main body 200 to the lens unit 100, and the AF program 116b in the lens microcomputer 116 of the lens unit 100 performs the automatic focussing operation.

Figure 9:
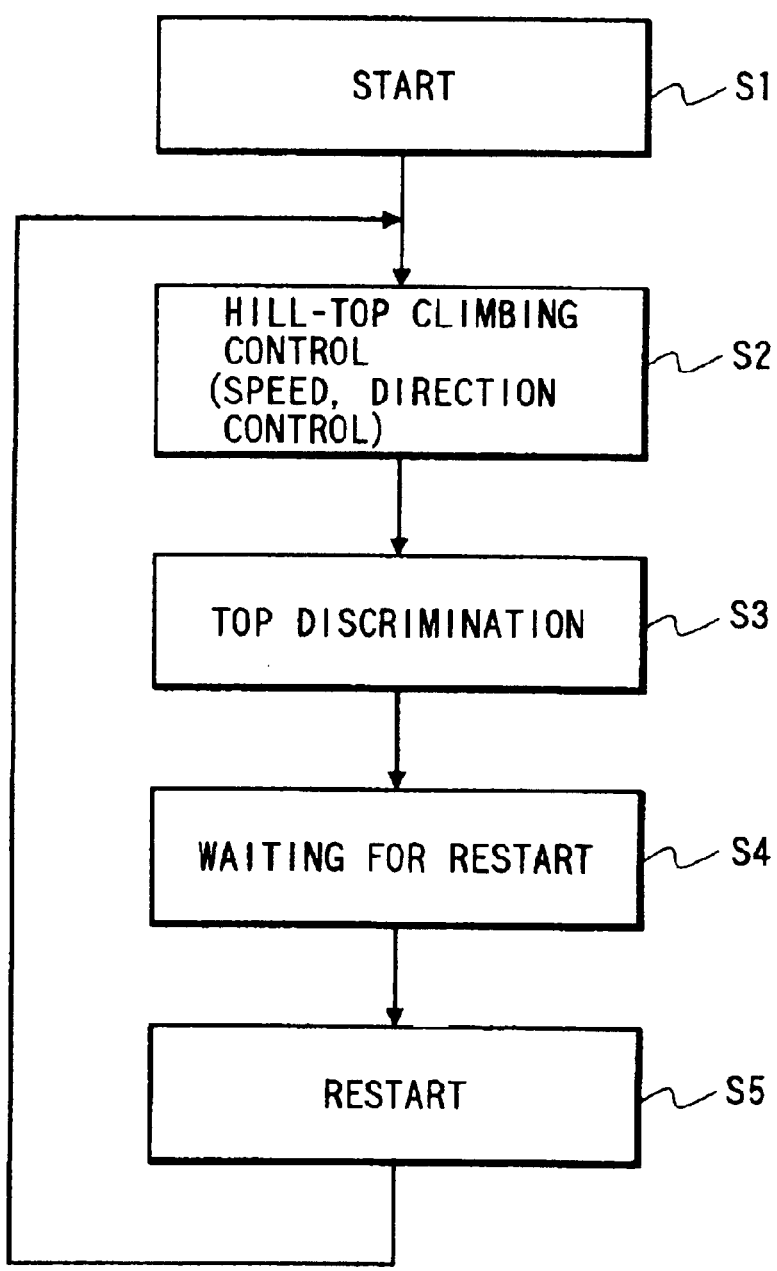
FIG. 9 is a flow chart illustrating an AF control algorithm.

Next, an algorithm of the automatic focussing operation by the lens microcomputer 116 of the lens unit 100 will be described with reference to the flow chart shown in FIG. 9. First at Step S1 this algorithm starts, and at the next Step S2 a speed control is executed at the level represented by TE or FE peak level and a direction control is executed by mainly using the TE line peak integration evaluation value near at a hill-top and the FE line peak integration evaluation value at the skirt of the hill. In this manner, a hill-top climbing control is executed. Next, at Step S3 a hill-top is discriminated in accordance with the absolute values of the TE and FE line peak integration evaluation values and a change amount of the TE line peak integration evaluation value. At the next Step S4 the hill-top climbing control is stopped at the highest level and a restart wait state starts. In this restart wait state, it is checked whether the levels of the TE and FE line peak evaluation values lower, and at the next Step S5 the hill-top climbing control restarts and the flow returns to Step S2.

In this loop of the automatic focussing operation, the degree of the speed control using the TE and FE line peak evaluation values, the absolute value level, a change amount of the TE line peak integration evaluation value for discriminating a hill-top and the like, are determined in accordance with estimation of the height of a hill-top based on the subject state judgment from the Y peak evaluation value and Max–Min evaluation value.

Next, a zooming operation will be described with reference to the flow charts shown in FIGS. 10 and 11 in which the motion direction of the zoom lens relative to the rotation direction of a zoom operation member on the side of the lens unit 100 can be set arbitrarily by a user, which is characteristic to this invention.

Figure 10:
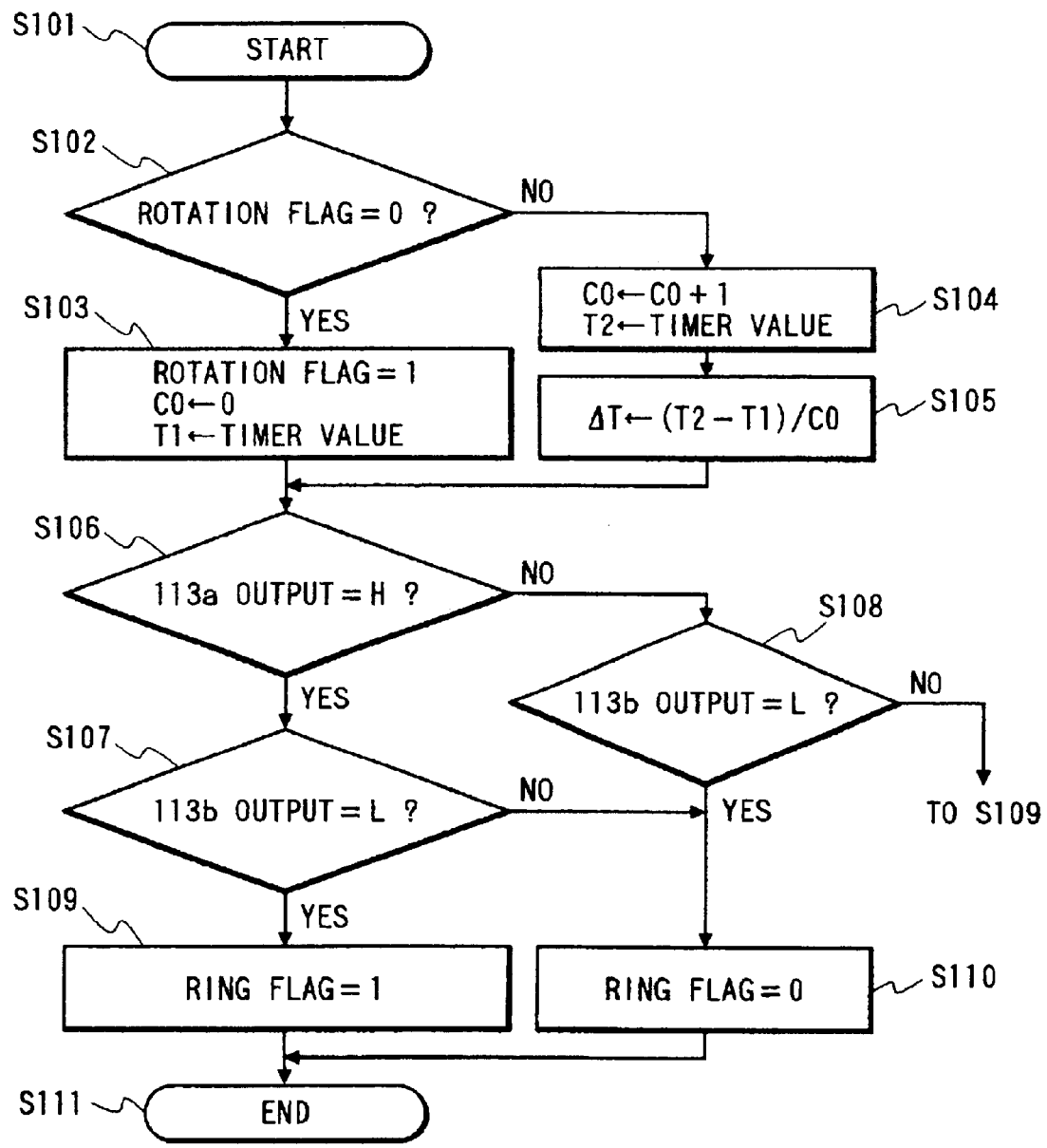
FIG. 10 is a flow chart illustrating a zooming operation.
Figure 11:
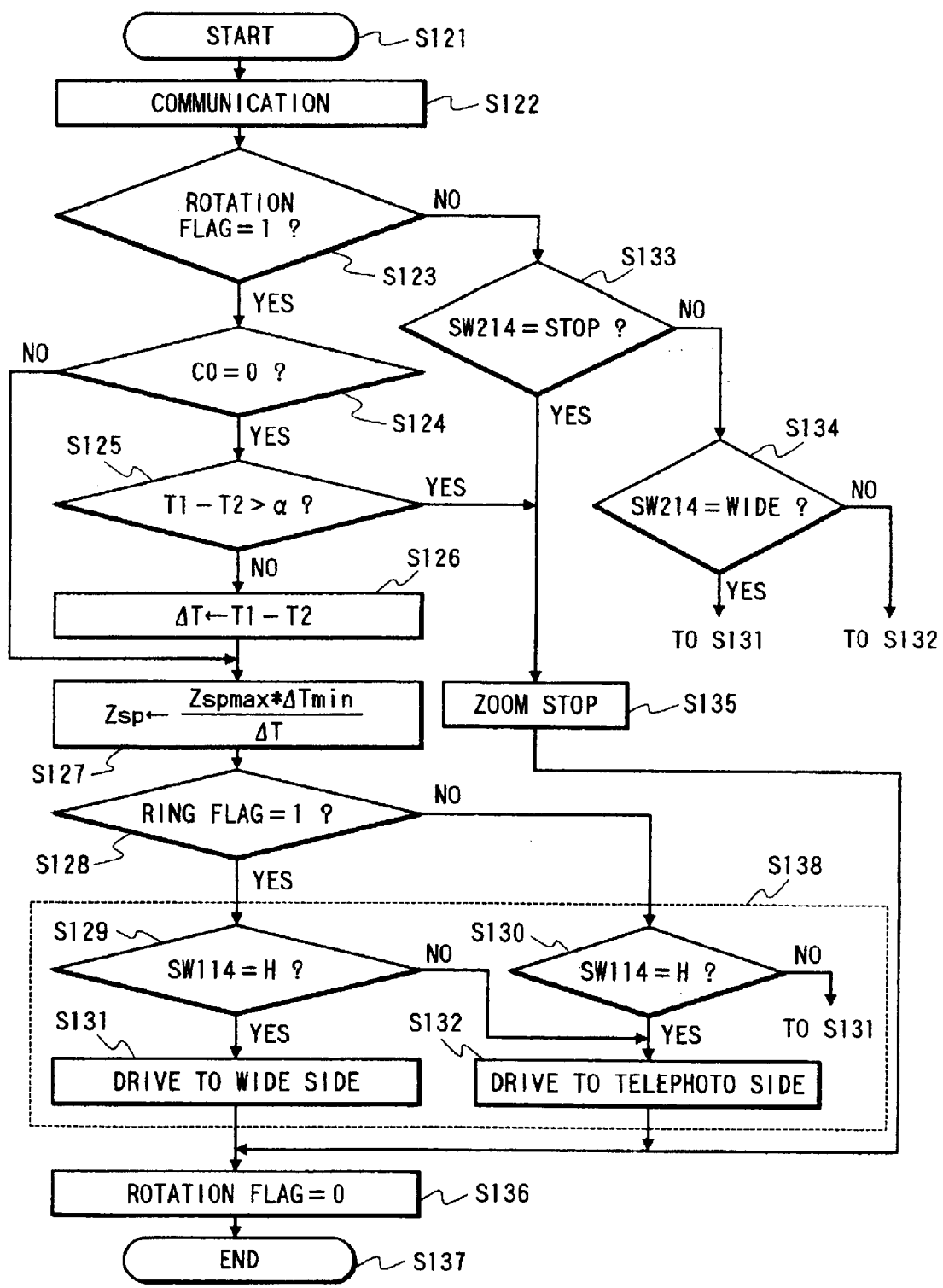
FIG. 11 is a flow chart illustrating a zooming operation.

The flow chart of FIG. 10 illustrates an operation of the lens microcomputer 116 to detect a rotation of the zoom ring 112, and the flow chart of FIG. 11 illustrates an operation of the lens microcomputer 116 to perform a zooming operation.

The processes illustrated in FIG. 10 correspond to an interrupt routine to be executed by the lens microcomputer 116 to detect a rotation direction of the zoom ring 112 and a time required for the zoom ring 112 to move by a unit rotary angle. An interrupt is issued at the timing when the waveform of a voltage output from the sensor or light detector 113a of the ring rotation detection encoder 113 transits. Namely, the interrupt routine shown in FIG. 10 is executed when the rising or falling edge, shown in FIG. 14A and 14B, of an output of the ring rotation detection encoder 113 is detected (whereas the processes shown in FIG. 11 are executed synchronously with a vertical sync signal or the like).

As shown in FIG. 10, the interrupt process starts at Step S101. It is checked at Step S102 whether or not a "rotation flag" is "0". If "0" or clear, at Step S103 the "rotation flag" is set, an interrupt number counter C0 is cleared, and a present timer value is set to a memory T1. The timer value is generally counted by a free running counter of the like built in a microcomputer or the like which counter counts frequency-divided system clocks of the microcomputer.

The "rotation flag" is a flag indicating rotation of the zoom ring 112 which is used for the judgement of rotation of the zoom ring 112 during the processes shown in FIG. 11 and is cleared after the processes of FIG. 11. Namely, the "rotation flag" indicates whether there is any rotation of the zoom ring 112 during one vertical sync period which corresponds to the process cycle of FIG. 11.

After the process of Step S103, it is checked at Step S106 whether the present interrupt is at the rising edge or falling edge of an output from the rotation detection encoder 113a.

If the rising edge, the flow advances to Step S107 whereat it is judged whether the output signal from the encoder 113b is "L" or not. If "L", the combination of the two outputs corresponds to the case shown in FIG. 14A so that a ring flag is set indicating the normal rotation direction of the zoom ring 112 (Step S109) and terminates the interrupt routine (Step S111). If the output of the encoder 113b is "H" at Step S107, the combination of the two outputs corresponds to the case shown in FIG. 14B so that the ring flag is cleared indicating the reverse rotation direction of the zoom ring 112 (Step S110).

If at the process of Step S106 the interrupt is at the falling edge of an output of the rotation detection encoder 113a, the output signal of the encoder 113b is checked at Step S108. If "L", the flow advances to Step S110, whereas if "H", the flow advances to Step S109, respectively to update the ring flag.

If after the completion of the routine of FIG. 10 the zoom ring 112 continues to rotate prior to advancing to the processes of FIG. 11, an interrupt again occurs to repeat the routine of FIG. 10.

In this case, since the rotation flag has already been set at Step S102, the process begins with Step S104 whereat the interrupt number counter C0 is incremented and the present timer value is stored in a memory T2.

At Step S105, a difference between the previous timer value and the present timer value is calculated (memory T2−memory T1) and divided by the interrupt number count C0 to thereby obtain a time required for the zoom ring 112 to rotate a half period of one gear tooth 112a. This period is stored in a memory ΔT and thereafter the processes from Step S106 are executed.

If an interrupt again occurs while the rotation flag is set, the count C0 is incremented and the contents of (memory T2−memory T1) correspond to a rotation time required for the zoom ring 112 to rotate by one period of the gear tooth 112a. Therefore, the contents of the memory ΔT are an average time required for the rotation of one half period.

While the processes shown in FIG. 10 are executed during the rotation of the zoom ring 112, the processes shown in FIG. 11 are executed synchronously with the vertical sync signal.

First, the processes start at Step S121, and at Step S122 the lens unit 100 communicates with the main body microcomputer 216. The main body microcomputer 216 sends information on key on/off of the zoom switch 214 and AF switch 215 and information on AF evaluation values supplied from the AF signal processing circuit 208, and the like as described previously.

In order to give priority to the operation of the zoom ring 112 on the lens unit 100 side, it is checked at Step S123 whether the rotation flag is set. If the rotation flag is clear and the zoom ring operation is not performed, the operation state of the zoom switch 214 transmitted from the main body side is checked.

In accordance with the operation state of the zoom switch, while the zoom lens is moved, the focus lens is subjected to the compensation operation by the cam locus tracing method described with conventional techniques (Steps S133 to S135, Steps S131 and S132). The rotation flag is cleared at Step S136 to prepare for the next processing. If AF is on during the zooming operation, the zooming operation continues while performing an in-focus compensation by referring to the AF evaluation values (the AF operation routine is not shown).

If it is judged at Step S123 that the zoom ring 112 was rotating during the past one vertical sync period, the flow advances to Step S124 whereat it is checked whether the interrupt number counter C0 is clear to thereby judge whether the present rotation of the zoom lens 112 is continuation of low speed rotation or restart rotation after rotation stop.

If it is judged at Step S124 that the interrupt number counter C0 is clear, it is judged that the present rotation is before the rotation of the encoder 112a by a half period of one gear tooth and it is checked at Step S125 whether the contents of (memory T1−memory T2) are larger than a predetermined value α.

In the case of the low speed rotation where the zoom ring 112 continues to rotate during past several V sync periods, the timer value before several V sync periods was stored in the memory T2 (Step S104 in FIG. 10) and the timer value within the present 1 V period is stored in the memory T1 (Step S103 in FIG. 10). Therefore, the contents of (memory T1−memory T2) are a relatively small value.

In the case where the present rotation started after the rotation stop, the time when the memory T2 was updated at the preceding cycle is before several tens V periods. Therefore, the contents of (memory T1−memory T2) are a large value. Accordingly, by checking the value of (memory T1−memory T2), it is possible to discriminate between the rotation after rotation stop and the continuous low speed rotation. A threshold value of this discrimination is the predetermined value α.

In practice, the contents of (memory T1−memory T2) during the low speed rotation are determined from the gear tooth pitch of the zoom lens 112 and the rotation speed given by a user. Therefore, the predetermined value α is determined based on these values. If it is judged at Step S125 that the rotation is not continuous, the flow advances to Step S135 whereat the zooming operation is stopped.

On the other hand, if it is judged at Step S125 that the rotation of the zoom ring is continuous, the flow advances to Step S126 whereat a difference (memory T1−memory T2) is stored in the memory ΔT.

Next, at Step S127 a zoom motion speed Zsp corresponding to the zoom ring rotation speed is calculated which is given by Zsp=(Zspmax×ΔTmin)/ΔT where Zspmax is a zoom motion maximum speed in the range of in-tracking state of the focus motor performing compensation operation at each focal length, and ΔTmin a time required to move by a half period of one gear tooth (a minimum time required to move by a half period of one gear tooth) to be determined from the gear tooth pitch of the zoom ring 112 and a rotation load during a maximum speed rotation given by a user.

Specifically, if the user rotates the zoom ring at a maximum speed (ΔTmin=ΔT), then Zsp=Zspmax and the zoom lens moves at the maximum speed at its focal length. The processes up to Step S127 determine the zoom lens motion speed corresponding to the zoom ring rotation speed.

If the interrupt number counter C0 does not indicate 0 at Step S124, the flow directly advances to Step S127 whereat the zoom lens motion speed is determined from the average rotation time per a half period of one gear tooth of the zoom ring 112 stored in the memory ΔT at Step S105 in FIG. 10.

The process routine from Step S128 is characteristic to this embodiment wherein the zoom lens motion direction relative to the zoom ring rotation direction is switched in accordance with a user set state. First, at Step S128 it is checked whether the ring flag is set to thereby judge whether the rotation direction of the zoom lens 112 is normal or reverse.

If the ring flag is set and the rotation state is normal, the flow advances to Step S129 whereat the state of the zoom direction selection switch 114 operated by the user is checked. If the switch state is "H", the zoom lens is moved toward the wide end at Step S131.

If the state of the switch 114 is "L", the zoom lens is moved toward the telephoto end in the direction opposite to Step S131 (Step S132).

If the rotation direction of the zoom ring 112 at Step S128 is reverse, the flow advances to Step S130 whereat the state of the zoom direction selection switch 114 is checked. In accordance with this checked results, the zoom lens is moved toward the telephoto or wide end. In the above case, as described earlier, the focus lens is also driven in order to correct the shift of the focus plane to be caused by the motion of the zoom lens.

After the completions of Steps S131, S132 and S135, the rotation flag is cleared at Step S136 to terminate all processes (Step S137).

Although the zoom ring motion speed to be set by the main body zoom key is not definitely described above, the motion speed set by the main body zoom key may be set to a predetermined fixed speed or to a variable speed if the zoom key is made of a volume or a multi-contact type volume whose output voltage changes with a user operation.

In the above embodiment, although the lens exchangeable system has been described, an image pickup apparatus with integrated lens unit and camera unit may also be used.

FIGS. 15A and 15B are block diagrams showing the structure of an image pickup apparatus according to the second embodiment of the invention. In the first embodiment, the zoom lens motion direction relative to the zoom ring rotation direction is changed by an external switch which a user operates upon. The zoom lens motion direction is not changed so often in practical use so that provision of such operation switches makes the apparatus complicated in structure.

In view of this, in the second embodiment, the zoom lens motion direction is made settable by a user by using a menu function which is often provided on conventional televisions, video cameras, video decks and the like.

In FIGS. 15A and 15B, reference numeral 216b represents a menu function control unit provided in a main body microcomputer 216. This unit controls a character generator 211 in accordance with a state of a menu setting operation switch 217 operated by a user to display a menu screen on an LCD 213.

Displayed on the menu screen are a plurality of photographing condition items (e.g., conditions of white balance, remote control reception, electric zooming, and the like) and setting conditions of each item (e.g., on and off for electric zooming). A user selects a desired item and sets its conditions.

The menu setting operation switch 217 provided for menu operation is constituted of a mode switch for turning on and off the menu function, a selection switch for selecting an item and its condition, and a switch for determining the selected contents. As a user operates upon these switches while viewing the menu screen, the menu controller 216b controls the display of the menu screen to make the user confirm the setting contents.

The features of this embodiment are the provision of a photographing condition item of the menu function "motion direction of zoom lens relative to the rotation direction of the zoom ring" and its setting condition "which is the zoom lens motion direction during the ring normal rotation, telephoto end direction or wide end direction". The user can select and set desired ones in the item and condition.

As the menu setting is completed, menu information of the zoom lens motion direction among the set menu item photographing conditions is transferred from the main body microcomputer 216 to the lens microcomputer 116. The lens microcomputer 116 has therein a rewritable non-volatile memory, EEPROM 116e whose contents are updated by the supplied menu information. While the zoom ring rotates, the zoom lens motion direction relative to the ring rotation direction is determined by referring to the data stored in EEPROM 116e.

Figure 16:
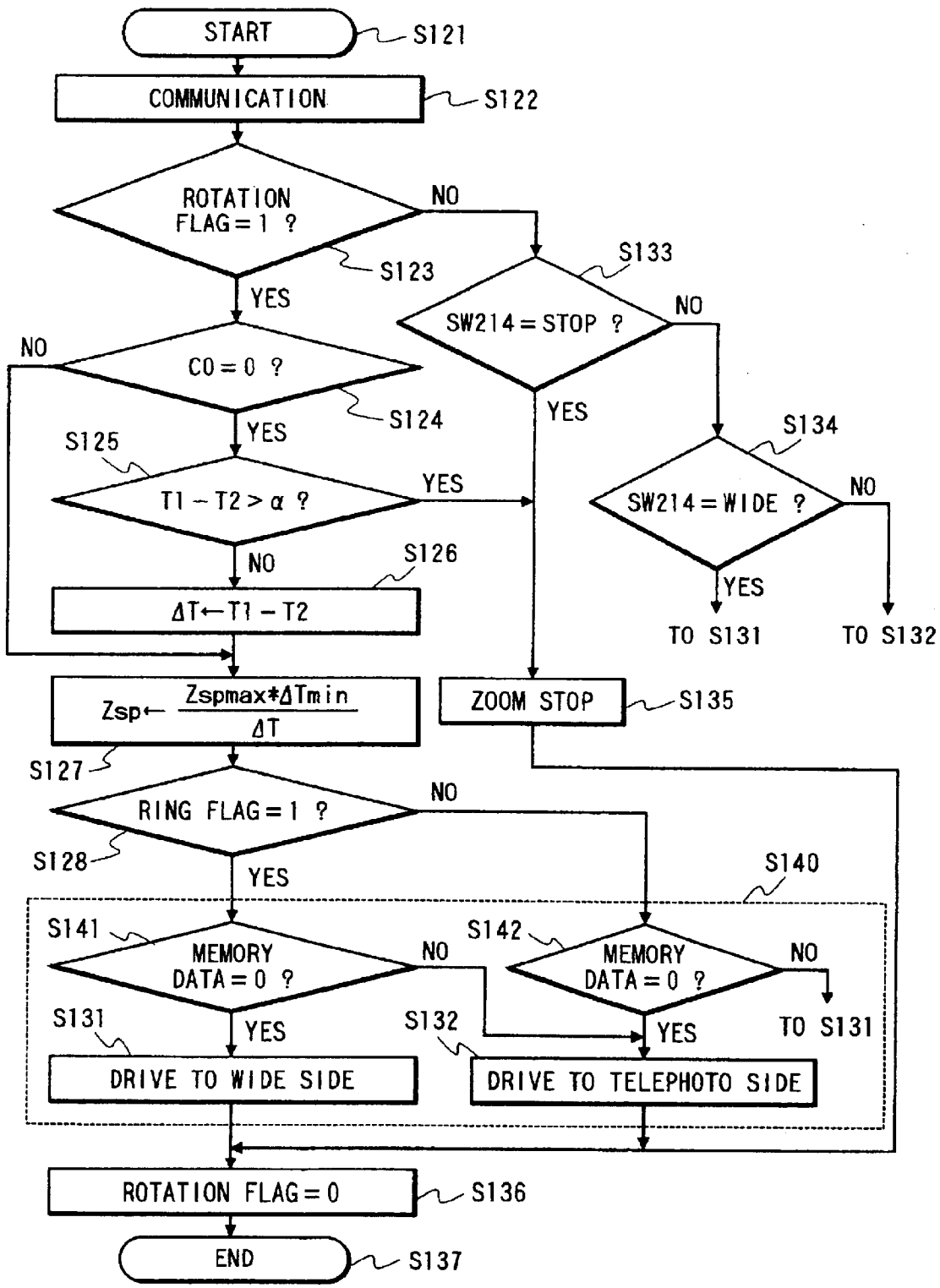
FIG. 16 is a flow chart illustrating a zooming operation by the image pickup apparatus of the second embodiment.

FIG. 16 is a flow chart illustrating the zooming operation to be executed by the lens microcomputer 116 with reference to the data in EEPROM 116e. In the flow chart shown in FIG. 16, step S138 of FIG. 11 encircled by a broken line is changed to Step S140 in FIG. 16. The other Steps are the same as FIG. 11 and affixed with the same step numbers as FIG. 11, and the detailed description thereof is omitted.

If it is judged that the zoom ring 112 is being rotated, the rotation detection of the zoom ring 112 is checked at Step S128 from the state of the ring flag determined at the process shown in FIG. 10. If it is judged that the ring flag is set and the rotation direction is normal, the flow advances to Step S141 whereat it is checked whether the contents of EEPROM 116e for storing the menu setting states have been cleared. This memory data is "0" if the menu setting operation has set "the ring normal rotation direction is toward the wide end", and "1" if the menu setting operation has set "the ring normal rotation direction is toward the telephoto end".

If the memory data is "0" at Step S141, the flow advances to Step S131 to drive the zoom lens toward the wide end, whereas if "1", the flow advances to Step S132 to drive the zoom lens toward the telephoto end.

If the rotation direction of the zoom ring 112 is reverse at Step S128, the memory data is checked at Step S142 and in accordance with this check results, the direction of driving the zoom lens is determined.

In the second embodiment, EEPROM 116e of the lens microcomputer 116 is used for storing menu information regarding the zoom motion direction. An EEPROM outside of the lens microcomputer may be used or a volatile memory, RAM may be used if the memory contents can be backed up.

Figure 17B:
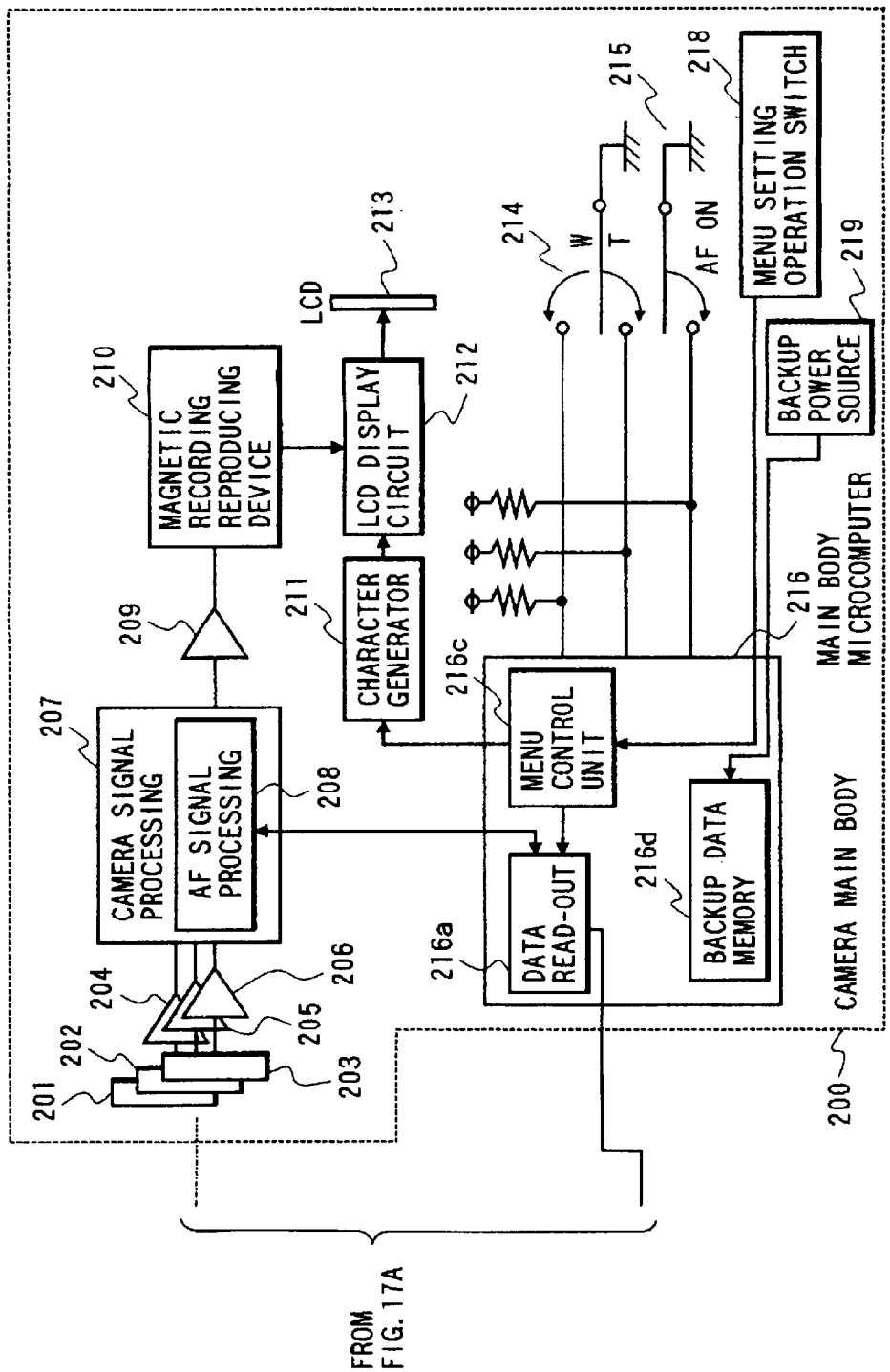
FIG. 17 comprised of FIGS. 17A and 17B, is a block diagram showing the structure of an image pickup apparatus according to a third embodiment of the invention.

FIGS. 17A and 17B are block diagrams showing the structure of an image pickup apparatus according to the third embodiment. In the second embodiment, menu setting information of the zoom lens motion direction relative to the zoom lens rotation direction is transferred from the camera main body 200 to the lens unit 100 and stored in a storage of the lens unit 100.

If the lens unit 100 is replaced by another lens unit, the stored menu setting information set by a user becomes invalid. In the third embodiment, the menu setting information of the zoom motion direction is stored on the camera main body 200 side, and the stored contents are transferred to the lens unit 100 to determine the zoom lens motion direction.

In FIGS. 17A and 17B, reference numeral 216c represents a menu function control unit provided in a main body microcomputer 216. This unit controls a character generator 211 in accordance with the operation state of a menu setting operation switch 218 operated by a user to display a menu screen on an LCD 213.

As the menu setting is completed, the setting information is stored in a back-up data memory 216d in the main body microcomputer 216.

The memory 216d is powered by a back-up power supply 219 such as a battery even when the system power is turned off so that it retains the menu setting information. Of various menu information pieces stored in the memory 216d, the information on the zoom motion direction is transferred to the lens microcomputer 116.

In accordance with the memory information received by the lens microcomputer 116, the zoom lens motion direction relative to the ring rotation direction is determined. In this case, the memory data stored at Steps S141 and S142 of FIG. 16 is stored on the camera main body 216 side. The operations to follow are the same as the second embodiment.

In this embodiment, the menu information on the zoom motion direction is stored in volatile storage means in the main body microcomputer 216 which means requires a back-up power supply. Another memory means outside of the main body microcomputer 216 may be used or a non-volatile EEPROM or the like may also be used.

As described so far, there are provided a ring member disposed concentrically about the lens optical axis and motion direction setting means allowing a user to set the motion direction of a magnification lens group relative to the rotation direction of the ring member to be operated upon by the user. Accordingly, it is possible for a user to optionally determine the motion direction of the magnification lens group relative to the rotation of the ring member. Inexpensive and fair manual zooming can therefore be realized which satisfies use purposes and user preference of the image pickup apparatus.

Further, the motion direction setting means for the magnification lens group is constituted of memory means for storing the motion direction, set by a user, of the magnification lens group relative to the rotation direction of the ring member and means for changing the motion direction of the magnification lens group in accordance with motion direction information stored in the memory means. Accordingly, complicated structure of the operation member can be avoided, and a simple and easy-to-use image pickup apparatus can be provided.

Still further, the lens unit is structured to be removable from the main body of the image pickup apparatus. Accordingly, various types of lens units can be used and versatile motion direction setting means can be realized.

The fourth embodiment of the invention will be described next. In this embodiment, the response characteristics of a magnification lens upon operation of an operation member of a ring member such as a zoom ring is made variable in order to improve operation performance.

As described earlier, in the inner focus type lens system, the operation amount of a zoom ring if used as manual zooming means can be correlated as desired to the motion amount of a magnification lens by a control system, because they are not mechanically fixed as in the case of the front lens focus type.

Specifically, the operation amount of a zoom ring if used as manual zooming means can be made correlated as desired to the motion amount of a magnification lens by a control system, because they are not mechanically fixed as in the case of the front lens focus type.

However, assuming that the correlation is set similar to the front lens focus type so that the operation amount of the zoom ring is constant over the whole zoom stroke from the wide end to telephoto end, the lens motion amount relative to the zoom lens operation amount is required to be set large in order to ensure the whole zoom stroke by a zoom ring rotation amount of about 120 degrees which angle is easy to use. In such a case, the angle of view changes greatly as the magnification lens starts moving, and the picked-up image becomes poor. Conversely, if a smooth start motion of the magnification lens is given a priority, the operation amount of the zoom ring required for the motion of the magnification lens becomes large so that the apparatus becomes something poor in its operation performance.

Figure 12:
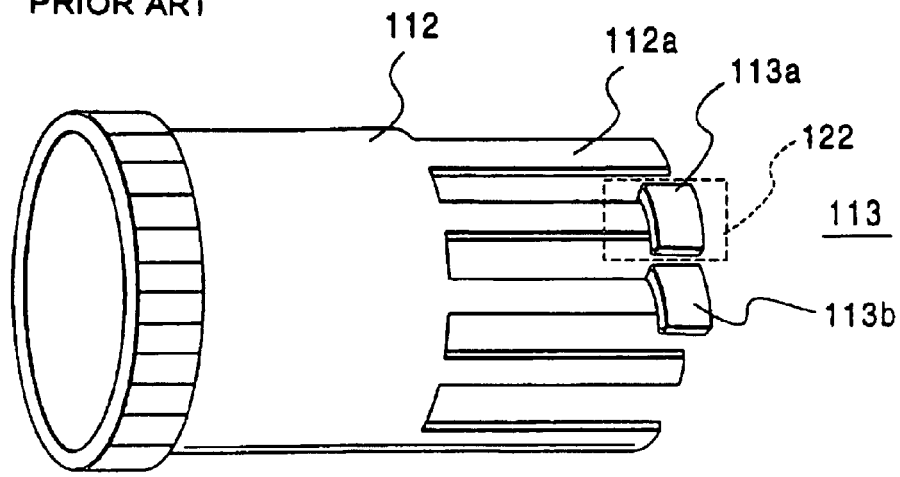
FIG. 12 is a perspective view showing the outline of a zoom ring.
Figure 13:
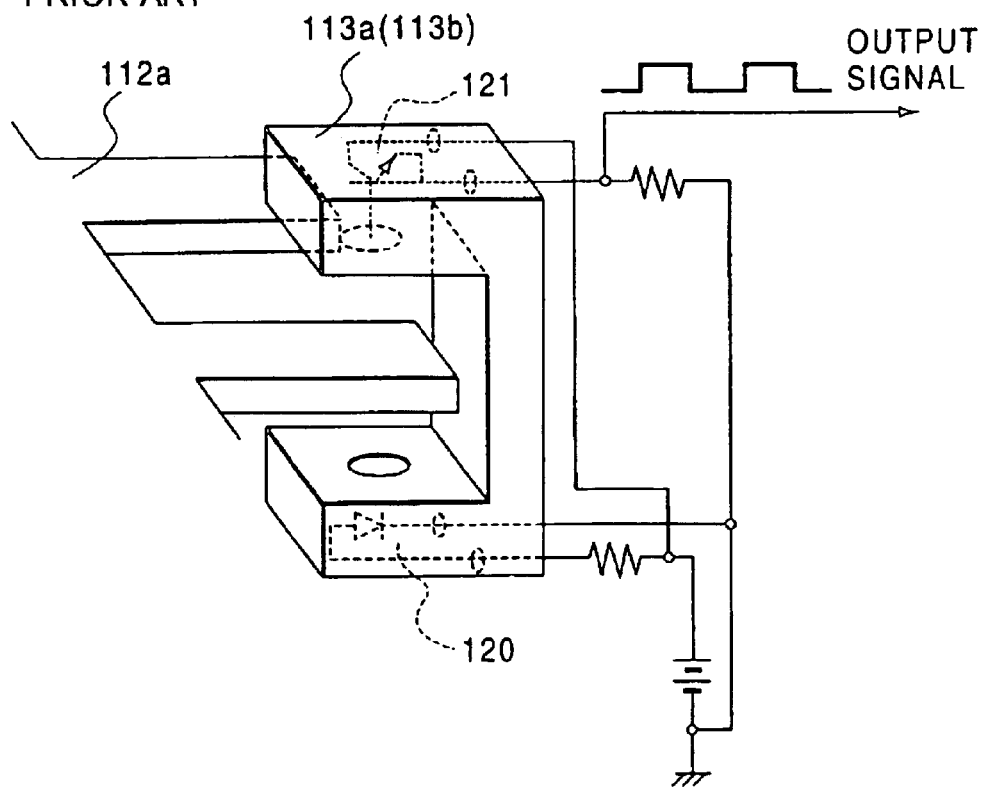
FIG. 13 is a diagram showing the details of a photodetector with light projector and light detector for detecting a rotation of the zoom ring.

In order to solve these contradictory disadvantages, it is necessary to increase a resolution of a rotation detection angle by reducing the pitch of the comb structure 112a shown in FIG. 12 or increase the diameter of the encoder 113 in order to detect even a small operation amount of the zoom ring and make the gentle motion of the magnification lens and make the motion start smooth. However, because of a limit in the mechanical structure, high cost, and inability of compacting the apparatus, the above countermeasure is practically difficult.

Depending upon the photographing conditions such as taking an image of a fast moving subject, the rotation angle of about 120 degrees of the zoom ring operation required for the whole zoom stroke motion is too large and it is difficult to follow the fast moving subject. Even if the zooming operation performance is set optimum for specific photographing conditions, it is difficult to satisfy all photographing conditions ensuring the fine zooming operation performance.

As a control method for realizing the magnification operation which provides a high fidelity relative to the zooming operation, it is known to determine the lens motion speed in accordance with the rotation speed of the zooming operation. Namely, while the zoom ring is operated slowly, zooming is performed at low speed, whereas while the zoom ring is operated fast, zooming is performed at high speed. This control method therefore determines the magnification lens motion speed in accordance with a linear or non-linear function or table data using the zooming operation rotation speed as a variable. If an exponential function is used, the magnification lens motion matches human senses so that the zooming performance, which realizes the zooming effects providing a high fidelity relative to a user zooming operation, can be realized.

If a linear function is used, the characteristics similar to the front lens focus system can be obtained. However, if the relationship between the zoom ring operation speed and the lens motion speed is non-linear, the operation amount of the zoom ring required for the magnification lens to move from the wide end to the telephoto end changes with the zoom ring operation speed. Even if the zoom ring is rotated right and thereafter it is rotated left by the same amount, the angles of view before and after the zoom ring operation become different if the zoom ring operation speeds are different during the right and left rotations. Therefore, for example, the same angle of view of the magnification lens before the zooming operation cannot be set again even if the zooming operation is reversed by the same amount. A user is therefore embarrassed.

The fourth embodiment is presented in order to solve the above problems and it is an object of this embodiment to provide an image pickup method and apparatus capable of satisfying fine operation performance and natural zooming effects.

It is another object of the embodiment to provide a storage medium storing control programs which can smoothly control the above image pickup apparatus.

In order to achieve these objects of the embodiments, detecting means detects a change amount caused by the rotation of a ring member disposed concentrically about a lens optical axis, and control means having a plurality of characteristics for determining the correlation between an output of the detecting means and a motion of a magnification lens, performs a motion/stop control of at least the magnification lens in the optical direction in accordance with an output of the detecting means.

Specifically, detecting means detects a change amount caused by the rotation of a ring member disposed concentrically about a lens optical axis, and control means having a plurality of characteristics settable by a user for determining the correlation between an output of the detecting means and a motion of a magnification lens, performs a motion/stop control of at least the magnification lens in the optical direction in accordance with an output of the detecting means.

The fourth embodiment will be described specifically.

The structure of the fourth embodiment is shown in FIGS. 18A and 18B. The hardware structure of this embodiment is the same as the first embodiment shown in FIGS. 6A and 6B. The different point resides in a zoom characteristic selection switch 117 provided on the lens unit side for changing the response characteristics of the zoom lens 102 relative to the operation of the zoom ring 112 in which the lens microcomputer 116 performs the zooming control to change the response characteristics of the zoom lens 102 relative to the operation of the zoom ring 112. The zooming response characteristics relative to the operation of the zoom ring 112 are stored in advance in the form of zooming control programs in the lens microcomputer 116 (in this embodiment, two types of zooming control). The zoom characteristic selection switch 117 selects one of the two zooming control types. Therefore, a user can operate the zoom characteristic selection switch 117 to set the zoom ring function which realizes the operation performance and response characteristics of user choice. The zoom ring function will be described later with reference to FIGS. 20 and 21.

Figure 19:
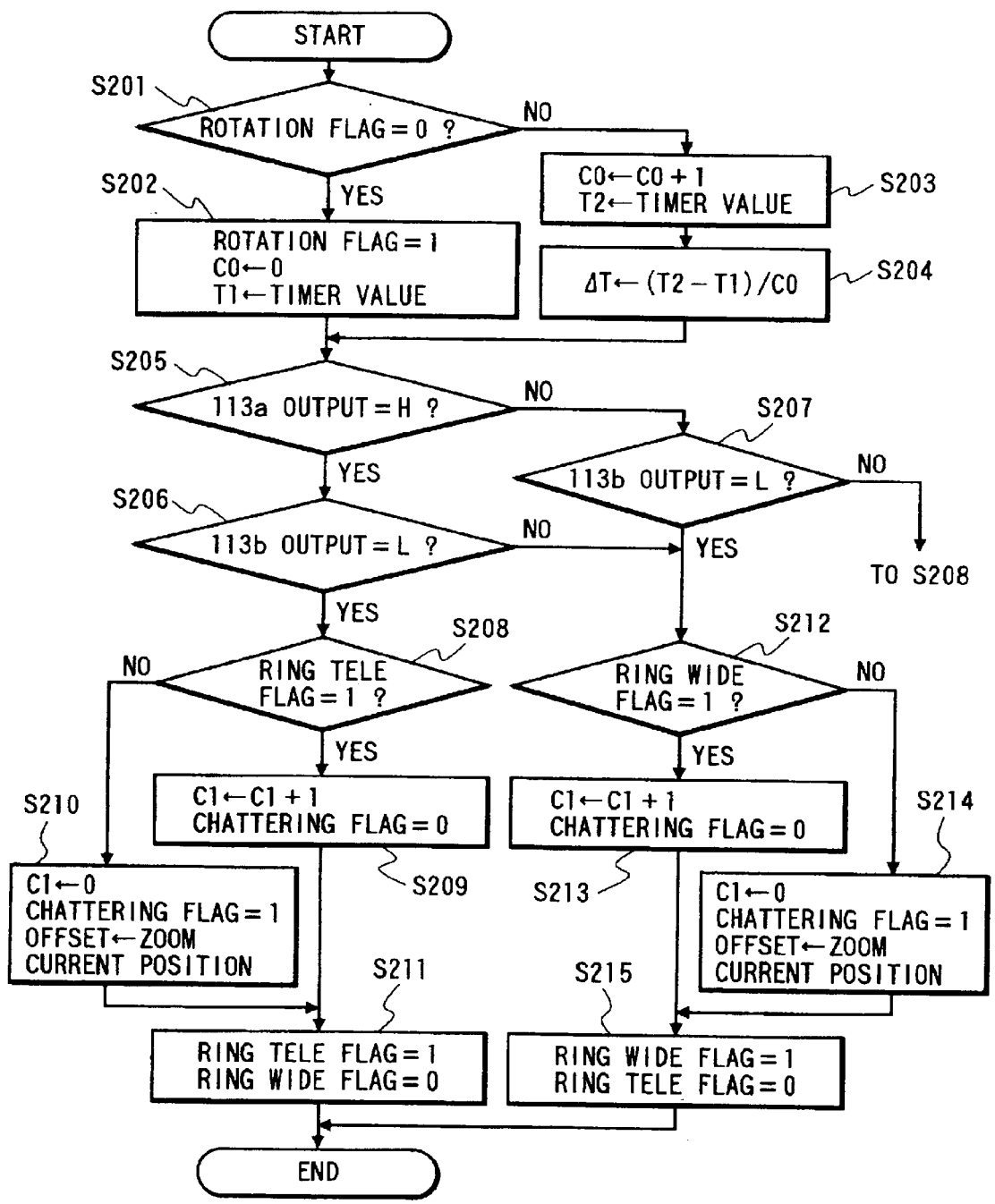
FIG. 19 is a flow chart illustrating the control sequence of a zoom ring rotation detecting operation according to the fourth embodiment of the invention.
Figure 20:
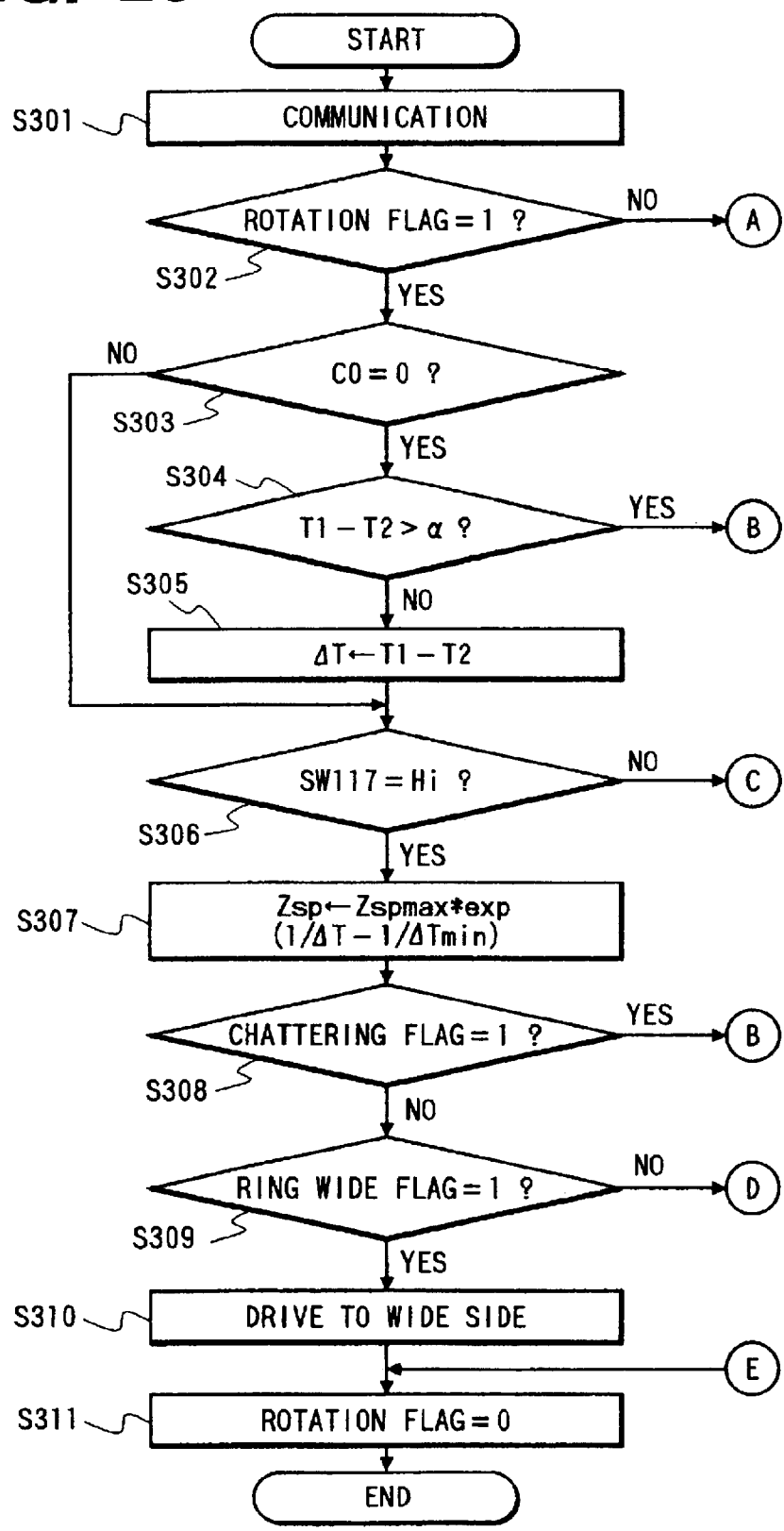
FIG. 20 is a flow chart illustrating the control sequence of a zooming operation according to the fourth embodiment of the invention.
Figure 21:
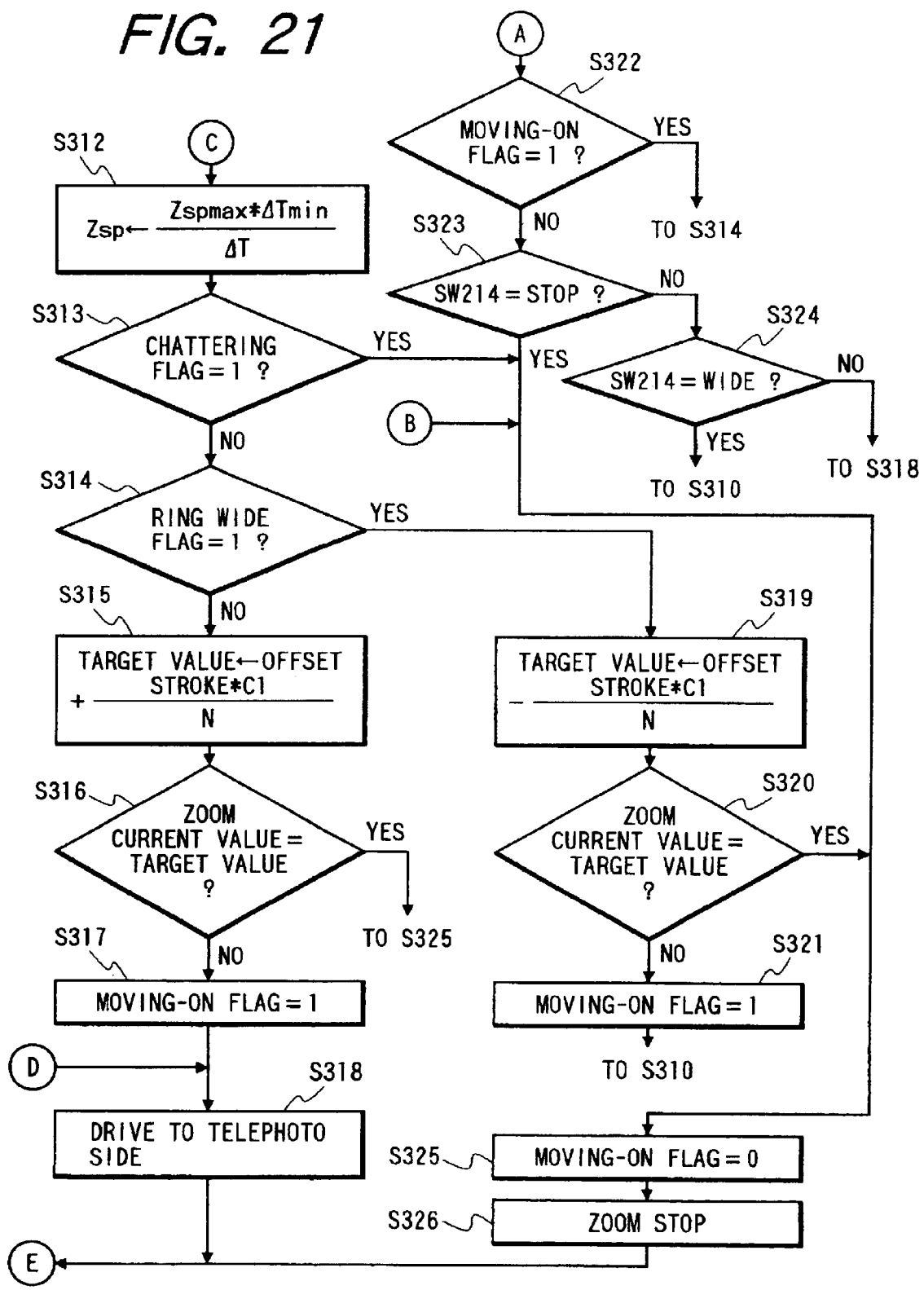
FIG. 21 is a flow chart illustrating the control sequence of a zooming operation according to the fourth embodiment of the invention.

The zooming control operations for a zoom ring operation having a plurality of characteristics and a method of selecting the characteristics by a user will be described with reference to FIGS. 19, 20 and 21. FIG. 19 is a flow chart illustrating the control sequence of a detection operation of rotation of the zoom lens 112 to be executed by the lens microcomputer 116, and FIGS. 20 and 21 are flow charts illustrating the control sequence of the zooming operation to be executed by the lens microcomputer 116.

The processes illustrated in FIG. 19 are an interrupt routine of the lens microcomputer 116 which detects a rotation direction of the zoom ring 112 and a time required for the zoom ring to move by a unit rotary angle. An interrupt is issued at the timing when the waveform of a voltage output from the ring encoder 113a, 113b transits. Namely, the interrupt routine shown in FIG. 19 is executed when the rising or falling edge, shown in FIG. 14A and 14B, of an output of the sensors 113a, 113b made of a light projector and a light detector is detected (whereas the processes shown in FIGS. 20 and 21 are executed synchronously with a vertical sync signal or the like).

As shown in FIG. 19, as the process starts upon reception of an interrupt, it is checked at Step S201 whether or not a "rotation flag" is "0". If "0", at Step S202 the "rotation flag" is set to "1", an interrupt number counter C0 is cleared, and a present timer value is set to a memory T1. The timer value is generally counted by a free running counter of the like built in a microcomputer or the like which counter counts frequency-divided system clocks of the microcomputer. The "rotation flag" is a flag indicating rotation of the zoom ring 112 which is used for the judgement of rotation of the zoom ring 112 during the processes shown in FIGS. 20 and 21 and is cleared (set to "0") after the processes of FIGS. 20 and 21. Namely, the "rotation flag" indicates whether there is any rotation of the zoom ring 112 during one vertical sync period which corresponds to the process cycle of FIGS. 20 and 21.

After the process of Step S202, it is checked at Step S205 whether the present interrupt is at the rising edge or falling edge of an output from one 113a of the ring encoder sensors (light projector and detector). If the rising edge, the flow advances to Step S206 whereat it is judged whether the output signal from the other encoder sensor 113b is "L" or not. If "L", the combination of the two outputs from the ring encoders 113a and 113b corresponds to the case shown in FIG. 14A so that a ring flag is set indicating the normal rotation direction of the zoom ring 112 (Step S208). If the output of the other ring encoder sensor 113b is "H" at Step S206, the combination of the two outputs corresponds to the case shown in FIG. 14B so that the ring flag is cleared indicating the reverse rotation direction (i.e., wide end direction) of the zoom ring 112 (Step S212). If at the process of Step S205 the interrupt is at the falling edge of an output of one 113a of the ring encoder sensors (light projector and detector), it is checked at Step S207 whether the output of the other ring encoder sensor 113b is "L". If "L", the flow advances to Step S212, whereas if "H", the flow advances to Step S208.

Since the rotation of the zoom ring 112 is detected for the first time, a ring telephoto flag and a ring wide flag both indicating the rotation of the zoom ring 112 are in an initial or clear state. If the rotation direction of the zoom ring 112 is normal, it is checked at Step S208 whether the ring telephoto flag is already set to "1". However, in this initial state, the ring telephoto flag is not still set and is "0", a rotation continuity counter C1 is cleared at Step S210, a chattering flag is set to "1", and the present position of the zoom lens 102 is stored in a memory OFFSET. Next, at Step S211 the ring telephoto flag is set to "1" and the ring wide flag is cleared to complete this routine.

If the rotation direction of the zoom ring 112 is reverse, it is checked at Step S212 whether the ring wide flag is already set to "1". However, in this initial state, the ring wide flag is not set and is "0", the process similar to Step S210 is executed at Step S214. Next, at Step S215 the ring wide flag is set to "1" and the ring telephoto flag is cleared to complete this routine.

If the zoom ring 112 continues to rotate prior to the "rotation flag" being cleared at the processes shown in FIGS. 20 and 21 and after the processes of FIG. 19, the interrupt routine of FIG. 19 is again executed. In this case, the "rotation flag" is already set to "1" at Step S201, and so the process from Step S203 starts. At Step S203, an interrupt number counter C0 is incremented and the present timer value is stored in a memory T2. Next, a difference (T2–T1) between the previous and present timer values is calculated at Step S204 and divided by the count of the interrupt number counter C0 to thereby obtain a time required for the comb structure of the zoom ring 112 to rotate by a half period. This time is stored in a memory ΔT and thereafter the flow advances to Step S205.

If the previous and present rotation directions of the zoom ring 112 are the same, the judgement process at Step S208 or Step S212 is executed. If this judgement result is affirmative (YES) at Step S208 or S212, the flow advances to Step S209 or S213. The process at Step S209 or S213 has the same process contents of incrementing the rotation continuity counter T1 and clearing the chattering flag. This rotation continuity counter C1 is a counter which indicates a continuity period of rotation of the zoom ring 112 in the same direction and therefore indicates the number of interrupts and the rotation amount of the zoom ring 112.

If the previous and present rotation directions of the zoom ring 112 are opposite, the judgement result at Step S208 or Step S212 is negative (NO), at Step S210 or S214 the rotation continuity counter C1 is cleared, the chattering flag is set to "1", and the contents of the memory OFFSET are renewed to the present position of the zoom lens 102. This process avoids chattering during the rotation of the zoom ring 112 in such a way that the chattering flag is not cleared unless the zoom ring 112 continues to rotate by two times in the same direction, i.e., unless the comb structure of the zoom ring 112 rotates by one period. This chattering flag is used for the judgement of whether the zoom lens 102 is permitted to be driven at the processes of FIGS. 20 and 21.

How the rotation continuity counter C1 and memory OFF-SET are used for the zooming control will be later detailed with reference to FIGS. 20 and 21.

If an interrupt is issued again while the "rotation flag" is maintained set to "1", at Steps S203 and S204 the interrupt number counter C0 is incremented so that (T2−T1) corresponds to a rotation time of one period of the comb structure and that the contents of the memory ΔT indicate an average time required for a half period rotation.

With the zoom ring rotation detection routine shown in FIG. 19, it is possible to obtain a same direction zoom ring rotation amount indicated by the count of the rotation continuity counter C1, an average rotation speed indicated by 1/ΔT, a zoom ring rotation direction indicated by the ring telephoto and wide flags, a presence/absence of an operation of the zoom ring indicated by the rotation flag, a presence/absence of chattering indicated by the chattering flag, and the like.

While the processes shown in FIG. 19 are executed during the rotation of the zoom ring 112, the processes shown in FIGS. 20 and 21 are executed synchronously with the vertical sync signal.

Referring to FIG. 20, as the processes start, at Step S301 the lens microcomputer 116 communicates with the main body microcomputer 216. The main body microcomputer 216 sends information on the zoom switch 214 and AF switch 215 and information on AF evaluation values and the like on the camera main body 200 side, as described previously. Next, in order to give priority to the operation of the zoom ring 112 on the lens unit 100 side, it is checked at Step S302 whether the rotation flag is set to "1". If the rotation flag is not set to "1" and the zoom ring operation is not performed, the flow advances to Step S322 of FIG. 21 to be described later. If the rotation flag is set to "1", i.e., if the zoom ring 112 was rotated during the previous one vertical sync period, then it is checked at Step S303 whether the interrupt number counter C0 is cleared or not. If cleared, at Step S304 it is judged whether the present rotation state of the zoom ring 112 is continuous low speed rotation or rotation start after rotation stop.

If the interrupt number counter C0 is cleared, it means that the zoom ring 112 does not still rotate a half period of the comb structure, and it is judged whether (T1−T2) is larger than a predetermined value α. During the continuous low speed rotation of the zoom ring 112 throughout the past several V sync periods, the timer value at the previous rotation (before about V sync periods) is stored in the memory T2 (Step S203 of FIG. 19) and the timer value at the present rotation (within one V sync period) is stored in the memory T1 (Step S202 of FIG. 19), so that the value (T1−T2) is relatively small. On the other hand, during the rotation start of the zoom ring 112 after rotation stop, the time when the previous memory T2 was updated is possibly before several tens V sync periods, so that the value (T1−T2) is large. Therefore, by checking the value (T1−T2), it becomes possible to discriminate between the states of the zoom ring 112 whether they are a rotation start after rotation stop or continuous low speed rotation. The value (T1−T2) during low speed rotation is determined from the relationship between the pitch of comb structures of the zoom ring 112 and the rotation speed of the zoom ring 112 given by a user. Therefore, the value α is determined based on the value (T1−T2).

If it is judged at Step S304 that the rotation of the zoom ring 112 is not continuous, the flow advances to Step S325 of FIG. 21 to be described later. On the other hand, if it is judged that the rotation of the zoom ring 112 is continuous, then at Step S305 the difference (T1−T2) is stored in the memory ΔT and the process at Step S306 is executed. If the interrupt number counter C0 is not cleared at Step S303, Steps S304 and S305 are skipped and the processes starting from Step S306 are executed by using ΔT (average rotation time per half period of the comb structure of the zoom ring 112) obtained at Step S204 shown in FIG. 19.

At Step S306 the state of the zoom characteristic selection switch 117 is detected, i.e., it is checked whether a detection signal is "H" or not. If the detection signal is "L", the flow advances to a control routine "constant lens motion amount per ring rotation angle" starting from Step S312 of FIG. 21, whereas if the detection signal is "H", the flow advances to a control routine "variable lens motion speed relative to ring rotation speed" starting from Step S307.

At Step S307, the motion speed Zsp of the zoom lens 102 is set by using as a variable an inverse of the average time ΔT, or 1/ΔT (corresponding to the rotation speed of the zoom ring 112), where ΔT is a time obtained at Step S204 and required for the zoom ring 112 to move by a half period of the comb structure. In this embodiment, the zoom speed Zsp is determined by using as a variable the ring rotation speed 1/ΔT and using an exponential function so as to obtain the zooming effects having high fidelity relative to the operation of the zoom ring 112 and matching human feelings. A calculation equation of the zoom speed Zsp is given by:

$$Zsp = Zsp\text{max} \times \exp(e/\Delta T - 1/\Delta T\text{min}) \quad (4)$$

where Zspmax is a maximum motion speed of the zoom lens 102 in the range of in-tracking state of the focus motor 110 performing compensation operation at each focal length, and ΔTmin a time required to move by a half period of the comb structure (a minimum time required to move by a half period of the comb structure) which time is determined from the gear tooth or comb pitch of the zoom ring 112 and a rotation load during a maximum speed rotation given by a user. Specifically, if the user rotates the zoom ring 112 at a maximum speed (ΔTmin=ΔT), then Zsp=Zspmax and the zoom lens moves at the maximum speed at its focal length. If the user rotates the zoom ring 112 at a very low speed, then 1/ΔT→0 and Zsp→Zspmax/exp(1/ΔTmin). However, since Zspmax<<exp(1/ΔTmin), Zsp→0.

Next, it is checked at Step S308 whether the chattering flag used at the process of FIG. 19 is set to "1". If set to "1", the flow advances to Step S325 of FIG. 21 to be described later, whereas if not set to "1", the flow advances to Step S309. It is checked at Step S309 whether the ring wide flag is set to "1". If not, the flow advances to Step S318 of FIG. 21 to be described later, whereas if set, the flow advances to Step S310. At this Step S310, the zoom lens 102 is moved toward the wide end, and at Step S311 the rotation flag is cleared to prepare for the rotation detection of the zoom ring 112 for the next one V sync period and terminate this routine.

If the signal of the zoom characteristic selection switch 117 detected at Step S306 is "L", the flow advances to the control routine "constant lens motion per ring rotary angle" starting from Step S312 of FIG. 21.

Referring to FIG. 21, first at Step S312 the motion speed Zsp of the zoom lens 102 is calculated similar to Step S307 of FIG. 20. Since the control routine illustrated by the processes from Step S312 assumes that (zoom motion amount/ring motion amount) is constant, the motion speed Zsp is calculated on the assumption that the zoom speed Zsp is also proportional to the ring rotation speed (1/ΔT). The calculation equation for this is given by:

$$Zsp-Zsp\max \times \Delta T\min/\Delta T \qquad (5)$$

where Zsp, Zspmax and ΔTmin are the same as defined above.

If a user moves the zoom ring 112 at a maximum speed (ΔTmin=ΔT), then Zsp=Zspmax and the zoom lens 102 moves at a maximum speed.

Next, it is checked at Step S313 whether the chattering flag is set to "1". If not, the flow advances to Step S325 to be described later, whereas if set to "1", the flow advances to Step S314. It is checked at Step S314 whether the ring wide flag is set to "1". If not, the flow advances to Step S315, whereas if set to "1", the flow advances to Step S319. At these Steps S315 and S319 the motion amount of the zoom lens 102 corresponding to the rotation amount of the zoom ring 112 is calculated, and the position of the moved zoom lens 102 is calculated as a target value. The calculation equation for the target zoom position is given by:

$$\text{Target value}=\text{OFFSET}+/-(\text{whole zoom stroke}/N)\times C1 \qquad (6)$$

where OFFSET is a zoom position counter value obtained by the process shown in FIG. 19 when the operation direction of the zoom ring 112 is switched, N is the number of interrupts (FIG. 19) at the rotary angle β of the zoom ring 112 required for the motion by the whole zoom stroke (the number of logical transitions of an output of the ring encoder sensor 113a which changes the output while the zoom ring 112 rotates by the rotary angle β), and C1 is a count value of the rotation continuity counter and indicates the number of interrupts at the same operation direction of the zoom ring 112.

The second term of the equation (6) corresponds therefore to a zoom motion amount of the zoom lens when the zoom ring 112 rotates by a rotary angle of β/N×C1 (a whole zoom stroke motion is at C1=N, in this case the rotary angle of the zoom ring 112 is β). This zoom motion amount is added to or subtracted from the zoom position counter value (=OFFSET) when the zoom ring 102 starts rotating in the same direction to thereby calculate the target zoom position counter value. In this embodiment, it is assumed that the zoom position counter value increases as the zoom lens 102 moves toward the telephoto end, and decreases as it moves toward the wide end (Steps S315 and S319). The rotation angle β of the zoom lens 120 required for the whole zoom stroke is preferably about 120 degrees from the viewpoint of operation performance. In this case, N in the equation (6) corresponds to the number of transitions of the comb structure of the zoom ring 112 in the radial range of about 120 degrees.

If the ring wide flag is cleared at Step S314, the zoom target position is calculated from the equation (6) at Step S315. It is then checked at Step S316 whether the present zoom position is at the target position. If at the target position, the flow advances to Step S325 to be described later, whereas if not, the flow advances to Step S317. At this Step S317 a moving-on flag is set to "1", and at Step S318 the zoom ring 112 is driven toward the telephoto end at the zoom speed of Zsp obtained at Step S312. Thereafter, the flow advances to Step S311 of FIG. 20.

If the ring wide flag is set to "1" at Step S314, the zoom target position is calculated at Step S319 through addition in the equation (6). It is then checked at Step S320 whether the present zoom position is at the target position. If at the target position, the flow advances to Step S325 to be described later, whereas if not, the flow advances to Step S321. At this Step S321 the moving-on flag is set to "1" and thereafter the flow advances to Step S310 of FIG. 21. Since the focal plane is necessary to be corrected as the zoom lens 102 moves, the focus lens 105 is also driven as described previously.

The control routine "constant motion amount of zoom lens 102 per rotary angle of zoom ring 120" at the processes from Step S312 allows the zoom lens 102 to move by always updating the target position during the operation of the zoom ring 112 in the same direction. Therefore, even if the operation of the zoom ring 112 is suspended before the zoom position reaches the target position, it is necessary for the zoom lens to move toward the target position. For this purpose, the moving-on flag is used which indicates whether the zoom lens is moving toward the target position or it is already at the target position. If the moving-on flag is set, i.e., if the motion of the zoom ring 112 is suspended before the zoom position reaches the target position, the processes shown in FIG. 19 are not executed so that the rotation continuity counter C1, ring flag and the like are not updated and the target position and drive direction are maintained stored.

Step S322 of FIG. 21 is a process for allowing the zoom lens to continuously move toward the target position even if the motion of the zoom ring 120 is stopped. Specifically, it is checked at Step S322 whether the moving-on flag is set to "1". If set to "1", the flow advances to Step S314, whereas if not, the flow advances to Step S323. It is checked at this Step S323 whether the zoom switch 214 is not operated. If not operated, the moving-on flag is cleared at Step S325 and at the next Step S326 the motion of the zoom lens 102 is stopped to advance to Step S311 of FIG. 20. If the zoom switch 214 is operated, the operation state of the zoom switch 214 is checked at Step S324. In accordance with the operation state, the flow advances to Step S310 or S318 whereat while the zoom lens is moved, the focus lens is subjected to the compensation operation by the previously-described cam locus tracing method.

If the moving-on flag is set to "1" at Step S322, the processes starting from Step S314 are executed to drive the zoom lens to the target position. With these processes, even if the operation of the zoom ring 112 is stopped, the zoom lens 102 can be moved continuously. In this case, a time lag between these processes is not short so that a user does not feel unnatural.

Although the zoom motion speed set by the zoom switch (zoom key) 214 is not definitely described above, the zoom motion speed may be set to a predetermined fixed speed or to a variable speed if the zoom switch is made of a volume or a multi-contact type volume whose output voltage changes with a user operation.

In the above embodiment, although the lens exchangeable system has been described, an image pickup apparatus with integrated lens unit and camera unit may also be used.

In the above embodiment, two types of zoom response characteristics are described for the operation of the zoom ring 112. A plurality type of zoom response characteristics may be used and any one or a combination of the zoom response characteristics may be selected.

As described in detail, by executing the routines of FIGS. 20 and 21, two types of zoom response characteristics can be obtained when the same zoom ring 112 is used so that optimum and fine zoom operation performance matching each user and photographing scene can be achieved.

Next, the fifth embodiment of the invention will be described (with reference to FIGS. 15A and 15B). In the fourth embodiment, the response characteristics of the motion of the zoom lens 102 relative to the operation of the zoom ring 112 is set by an external switch which a user operates upon. The response characteristics are not changed so often in practical use so that provision of such operation switches makes the apparatus complicated in structure. In view of this, in the fifth embodiment, the zoom response characteristics relative to the operation of the zoom ring 112 is made settable by a user by using a menu function which is often provided on conventional televisions, video cameras, video decks and the like.

The hardware structure of an image pickup apparatus of the fifth embodiment is similar to the second embodiment shown in FIGS. 15A and 15B which is referred to in the following description. The different points of the fifth embodiment from the structure of FIGS. 18A and 18B are that the zoom characteristic selection switch 117 of FIG. 18A is not used, a rewritable non-volatile memory EEPROM 116e is added to the lens microcomputer 116, a menu setting operation switch 217 is added to the camera main body 200, and a menu function control unit 216b is added to the main body microcomputer 216.

In FIGS. 15A and 15B, in accordance with the operation state of the menu setting operation switch 217 operated by a user, the character generator 211 is controlled to display a menu screen on the LCD 213. Displayed on the menu screen are a plurality of photographing condition items (e.g., conditions of white balance, remote control reception, electric zooming, and the like) and setting conditions of each item (e.g., on and off for electric zooming). A user selects a desired item and sets its conditions. The menu setting operation switch 217 provided for menu operation is constituted of a mode switch for turning on and off the menu function, a selection switch for selecting an item and its condition, and a switch for determining the selected contents. As a user operates upon these switches while viewing the menu screen, the menu function controller 216b controls the display of the menu screen to make the user confirm the setting contents.

The features of this embodiment are the provision of a photographing condition item of the menu function "zoom response characteristics relative to the operation of zoom ring" and its setting condition "zoom ring rotation speed priority/zoom ring motion amount priority" as to either "variable lens motion speed relative to zoom ring rotation speed" or "constant lens motion amount per zoom ring rotary angle". The user can select and set desired ones of these.

As the menu setting is completed, menu information of the response characteristics of the zoom lens 102 among the set menu item photographing conditions is transferred from the main body microcomputer 216 to the lens microcomputer 116. The lens microcomputer 116 has therein a rewritable non-volatile memory, EEPROM 116e whose contents are updated by the supplied menu information. While the zoom ring 112 rotates, the zoom characteristics are determined by referring to the data stored in the non-volatile memory 116e to perform the zooming operation. As the flow chart for this zooming operation, the judgement process at Step S306 of FIG. 20 is changed to a judgement process which branches in accordance with the contents of the non-volatile memory 116e of the lens microcomputer 116.

In the fifth embodiment, the non-volatile memory 116e of the lens microcomputer 116 is used for storing menu information regarding the zoom response characteristics. A non-volatile memory outside of the lens microcomputer 116 may be used or a volatile memory, RAM may be used if the memory contents can be backed up.

Next, the sixth embodiment of the invention will be described. The structure of this embodiment is similar to that of the third embodiment shown in FIGS. 17A and 17B which are referred to in the following description. In the fifth embodiment, the response characteristics of the motion of the zoom lens 102 relative to the operation of the zoom ring 112 set by a user is transferred from the camera main body 200 to the lens unit 100 and stored in the non-volatile memory 116e of the lens unit 100. If the lens unit 100 is replaced by another lens unit, the stored menu setting information set by a user becomes invalid. In the sixth embodiment, the menu setting information of the zoom motion direction is stored on the camera main body 200 side, and the stored contents are transferred to the lens unit 100 to determine the response characteristics of the zoom lens 102.

The different points of the sixth embodiment from the fifth embodiment are that the non-volatile memory 116e of the lens microcomputer 116 shown in FIG. 15A is deleted, a back-up power source is added to the camera main body 200, and a back-up memory is added to the main body microcomputer 216.

In accordance with the operation state of the menu setting operation switch 217 operated by a user, the character generator 211 is controlled to display a menu screen on the LCD 213. As the menu setting information is entered, this information is stored in the back-up memory. This back-up data memory is powered by the back-up power source even if the system power is turned off to retain the menu setting information. Of various menu information pieces stored in the back-up data memory, the response characteristic information relative to the zoom ring 112 is transferred to the lens microcomputer 116. In accordance with the received memory contents, the lens microcomputer 116 performs the zooming operation matching the zoom response characteristics. In this case, the judgement process at Step S306 of FIG. 20 is changed to a judgement process which branches in accordance with the contents of the back-up data memory on the camera main body 200 side supplied from the main body microcomputer 216 to the lens microcomputer 116.

In the sixth embodiment, the zoom response characteristics are stored in the volatile back-up data memory of the main body microcomputer 216 which requires the back-up power source. The zoom response characteristics may be stored in a memory outside of the main microcomputer 116 or in a non-volatile memory such as EEPROM.

Next, the seventh embodiment of the invention will be described with reference to FIGS. 22A and 22B. In the fourth to sixth embodiments described above, the response characteristics of the motion of the zoom lens 102 relative to the operation of the zoom ring 112 are set by a user in accordance with photographing scenes and user preferences. In this seventh embodiment, optimum zoom lens response characteristics are automatically set in accordance with photographing scenes. In the following, recording operation and recording standby operation will be described by way of example.

Figures 22, 22A:
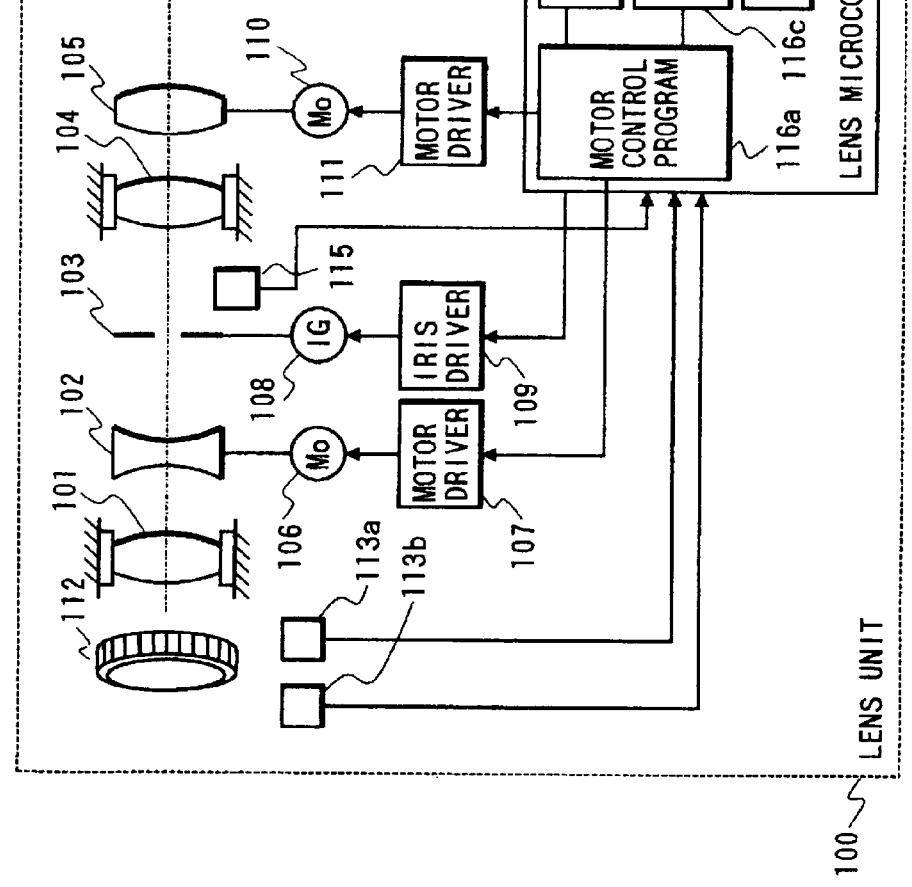
FIG. 22 comprised of FIGS. 22A and 22B, is a block diagram showing the structure of an image pickup apparatus according to a sixth embodiment of the invention.

FIGS. 22A and 22B are block diagrams showing the structure of an image pickup apparatus of the seventh embodiment. In FIGS. 22A and 22B, like elements to those of the above-described embodiments are represented by using identical reference numerals. In the structure shown in FIGS. 22A and 22B, the zoom characteristic selection switch shown in FIGS. 18A and 18B is removed, and an REC switch unit 220 is added to the camera main body 200. The REC switch unit 220 selects one of recording and recording standby states.

In FIGS. 22A and 22B, in accordance with the selection state by the REC switch unit 220, the main body microcomputer 216 sends in a toggle manner an operation execution command representative of either a recording state or a recording standby state to the magnetic recording/ reproducing device 210. Record state information is supplied from the main body microcomputer 216 to the lens microcomputer 116. In accordance with this record state information, for example, in accordance with the recording standby state information, the lens microcomputer 116 selects the zoom response characteristics "constant lens motion amount per zoom ring rotary angle" in order to smoothly set an angle of view. This is because an angle of view can be quickly set without unnatural feelings of operation such as in the case of resetting an angle of view, if the zoom ring operation amount is in one-to-one correspondence with the zoom lens motion amount as in the case of the zoom ring of a front lens focus system.

If the record state information indicates the recording state, the zoom response characteristics "variable lens motion speed relative to zoom ring rotation speed" are selected. This is because the user intention of operating the zoom ring 112 for providing particular scene effects can be reliably reproduced if the zoom response characteristics are made to match the operation of the zoom ring 112 and operation feelings with high fidelity. Such selection of the zoom characteristics in accordance with the operation state can be easily realized by changing the judgement process at Step S306 of FIG. 20 to a judgement process which branches in accordance with the recording state information supplied from the main body microcomputer 216 to the lens microcomputer 116.

In this embodiment, although the zoom response characteristics are changed in accordance with the record state, they may be changed in accordance with a photographing mode setting function (so-called program mode function generally used by video camera and still cameras). For example, if a manual mode of the program mode is selected in order for a user to select desired photographing conditions, even a fine operation of the zoom ring 112 is considered not to be inadvertent touch by the user but to be intentionally performed by the user. In such a case, the zoom response characteristics are desired to smoothly respond to such fine operation of the zoom ring 112.

In contrast, in the automatic mode, it is desired to set the characteristics such that the zoom operation is not executed for a fine operation of the zoom ring 112 by considering it as erroneous touch by a user. In a so-called "sport mode", for example, which is a photographing mode of a fast subject motion in which electronic shutters for controlling accumulation times of image pickup elements 201 to 203 are set to high speed priority to obtain excellent motion picture resolution, a good angle of view can be set by setting the characteristics "constant lens motion amount per zoom ring rotary angle" and the zoom ring rotation angle required for the whole zoom stroke shorter than normal, because a fast subject motion can be followed with good response and the feelings of manual operation of the zoom ring 112 match the actual zooming operation. In order to achieve this, the constant N at Steps S315 and S319 of FIG. 21 is set large to reduce the rotary angle of the zoom ring required for the motion of the whole zoom stroke (e.g., if N→N/2, then the rotary angle becomes β→β/2).

Figure 23:
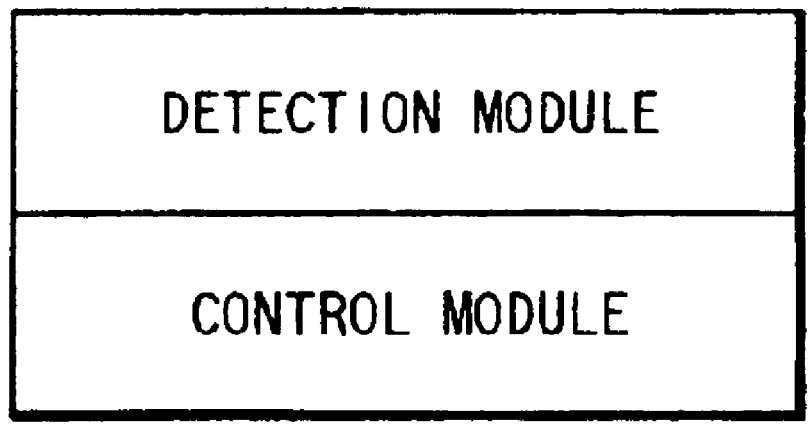
FIG. 23 is a diagram showing the data structure of a storage medium which stores respective control programs for the image pickup apparatus of this invention.

Next, a storage medium used by an image pickup apparatus and method according to the eighth embodiment of the invention will be described with reference to FIG. 23. A storage medium for storing control programs which control the image pickup apparatus of the above embodiments, stores program codes of at least "detection module" and "control module" shown in FIG. 23.

The "detection module" is a program module for detecting a change amount caused by rotation of a ring member (zoom ring) disposed concentrically about the lens optical axis. The "control module" is a program module for controlling motion/stop of at least a magnification lens (zoom lens) along the optical axis direction in accordance with the detection output by using control means (lens microcomputer) having a plurality of characteristics which determine the correlation between the detection output and a motion amount of the magnification lens.

As described in detail, the control means is provided with a plurality of characteristics for determining the correlation between the motion amount of the magnification lens and the detected change amount caused by the ring member disposed concentrically about the lens optical axis. Accordingly, fine zooming operation performance reflecting user intention can be realized without changing the pitch and size of a comb structure of the ring member and without raising cost and making the apparatus bulky and heavy.

The characteristics of the control means include the zoom response characteristics "constant magnification lens motion amount per unit ring member rotary angle" and "variable magnification lens motion speed relative to rotation speed of ring member". By setting the characteristics that "the lens can be moved over the whole zoom stroke by a predetermined ring operation angle" for the position alignment of the angle of view, it is possible to take the advantage of a mechanically cooperated zoom ring. By setting the characteristics that "enable the zooming effects matching user feelings and having high fidelity with a user operation of the ring member", it is possible to prevent a quick change in the angle of view at the zoom start and eliminate the disadvantage of the mechanically cooperated zoom ring.

By properly selecting one of these two characteristics, it is possible to realize optimum ring operation performance matching photographing scenes and user preference.

By providing means for automatically selecting one of a plurality of control characteristics in accordance with photographing conditions without manual user selection, it is possible to eliminate cumbersome works of characteristics selection during photographing.

By providing means for automatically selecting the plurality of control characteristics according to photographing conditions, trouble caused by switching of the control characteristics can be avoided during photographing.

By adding, to a plurality of characteristics of the control means, the characteristics that the motion amount of the magnification lens per unit rotary angle of the ring member is changed from a first predetermined value to a second predetermined value, it is possible to change the zooming operation response characteristics relative to the ring operation. Therefore, even under the photographing conditions such as a sport mode or the like in which a fast moving subject, which otherwise cannot be followed by a normal zoom response characteristics, can be photographed with quick zooming operation and without fail.

Next, the ninth embodiment of the invention will be described. In this embodiment, in a lens control system in which a ring member and a lens are not mechanically coupled and the rotation amount of the ring member is electronically detected to drive the lens, the operation feeling and performance of the lens control system are optimized.

This description of this embodiment including its background will be given sequentially in the following.

As described earlier, in the manual zoom lens system of a front lens focus system, the motion amount of a magnification lens relative to the operation amount of a zoom ring is mechanically fixed. Therefore, if the operation amount of the zoom ring required for the movement from the wide end to the telephoto end is given priority, the motion of the magnification lens becomes sensitive to the operation of the zoom ring so that the angle of view changes quick at the motion start of the magnification lens and the picked-up image quality is poor. Conversely, if the smooth motion start is given priority, the motion amount of the zoom ring required for the motion of the magnification lens becomes large and the apparatus becomes not easy to use.

During electric zooming of a front lens focus type or zooming of an inner focus type (also electric zooming even if the zoom ring is manually operated), a user is not certain as to the operation amount of the zoom operation member to make the magnification lens start moving. Therefore, it often happens that the magnification lens does not move although a user wants to move it, or the angle of view changes abruptly although a user wants to change it slowly, and the user loses a shutter chance.

Particularly in the case of a lens exchangeable type camera, a user holds the camera at the lens unit so that if the user touches even a little the zoom operation member mounted on the lens unit, the zoom lens moves. If a play of motion of the zoom operation member is increased in order to solve the above problem or the load is increased, fine tuning becomes difficult.

Furthermore, if the zoom ring 112 shown in FIG. 12 is rotated slowly in the range of one half period of the comb structure 112a, the output waveforms of the encoders 113a and 113b do not change so that it is erroneously judged in some cases that the zoom ring 112 is not operated.

In such case, the magnification lens repeats to stop and move at timings of transitions of the encoder output waveforms. Therefore, a zoomed image on the display screen changes stepwise and becomes unnatural, and it may become necessary to rotate the zoom ring 112 several times in order to move it from the telephoto end to the wide end.

Intention of zooming by a user may differ depending upon photographing scenes. For example, during the recording standby state, the angle of view is desired to be set at high speed, whereas during the recording state, the operation of the zoom operation member is desired to be reflected upon the zooming operation with high fidelity at variable zooming speed starting from ultra low speed, in order to provide user specific zooming effects of drawing.

However, in a conventional front lens focus type camera, the motions of the zoom operation member and the zoom lens are mechanically fixed and various requirements of a user cannot be satisfied. Even for a conventional inner focus type camera, zooming operation satisfying such requirements is very difficult to be performed.

This embodiment is made in consideration of the above problems and aims at providing fine operation performance and natural zooming effects by realizing smooth zooming operation start and reliable stop.

The embodiment to be described hereinunder discloses an image pickup apparatus having a ring member disposed concentrically about the optical axis of a lens unit, detection means for detecting a change amount caused by rotation of the ring member, and control means for controlling motion/stop of at least a magnification lens group along the optical axis, wherein inhibition means is provided for inhibiting the motion of the magnification lens group for a predetermined period even after the ring member stops.

According to this embodiment, an image pickup apparatus is disclosed which has a ring member disposed concentrically about the optical axis of a lens unit, detection means for detecting a change amount caused by rotation of the ring member, and control means for determining motion speed and direction of a magnification lens group in accordance with an output of the detection means and controlling motion/stop of the magnification lens group along the optical axis, wherein change means is provided for changing the response characteristics of the motion of the magnification lens group relative to an output of the detection means between the motion start state and the moving-on state of the magnification lens group.

According to this embodiment, an image pickup apparatus is disclosed which has a ring member disposed concentrically about the optical axis of a lens unit, detection means for detecting a change amount caused by rotation of the ring member, and control means for determining motion speed and direction of a magnification lens group in accordance with an output of the detection means and controlling motion/stop of the magnification lens group along the optical axis, wherein change means is provided for changing the response characteristics of the motion of the magnification lens group relative to an output of the detection means in accordance with the photographing conditions.

The hardware structure of this embodiment is included, for example, in the structure shown in FIG. 22 and so it is not particularly shown in drawings. In this embodiment, the operation of the zoom lens relative to the operation of the zoom ring is controlled by executing programs stored in the lens microcomputer 116.

A method of smoothly starting the zoom operation by a zoom ring and ensuring smooth zooming operation even by a slow motion of the zoom ring, will be described with reference to the flow chart shown in FIGS. 24A and 24B.

The process of detecting rotation of the zoom ring 112 to be executed by the lens microcomputer 116 is the same as shown in the flow chart of FIG. 10. The flow chart of FIGS. 24A and 24B illustrates the zooming operation by the lens microcomputer 116.

As described already, the processes illustrated in FIG. 10 correspond to an interrupt routine to be executed by the lens microcomputer 116 to detect a rotation direction of the zoom ring 112 and a time required for the zoom ring 112 to move by a unit rotary angle. An interrupt is issued at the timing when the waveform of a voltage output from the ring rotation detection encoder sensor 113a transits. Namely, as described already the interrupt routine shown in FIG. 10 is executed when the rising or falling edge, shown in FIGS. 14A and 14B, of an output of the ring rotation detection encoder sensors 113a, 113b is detected, whereas the processes shown in FIGS. 24A and 24B are executed synchronously with a vertical sync signal.

As shown in FIG. 10, the interrupt process starts at Step S101. It is checked at Step S102 whether or not the "rotation flag" is "0". If "0" or clear, at Step S103 the "rotation flag" is set, the interrupt number counter C0 and a wait time counter C1 are cleared, and a present timer value is set to the memory T1.

Figure 24A:
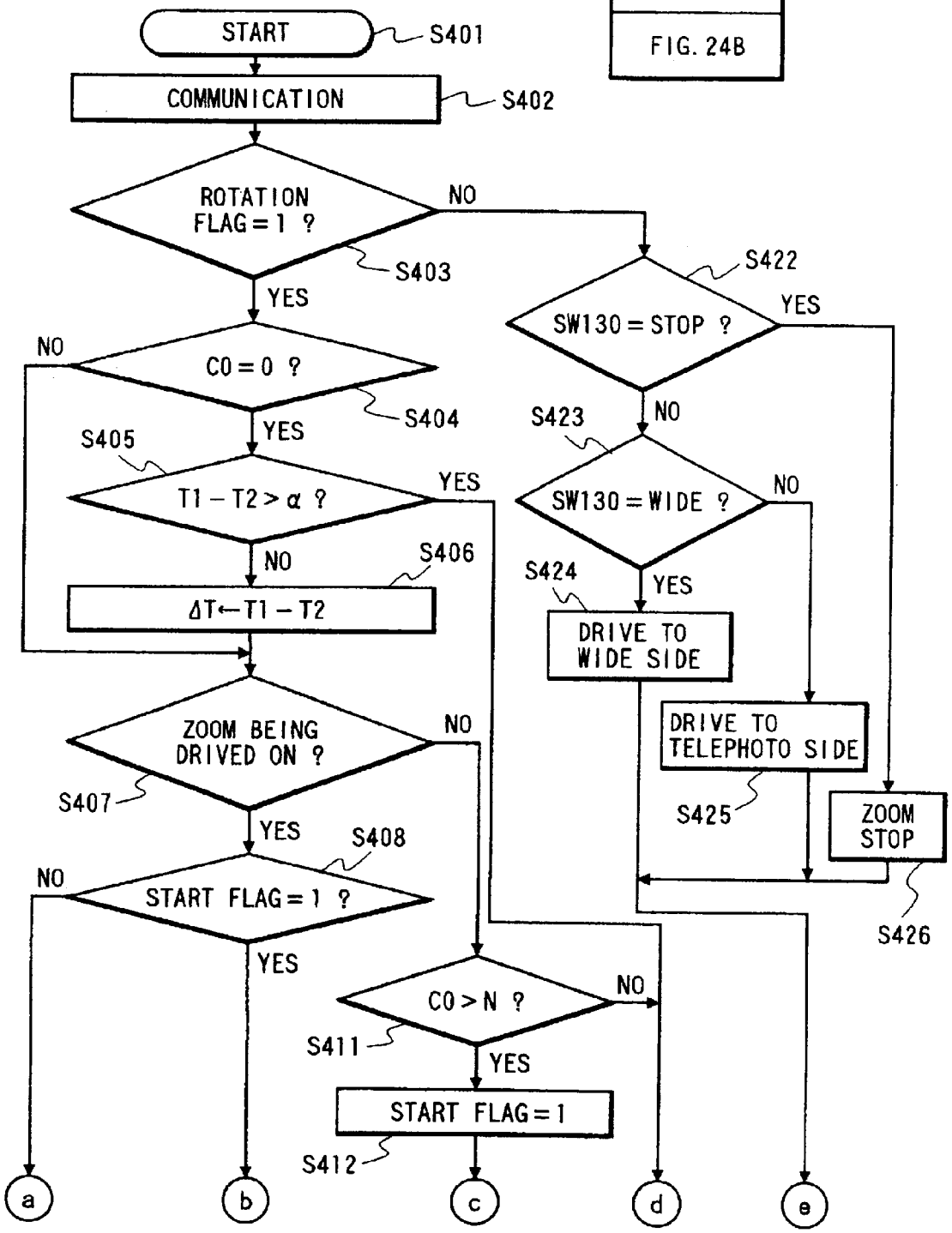
FIG. 24 comprised of FIGS. 24A and 24B, is a flow chart illustrating a zooming operation according to a ninth embodiment of the invention.
Figure 24:
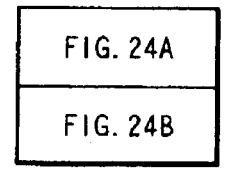
Figure 24B:
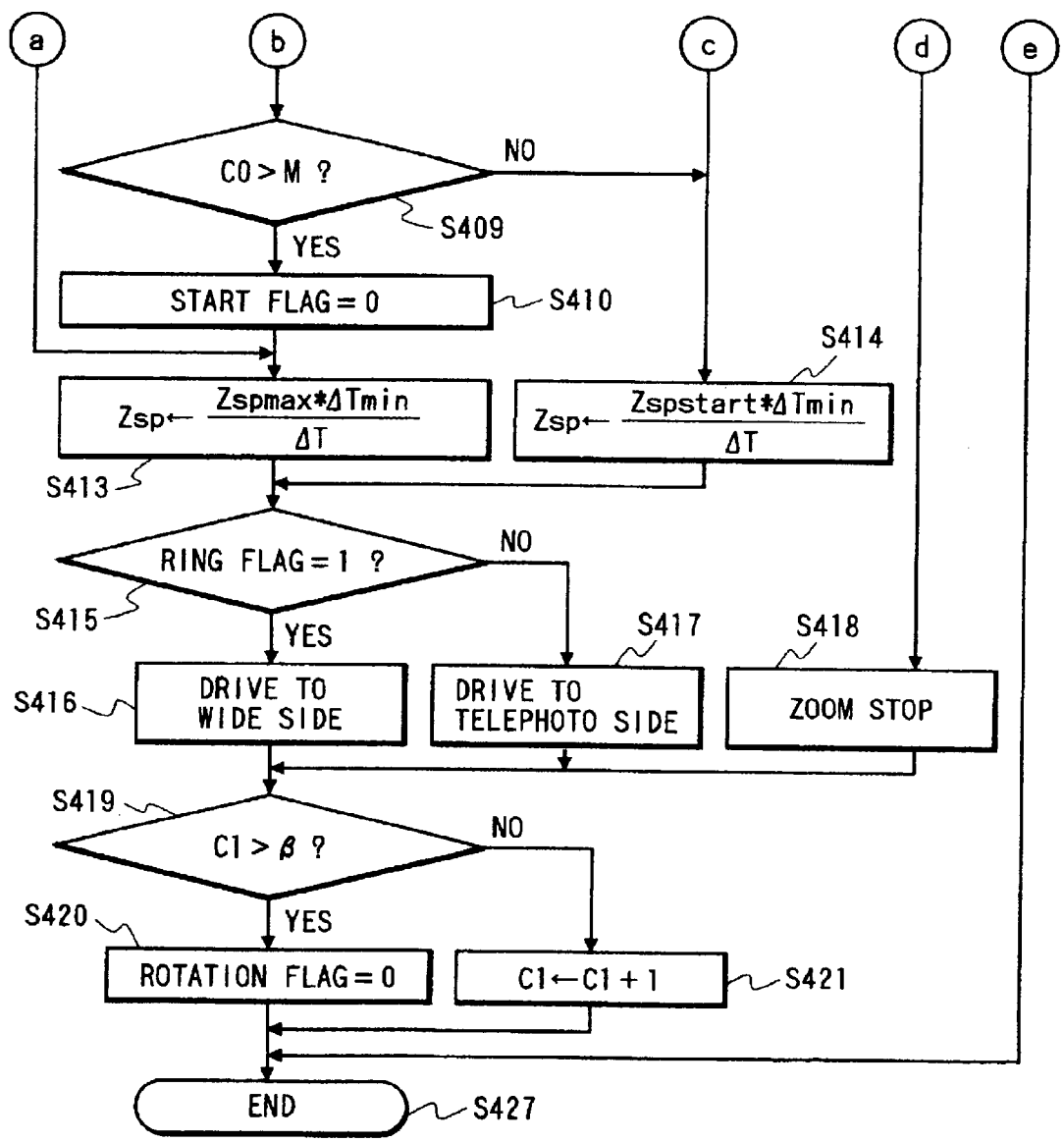

The "rotation flag" indicating rotation of the zoom ring 112 is used for the judgement of rotation of the zoom ring 112 during the processes shown in FIGS. 24A and 24B and is cleared after the processes of FIGS. 24A and 24B are executed several times. Namely, the "rotation flag" indicates whether there is any rotation of the zoom ring 112 during an integer multiple of a vertical sync period which corresponds to the process cycle of FIGS. 24A and 24B.

After the process of Step S103, it is checked at Step S106 whether the present interrupt is at the rising edge or falling edge of an output from the rotation detection encoder sensor 113a. If at the rising edge, the flow advances to Step S107 whereat it is judged whether the output signal from the encoder sensor 113b is "L" or not.

If "L", the combination of the two outputs corresponds to the case shown in FIG. 14A so that the ring flag is set indicating the normal rotation direction of the zoom ring 112 (Step S109) and terminates the interrupt routine (Step S111).

If the output of the encoder sensor 113b is "H" at Step S107, the combination of the two outputs corresponds to the case shown in FIG. 14B so that the ring flag is cleared indicating the reverse rotation direction of the zoom ring 112 (Step S110).

If at the process of Step S106 the interrupt is at the falling edge of an output of the encoder 113a, the output signal of the encoder 113b is checked at Step S108. If "L", the flow advances to Step S110, whereas if "H", the flow advances to Step S109, respectively to update the ring flag.

If after the completion of the routine of FIG. 10 the zoom ring 112 continues to rotate prior to advancing to the processes of FIGS. 24A and 24B, an interrupt again occurs to repeat the routine of FIG. 10. In this case, since the rotation flag has already been set at Step S102, the process begins with Step S104.

At Step S104, the interrupt number counter C0 is incremented and the present timer value is stored in the memory T2. At Step S105, a difference (T2−T1) between the previous timer value and the present timer value is calculated and divided by the interrupt number count C0 to thereby obtain a time required for the zoom ring 112 to rotate by a half period of one gear tooth 112a. This period is stored in the memory ΔT and thereafter the processes from Step S106 are executed.

If an interrupt again occurs while the rotation flag is set, the count C0 is incremented and the contents (T2−T1) in the memories correspond to a rotation time required for the zoom ring 112 to rotate by one period of the gear tooth 112a. Therefore, the contents of the memory ΔT are an average time required for the rotation of one half period.

With the zoom ring rotation detection routine shown in FIG. 10, it becomes possible to obtain information, including the ring rotation amount indicated by the counter C0, the ring rotation speed indicated by the memory ΔT, the ring rotation direction indicated by the ring flag, and a presence/absence of the ring operation indicated by the rotation flag.

While the processes shown in FIG. 10 are executed during the rotation of the zoom ring 112, the processes shown in FIGS. 24A and 24B are executed synchronously with the vertical sync signal.

First, the processes start at Step S401, and at Step S402 the lens unit 100 communicates with the main body microcomputer 216.

The main body microcomputer 216 sends information on key on/off of the zoom switch 214 and AF on/off and information on AF evaluation values. In order to give priority to the operation of the zoom ring 112 on the lens unit 100 side, it is checked at Step S403 whether the rotation flag is set. If the rotation flag is clear and the zoom ring operation is not performed, the operation state of the zoom switch 214 transmitted from the main body side is checked. In accordance with the operation state of the zoom switch, while the zoom lens is moved, the focus lens is subjected to the compensation operation by the cam locus tracing method described with conventional techniques (Steps S422, S423, S424, S425 and S426) to terminate this routine at Step S427.

If AF is on during the zooming operation, the zooming operation continues while performing an in-focus compensation by referring to the AF evaluation values.

If the rotation flag is clear at Step S403, i.e., if the rotation of the zoom ring 112 was judged to be effected before an integer multiple of a V sync period (an integer multiple of a V sync period is called hereinafter a zoom control period), it is checked at Step S404 whether the interrupt number counter C0 is clear. If the interrupt number counter C0 is judged to be clear, it is judged at Step S405 whether the present rotation of the zoom ring 112 is continuous low speed rotation or rotation start after rotation stop. If the interrupt number counter C0 is clear, it is judged that the present rotation is before the rotation of the gear tooth of the comb structure 112a by a half period and it is checked whether the contents of (memory T1−memory T2) are larger than a predetermined value α.

In the case of the low speed rotation where the zoom ring 112 continues to rotate during past several V sync periods, the previous timer value (before several zoom control periods) is stored in the memory T2 (Step S104 in FIG. 10) and the present timer value (within one zoom control period) is stored in the memory T1 (Step S103 in FIG. 10). Therefore, the contents of (memory T1−memory T2) are a relatively small value.

In the case where the present rotation started after the rotation stop, the time when the memory T2 was updated at the preceding cycle is before several tens of zoom control periods. Therefore, the contents of (memory T1−memory T2) are a large value. Accordingly, by checking the value of (memory T1−memory T2), it is possible to discriminate between the rotation after rotation stop and the continuous low speed rotation. A threshold value of this discrimination is the predetermined value α.

In practice, the contents of (memory T1−memory T2) during the low speed rotation are determined from the gear tooth pitch of the zoom lens 112 and the rotation speed given by a user. Therefore, the predetermined value α is determined based on these values.

If it is judged at Step S405 that the rotation is not continuous, the flow advances to Step S418 whereat the zooming operation is stopped. On the other hand, if it is judged that the rotation of the zoom ring is continuous, the flow advances to Step S406 whereat a difference (memory T1−memory T2) is stored in the memory ΔT.

If the interrupt number counter C0 is not "0" at Step S404, the processes starting from Step S407 are executed by using the contents (average rotation speed for the zoom ring to move by one half period of the gear tooth) stored in the memory ΔT and determined at Step S105 of FIG. 10.

Next, at Step S407 it is judged whether the zoom lens has already been driven. If the zoom lens has stopped, it is checked at Step S411 whether the interrupt number counter C0 is larger than a predetermined value N.

If the counter value C0 is the predetermined value N or smaller, it can be considered that the zoom ring 112 was touched inadvertently. In this case, the flow advances to Step S418 to stop driving the zoom ring. If the counter value C0 is larger than the predetermined value N, it is judged that the user intentionally rotates the zoom ring 112. In this case, the flow advances to Step S412 to set a start flag in order to start driving the zoom ring. Next, at Step S414 the zoom speed Zsp at the zoom operation start time is set.

In order to make the angle of view change slowly, the low speed zoom speed at the rotation start time is calculated in accordance with the rotation speed of the zoom ring 112. In this embodiment, Zsp is set to (Zspstart×ΔTmin)/ΔT. Zspstart is a zoom lens motion start speed at each focal length which is set so that the zoom magnification changes relatively slowly even if a user rotates the zoom ring 112 at a maximum speed.

ΔTmin is a time required for the zoom ring to move by a half period of the gear tooth (minimum time required for rotation of a half period of the gear tooth) and determined by the gear tooth pitch of the zoom ring 112 and a rotation load. Namely, if the user rotates the ring at a maximum speed (ΔTmin =ΔT), then Zsp=Zspstart.

If the zoom ring has already been driven at Step S407, the flow advances to Step S408 to judge whether the start flag is set. If set, i.e., if the zoom ring has just started being driven, then it is checked at Step S409 whether the interrupt number counter C0 is a predetermined value M or smaller. If it takes the predetermined value M or smaller, the flow advances to Step S414 whereat a low zoom speed at the zooming operation start time is determined.

If the interrupt number counter C0 is larger than the predetermined value M at Step S409, the flow advances to Step S410 to clear the start flag in order to perform the zooming operation at a normal driving speed. Thereafter, the zoom speed for the normal operation of the zoom ring is calculated at Step S413.

In this embodiment, Zsp is set to (Zspmax×ΔTmin)/ΔT where Zspmax is a zoom motion maximum speed in the range of in-tracking state of the focus motor performing compensation operation at each focal length, and ΔTmin a time required to move by a half period of one gear tooth (a minimum time required to move by a half period of one gear tooth), the time being determined from the gear tooth pitch of the zoom ring 112 and a rotation load during a maximum speed rotation given by a user.

Specifically, if the user rotates the zoom ring at a maximum speed (ΔTmin=ΔT), then Zsp=Zspmax and the zoom lens moves at the maximum speed at its focal length.

If it is judged at Step S408 that the start flag is clear, the flow directly advances to Step S413.

The processes from Step S417 to Steps S413 and S414 detect the rotation amount and speed of the zoom ring by monitoring the interrupt number counter C0 and the average rotation time ΔT required for one half period of the gear tooth, to thereby allow an optimum zooming operation relative to the ring operation.

It is therefore possible to prevent inadvertent operation when a user touches the zoom ring 112, to prevent a change in the angle of view at the zooming operation start time, and to improve the cooperation between the ring operation and magnification change.

The processes of Steps S415, S416 and S417 are executed for determining the motion direction of the zoom lens relative to the rotation direction of the zoom ring. First, at Step S415 it is checked whether the ring flag is set to judge whether the rotation direction of the zoom ring 112 is normal or reverse.

If the ring flag is set and the rotation state is normal, the flow advances to Step S416 whereat the zoom lens is driven toward the wide end. If it is judged at Step S415 that the rotation direction of the zoom ring 112 is reverse, the flow advances to Step S417 whereat the zoom lens is driven toward the telephoto end. In the above case, as described earlier, the focus lens is also driven in order to correct the shift of the focus plane to be caused by the motion of the zoom lens.

After the completions of Steps S416, S417 and S418, the flow advances to the routine starting from Step S419 to determine the zoom control period.

The process routine of Steps S419, S420 and S421 resets the rotation flag at a period of an integer multiple of a V sync period. It is checked at Step S419 whether the wait time counter C1 is larger than a predetermined value β. If larger, the rotation flag is set at Step S420, whereas if not, the wait time counter C1 is incremented at Step S421 to terminate the processes (Step S427).

If Step S421 is executed, the rotation flag maintains to be set also at the next process cycle. Therefore, the process at Step S419 is again executed and after a wait time of the predetermined value β, the rotation flag is cleared.

Specifically, since the rotation flag is reset at a β-fold of a V sync period (zoom control period), even if the zoom ring 112 stops rotating at the zooming operations at Steps S415, S416 and S417, the zooming operation continues.

Therefore, even if the encoder output does not change for a half period of the gear tooth of the zoom ring 112, the zooming operation does not change, and even if the period while the encoder output does not change during the low speed rotation of the zoom ring, smooth and natural zooming operation is possible.

Other effects of setting the zoom control period to an integer multiple of a V sync period are as follows. The predetermined value α is determined based on the relationship between the gear tooth pitch of the zoom ring 112 and a low rotation speed given by a user, and the low speed rotation and rotation stop are discriminated based upon this value α as described above. In order to reliably detect rotation even at low speed, it is necessary to make the gear tooth pitch fine and increase a detection resolution of a rotary angle.

However, there is a limit of the gear tooth pitch in terms of mechanical structure, and the predetermined value α capable of discriminating between low speed rotation and rotation stop may not be determined always. In contrast, if the value β is made large, the processes shown in FIG. 10 can be executed even during low speed rotation prior to clearing the rotation flag at Step S420 of FIG. 24B. As a result, even if C0 is not "0", the process at Step S405 of FIG. 24A can judge continuous rotation.

It is not necessary therefore to critically determine the predetermined value α and to provide the gear tooth pitch with high precision, thereby providing the zoom ring function with relatively low cost. In this manner, low speed rotation and rotation stop of the zoom ring 112 can be reliably discriminated.

However, if the predetermined value β is set too large, the rotation flag is not cleared during this β period. Therefore, although the zoom ring 112 stops rotating, it is judged that the zoom ring 112 is rotating and the zoom lens continues to move. This case also depends upon the gear tooth pitch of the zoom ring 112.

For example, if the predetermined value β is smaller than about 12 (about 0.2 seconds or shorter for NTSC), there is no inconsistent change feeling between the zoom ring operation and zoomed image. It is therefore desired to determine the predetermined value a so as to reliably discriminate between low speed rotation and rotation stop in the range of such a predetermined value β.

Although the zoom motion speed determined by the main body zoom switch is not definitely described above, the zoom motion speed may be set to a predetermined fixed speed or to a variable speed if the zoom switch is made of a volume or a multi-contact type volume whose output voltage changes with a user operation. Further, in the above embodiment, although the lens exchangeable system has been described, an image pickup apparatus with integrated lens unit and camera unit may also be used.

As described so far, execution of the process routine of FIGS. 24A and 24B can make it possible to reliably discriminate between low speed rotation and rotation stop of the zoom ring 112, so that smooth and natural zooming operation can be realized.

Further, since the zoom response characteristics relative to the operation of the zoom ring 112 are switched between the zoom ring operation start time and the zoom ring moving-on time, it is possible to prevent an abrupt change in the angle of view at the zoom start time and inconsistent feelings between the ring operation and zooming operation, so that fine zooming operation performance can be realized.

Next, the tenth embodiment of the invention will be described in which change means for changing the response characteristics of the zooming operation relative to the zoom ring operation, which is one of the features of the image pickup apparatus of this invention, is operated in accordance with photographing scenes.

Figure 25B:
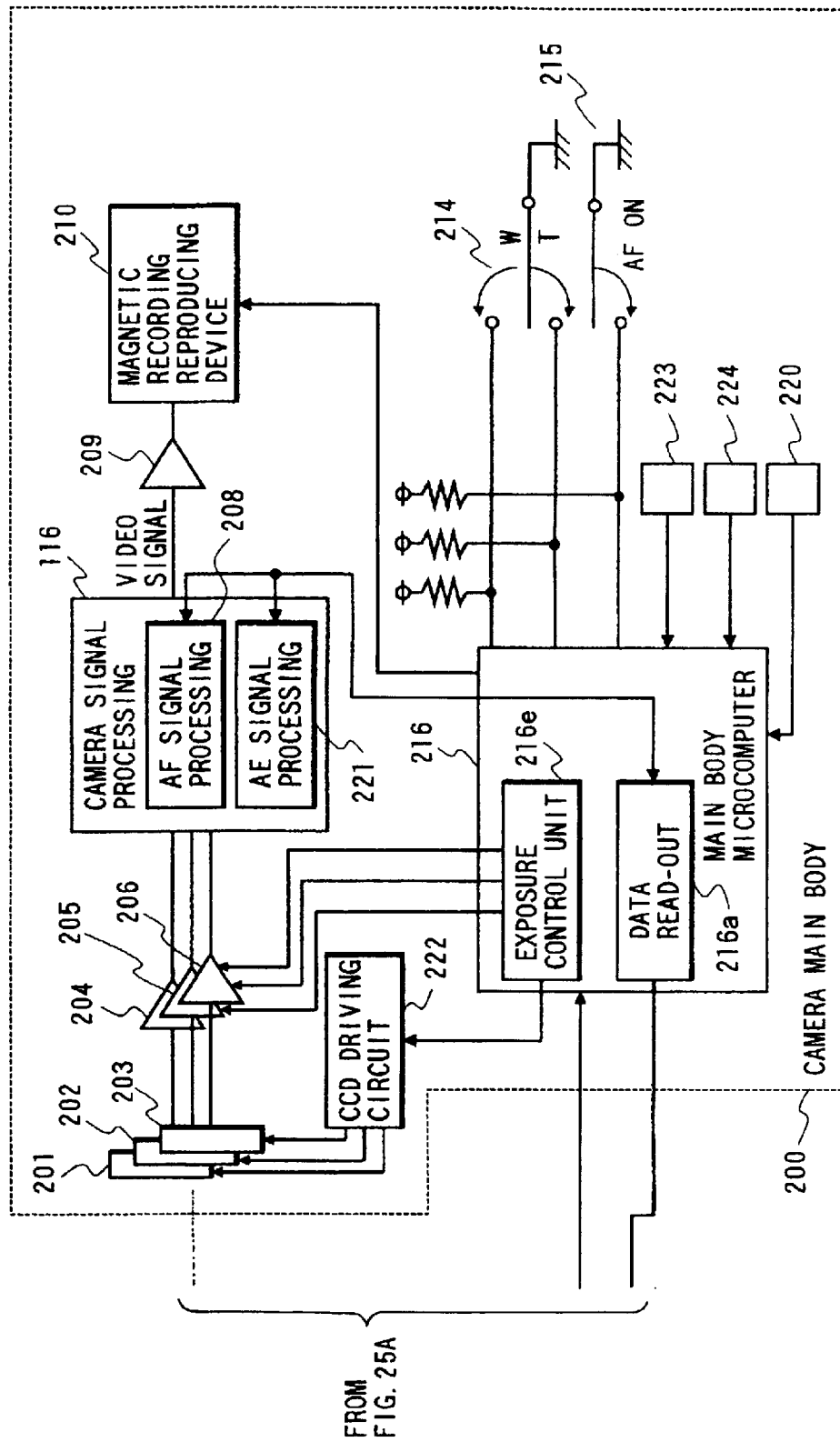
FIG. 25 comprised of FIGS. 25A and 25B, is a block diagram showing the structure of an image pickup apparatus according to a tenth embodiment of the invention.

FIGS. 25A and 25B are block diagrams showing the structure of an image pickup apparatus according to the tenth embodiment of the invention. Like elements to those shown in FIG. 22 are represented by identical reference numerals and the description thereof is omitted. The image pickup apparatus shown in FIGS. 25A and 25B has a recording unit for recording photographed images and a photographing mode setting function (so-called program mode function). In this embodiment, the apparatus has an exposure control function in the program mode. The apparatus will be described in detail with reference to FIGS. 25A and 25B.

Light from a subject passes through a lens group of the lens unit and is focussed on three image pickup elements 201, 202 and 203 such as CCD's. After photoelectric conversion, outputs of the image pickup units are amplified to optimum levels by amplifiers 204, 205 and 206 and input to a camera signal processing circuit 207 to be converted into standard television signals, and at the same time input to an AF signal processing circuit 208 and an AE signal processing circuit 221. The method of generating AF evaluation values and their applications by the AF signal processing circuit are the same as described with the above-described embodiments.

A photometry signal generated by the AE signal processing circuit is supplied to an exposure control unit 216e of a main body microcomputer 116 and used for exposure control. The exposure control unit 216e sends a command to the AE signal processing circuit 221, the command being a photometry area control command for performing photometry of only part of the image screen excepting the other part thereof.

The exposure control unit 216e controls a CCD driving circuit 222 so as to make the exposure state of a photometry signal be in a desired state and control the accumulation times of the image pickup elements 201, 202 and 203, controls the gains of the amplifiers 204, 205 and 206, and supplies an iris drive command to an iris control unit 116f of the lens microcomputer 116 to loop-control the amount of light passing through the iris 103.

For the control of the iris 103, in accordance with the iris control command sent from the camera main body, the iris control unit 116f supplies a signal via a motor control unit 116a to an iris driver 109 which drives an IG meter 108. The state of the driven iris 103 is detected with an encoder 115. An output signal of the encoder 115 is supplied via the iris control unit 116f to the exposure control unit 216e of the main body microcomputer 216.

The exposure control unit 216e also controls the program mode which places emphasis upon exposure control. In accordance with a mode selected by a user by operating upon a program mode selection switch unit 223, parameters for an iris mechanism, amplifiers such as AGC'S, an electronic shutter and the like are controlled to set an exposure state most suitable for a subject and a photographing condition.

If the program mode is a manual mode, an exposure state is set in accordance with the state of a manual exposure setting switch unit 224 operated upon by a user.

The standard television signal generated by the camera signal processing circuit 207 is amplified to an optimum level by an amplifier 209, and thereafter sent to a magnetic recording/reproducing device 210. A photographed image is recorded when the main body microcomputer 216 sends a record start command to the magnetic recording/reproducing device 210 in accordance with the state of a REC switch unit 220 operated upon by a user.

The main body microcomputer 210 supplies the lens microcomputer 116 with AF information and the like described with the above embodiments, as well as iris control information, selected program mode information, REC-ON information representative of recording or not recording, and the like.

Figure 26B:
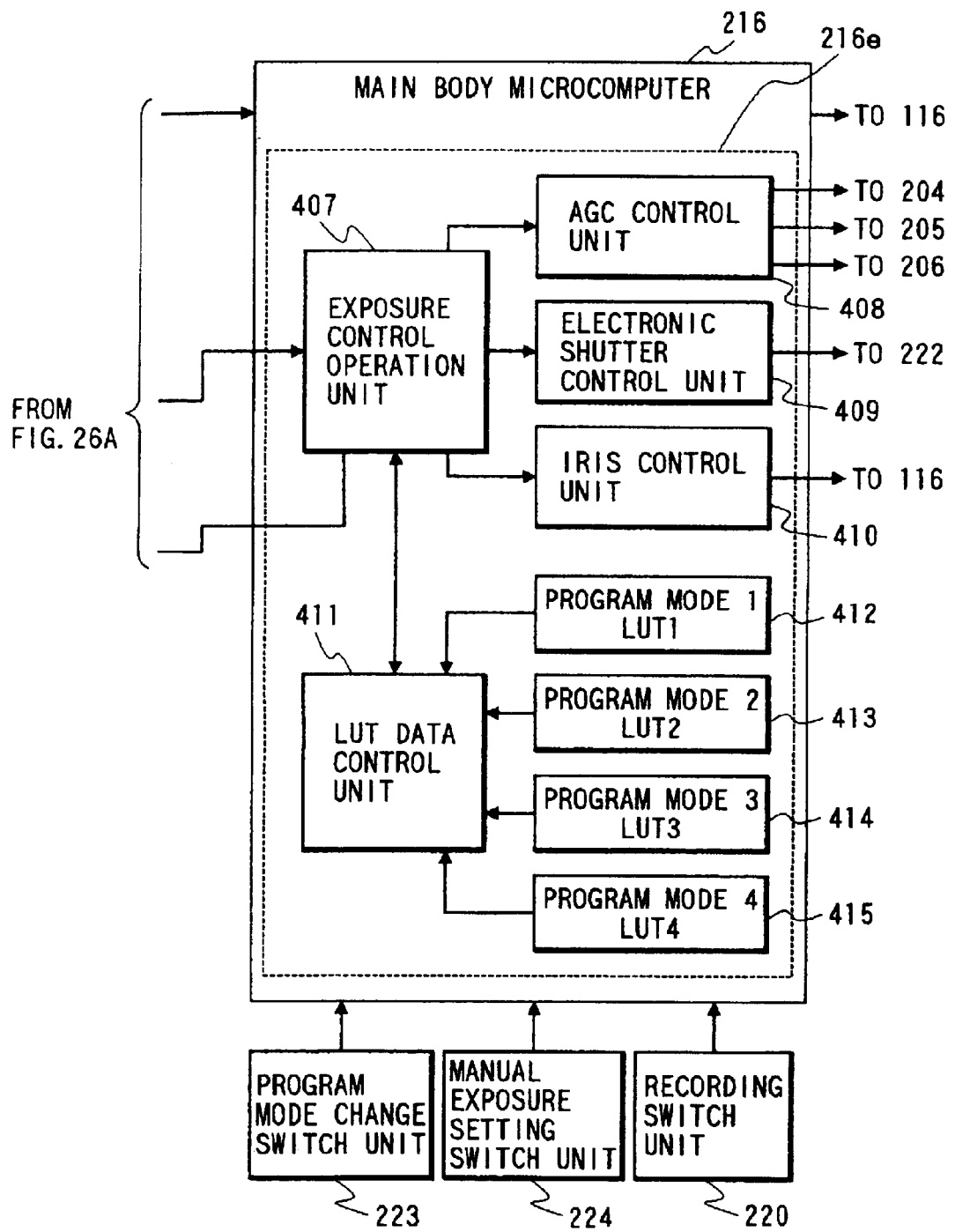
FIG. 26 comprised of FIGS. 26A and 26B, is a block diagram showing the structure of an AE signal processing circuit.

Next, the AE signal processing circuit 221 will be detailed with reference to FIGS. 26A and 26B. CCD outputs including red (R), green (G) and blue (B) amplified to optimum levels by the amplifiers 204, 205 and 206 are converted into digital signals by A/D converters 304, 305 and 306. These digital signals are supplied to circuit portions of the camera signal processing unit 207 and to amplifiers 304, 305 and 306 to be amplified properly. These signals are added by an adder 307 to generate a luminance signal S5.

The luminance signal S5 is supplied to the AF signal processing circuit 208 and AE signal processing circuit 221. The input luminance signal S5 is divided into an averaged light measuring signal S10 obtained by detecting the whole image area and a center weighted light measuring signal S11 obtained by detecting only the central area of an image, and weighted by weighting circuits 401 and 403. A photometry evaluation value S12 obtained through addition of the weighted signals by an adder 404 is supplied to an exposure control operation unit 407 of the exposure control unit 216e of the main body microcomputer 116.

An on/off timing of a gate circuit 402 used for the center weighted measuring and a ratio of weighting are controlled in accordance with information supplied from the exposure control operation unit 407. This exposure control operation will be described by taking an exposure control of the program mode as an example.

Control parameters for determining exposure include the iris mechanism, AGC, electronic shutter and the like. Data set for each parameter matching a subject and a photographing condition is stored in the exposure control unit 216e in the form of look-up table (LUT) for each of the program modes. Prepared are LUT 1 412 corresponding to a program mode 1, LUT 2 413 corresponding to a program mode 2, LUT 3 414 corresponding to a program mode 3 and LUT 4 415 corresponding to a program mode 4.

In the exposure control unit 216e, a LUT data control unit 411 reads data in LUT corresponding to the program mode set with the program mode selection switch unit 223. In accordance with the read data, each parameter is controlled to execute the program mode.

For example, if the motion of a subject is fast, the electronic shutter control unit 409 controls the CCD drive circuit 222 by giving priority of high speed to the electronic shutter which controls the accumulation times of the image pickup elements. In this manner, photographing with excellent motion resolution or so-called "sport mode" can be realized.

Alternatively, if the iris mechanism is given priority on the open side by sending an iris drive command from the iris control unit 410 to the lens microcomputer 116 and the exposure is controlled by other parameters, then a so-called "portrait mode" can be realized which is suitable for photographing portraits with a shallow depth of subject and with an unsharp background. In the above manners, photographing most suitable for each photographing scene can be performed. An AGC control unit 408 supplies AGC information to the amplifiers 204, 205 and 206.

In the AE signal processing circuit 208, a gate pulse control circuit 405 is supplied with a signal from a gate timing generator 406 and sets an area and position at which an image signal is detected for the exposure control and for the photometry control. In this manner, better photographing is possible.

For example, so-called averaged light measuring and center weighted measuring become possible, the former controlling exposure so as to make detection signal to be constant level and the latter detecting only the central area of an image so as to make detection signals to be constant level.

In the AE signal processing circuit 221, data obtained through detection of the whole image area and data obtained through detection of the center weighted area are weighted by the weighting circuits 401 and 403. The data are added together at a predetermined ratio, and in accordance with this added detection data, the exposure is controlled. In this manner, the exposure control by photometry in combination of the averaged light measuring and center weighted light measuring is possible. By changing each weighting ratio for each program mode in accordance with a subject and photographing scene, optimum exposure control by using respective advantages of light metering becomes possible.

For example, if a main subject is illuminated with spot light and the peripheral area is a dark subject or in rear light, the weighting ratio of center weighted light metering is made large to adjust a ratio relative to averaged light metering. In this manner, proper exposure control becomes possible in which not only the main subject but alto the background subject have good balance.

In accordance with photographing scene information such as program mode information and REC information transferred from the main body microcomputer 216 to the lens microcomputer 116, the lens microcomputer 116 changes the response characteristics relative to the zoom ring rotation.

As described with the ninth embodiment, the response characteristics are changed by changing a zoom motion speed or by changing the reference amount of the zoom ring operation amount for judging whether the zoom motion is permitted or inhibited, in accordance with a photographing scene. The response characteristics can be changed by changing the judgement routine at Step S407 of the ninth embodiment shown in FIGS. 24A and 24B to a photographing scene judgement routine.

How the zoom operation is performed in accordance with a photographing scene and at which response characteristics will be described. For example, an user often has different photographing intentions of operating the zoom ring 112 between the image recording state and recording stop state. In the image recording stop state, the zoom ring operation is mainly performed for position alignment of the angle of view in order to set the angle of view quickly and not to lose shutter chance.

Therefore, in the recording stop state, the response characteristics are controlled to be sensitive to the zoom ring operation amount, allowing a quick zooming operation. On the other hand, in the image recording state, the zoom ring operation is often performed in order to obtain user specific zooming effects of drawing rather than to obtain position alignment of the angle of view. It is therefore necessary to allow a zooming operation with variable rotation amount and speed preferred by a user rather than to increase the zoom speed.

In the image recording state, therefore, in order to improve integrity between the ring and zooming operations and performance of the zooming operation, the zoom control is performed so as to reflect the ring rotation amount and speed upon the zooming operation with high fidelity.

Further, if a manual mode is set in the program mode, this means that the user desires to set specific photographing conditions. In such a case, a fine zooming operation is not made by inadvertent touch of the zoom ring but is often performed intentionally by the user.

It is therefore desired that the ring rotation amount for inhibiting the zoom motion in order to prevent erroneous operation is set as small as possible. In contrast, in the automatic mode, it is more effective that the ring rotation amount for inhibiting the zoom motion is set relatively large in order to prevent erroneous operation at the zoom start time.

However, if the ring rotation amount exceeds the inhibition setting amount, this means that the user wants to use the zooming effects of drawing. In such a case, it is desired that after the zooming operation is once performed, a fine ring operation is to be responded like the manual mode.

If the background of a subject is to be made unsharp as in the case of a portrait, such an effect is lost on the wide end side with a short focal length. Therefore, for example, for the ring rotation direction of the zooming operation toward the telephoto end, the zoom operation may be made to start sensitive to the ring operation, whereas for the ring rotation direction of the zooming operation toward the wide end, the zoom operation may be made to start with some delay or hysteresis relative to the ring operation.

As above, a ring member is disposed concentrically about the lens optical axis and the zoom lens is inhibited to be stopped during a predetermined period even if the ring member is stopped rotating. Accordingly, even if it is difficult to detect the rotation of the ring member because of its low speed rotation, it is possible to prevent repetition of motion/stop of the zooming operation and to perform natural and smooth zooming operation allowing fine photographing.

Further, at the motion start time of the zoom lens and during the motion thereof, or in accordance with the operation state of the ring member, the response characteristics of the zoom lens motion are changed. Accordingly, it is possible to prevent an abrupt change in the angle of view at the zooming operation start and to set properly the operation performance of the zoom member and the zooming characteristics in accordance with user intentions. Therefore, optimum and fine operation performance and zooming effects can be obtained which match photographing scenes.

Still further, since the response characteristics are changed in accordance with the motion speed of the zoom lens, it is possible to perform slow start zooming operation relative to the operation of the ring member. It is possible to avoid such cases as the magnification lens does not move although a user wants to perform zooming operation because the user cannot know how much the operation of the zoom operation member makes the magnification lens move, or such cases as a shutter chance is lost because of an abrupt change in the angle of view although the user wants to move the magnification lens slowly.

Furthermore, the response characteristics are changed by changing the reference amount of the ring member rotation for permitted or inhibiting the motion start of the zoom lens. Accordingly, even if the lens unit of a camera such as a lens exchangeable type camera is held for photographing, it is possible to prevent erroneous operation such as moving the zoom lens even upon light touch of the ring member. It is therefore not necessary to mechanically adjust a play and or load of the ring member and is possible to realize a zooming function which properly responds to fine ring operation.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus having a camera body and a lens unit, comprising:
   a ring member for driving the lens unit;
   detection means for detecting a change amount of a rotation of said ring member;
   control means, arranged in the lens unit, for performing motion/stop control of at least the lens unit along an optical axis in accordance with a detection result by said detection means; and
   motion direction setting means, arranged in the camera body, for a user to set a desired motion direction of the lens unit relative to the rotation direction of said ring member,
   wherein said motion direction setting means arranged in said camera body comprises character display means, display means for displaying an image picked up by said image pickup apparatus, a menu function unit for controlling said character display means, and an operation switch that controls said menu function unit in accordance with an operation state thereof to display a predetermined menu on a display screen of said display means, operates on the predetermined menu displayed on said display means to select a desired setting item from among a plurality of items of the predetermined menu displayed on said display means by said menu function unit and sets a condition regarding the motion direction of the lens unit.

2. An image pickup apparatus according to claim 1, wherein the lens unit includes a magnification lens, and said motion direction setting means comprises:
   change means for changing the motion direction of the lens unit relative to the rotation direction of said ring member in accordance with the operation state of said operation switch, wherein said operation switch is capable of being operated by a user.

3. An image pickup apparatus according to claim 2, wherein the lens unit is made removable relative to the camera body of the image pickup apparatus.

4. An image pickup apparatus according to claim 3, wherein said ring member is disposed concentrically about an optical axis of the lens unit.

5. An image pickup apparatus according to claim 1, wherein the lens unit includes a magnification lens, and said motion direction setting means comprises:
   memory means for storing motion direction information of the lens unit relative to the rotation of said ring member, the motion direction being given by a user; and
   change means for changing the motion direction of the lens unit in accordance with the motion direction information stored in said memory means.

6. An image pickup apparatus according to claim 5, wherein the lens unit is made removable relative to the camera body of the image pickup apparatus.

7. An image pickup apparatus according to claim 6, wherein said ring member is disposed concentrically about an optical axis of the lens unit.

8. An image pickup apparatus according to claim 1, wherein the lens unit is made removable relative to the camera body of the image pickup apparatus.

9. An image pickup apparatus according to claim 8, wherein said ring member is disposed concentrically about an optical axis of the lens unit.

10. An image pickup apparatus according to claim 1, wherein said ring member is disposed concentrically about an optical axis of the lens unit.

11. An image pickup apparatus having a camera part and a lens part detachably mounted on the camera part, with a magnification lens and a ring member that drives the lens part, comprising:
    communication means for performing communication between said camera part and said lens part;
    detection means which detects a change amount of a rotation of the ring member for driving the lens part;
    camera control means, provided in the camera part, for selecting and determining a response characteristic between an output of said detection means and a motion of the magnification lens, and for transmitting the selected response characteristic to said lens part;
    lens control means, provided in said lens part, for receiving information concerning the selected response characteristic transmitted from said camera control means through said communication means, and for controlling the motion of said magnification lens in response to the operation of said ring member in accordance with the selected response characteristic; and
    storing means, provided in said camera part, for storing information of the response characteristic, said storing means being arranged so that said camera part holds the selected response characteristic throughout attaching/removing of said lens part and transmits the stored information of the response characteristic to said lens part attached to said camera part throughout attaching/removing thereof.

12. An image pickup apparatus according to claim 11, wherein the plurality of characteristics of said camera control means includes a first characteristic for controlling a motion amount of the magnification lens per unit rotation of at least the ring member to be constant and a second characteristic for controlling a motion speed of the magnification lens to be variable in accordance with a rotation speed of the ring member.

13. An image pickup apparatus according to claim 11, wherein the plurality of characteristics of said camera control means includes a first characteristic for controlling a motion amount of the magnification lens per unit rotation of at least the ring member to become a first predetermined amount and a second characteristic for controlling a motion amount of the magnification lens per unit rotation of the ring member to become a second predetermined amount different from the first predetermined amount.

14. An image pickup apparatus having a camera part on which a lens part is detachably mountable, the lens part having a ring member that drives the lens part, comprising:
    communication means for performing communication between said camera part and the lens part;
    detection means which detects a change amount of a rotation of the ring member for driving the lens part;

camera control means, provided in the camera part, for selecting and determining a response characteristic between an output of said detection means and a motion of the magnification lens, and for transmitting the selected response characteristic to the lens part through said communication means so as to set the selected response characteristic to control means which controls the motion of the magnification lens in response to the operation of the ring member; and storing means, provided in said camera part, for storing information of the response characteristic, said storing means being arranged so that said camera part holds the selected response characteristic throughout attaching/removing of said lens part and transmits the stored information of the response characteristic to said lens part attached to said camera part throughout attaching/removing thereof.

15. An image pickup apparatus according to claim 14, wherein the plurality of characteristics of said camera control means includes a first characteristic for controlling a motion amount of the magnification lens per unit rotation of at least the ring member to be constant and a second characteristic for controlling a motion speed of the magnification lens to be variable in accordance with a rotation speed of the ring member.

16. An image pickup apparatus according to claim 15, wherein the characteristic of said camera control means is changed in accordance with the state of an operation switch capable of being operated upon by a user.

17. An image pickup apparatus according to claim 15, wherein the characteristic of said camera control means is changed in accordance with information of the characteristic of said camera control means set by a user.

18. An image pickup apparatus according to claim 15, wherein the characteristic of said camera control means is changed in accordance with a photographing state.

19. An image pickup apparatus according to claim 14, wherein the plurality of characteristics of said camera control means includes a first characteristic for controlling a motion amount of the magnification lens per unit rotation of at least the ring member to become a first predetermined amount and a second characteristic for controlling a motion amount of the magnification lens per unit rotation of the ring member to become a second predetermined amount different from the first predetermined amount.

20. An image pickup apparatus according to claim 19, wherein the characteristic of said camera control means is changed in accordance with the state of an operation switch capable of being operated upon by a user.

21. An image pickup apparatus according to claim 19, wherein the characteristic of said camera control means is changed in accordance with information of the characteristic of said camera control means set by a user.

22. An image pickup apparatus according to claim 19, wherein the characteristic of said camera control means is changed in accordance with a photographing state.

23. An image pickup apparatus having an image pickup apparatus main body and a lens part, detachably mounted on said main body, which has a magnification lens and a ring member disposed concentrically about a lens optical axis, comprising:

communication means for performing communication between said main body and said lens part;

detection means for detecting a change amount of a rotation of the ring member for driving said lens part;

camera control means, provided in the main body, for selecting and determining a response characteristic between an output of said detection means and a motion of the magnification lens, and for transmitting the selected response characteristic to said lens part;

lens control means, provided in said lens part, for receiving information concerning the selected response characteristic transmitted from said camera control means through said communication means, and for controlling the motion of said magnification lens in response to the operation of said ring member in accordance with the selected response characteristic; and storing means, provided in said main body, for storing information of the response characteristic transmitted from said lens control means by said communication means, said storing means being arranged so that said main body holds the selected response characteristic throughout attaching/removing of said lens part and transmits the stored information of the response characteristic to said lens part attached to said main body throughout attaching/removing thereof.

24. An image pickup apparatus according to claim 23, wherein the plurality of characteristics of said camera control means includes a first characteristic for controlling a motion amount of the magnification lens per unit rotation of at least the ring member to be constant and a second characteristic for controlling a motion speed of the magnification lens to be variable in accordance with a rotation speed of the ring member.

25. An image pickup apparatus according to claim 23, wherein the plurality of characteristics of said camera control means includes a first characteristic for controlling a motion amount of the magnification lens per unit rotation of at least the ring member to become a first predetermined amount and a second characteristic for controlling a motion amount of the magnification lens per unit rotation of the ring member to become a second predetermined amount different from the first predetermined amount.

26. An image pickup apparatus according to claim 24, further comprising:

an operation switch capable of being operated upon by a user; and change means for changing the characteristic of said camera control means in accordance with a state of said operation switch.

27. An image pickup apparatus according to claim 26, wherein said change means changes the characteristic of said camera control means in accordance with information of the characteristic of said camera control means set by a user.

28. An image pickup apparatus according to claim 27, wherein said change means changes the characteristic of said camera control means in accordance with a photographing state.

29. An image pickup apparatus according to claim 25, further comprising:

an operation switch capable of being operated upon by a user; and change means for changing the characteristic of said camera control means in accordance with a state of said operation switch.

30. An image pickup apparatus according to claim 29, wherein said change means changes the characteristic of said camera control means in accordance with information of the characteristic of said control means set by a user.

31. An image pickup apparatus according to claim 30, wherein said change means changes the characteristic of said camera control means in accordance with a photographing state.

32. An image pickup apparatus according to claim 11, wherein the ring member is disposed concentrically about the lens part.

33. An image pickup apparatus according to claim 14, wherein the ring member is disposed concentrically about the lens part.

34. An image pickup apparatus comprising:
- a ring member disposed concentrically about a lens optical axis of a lens unit;
- detection means for detecting a change amount of rotation of said ring member;
- control means for performing motion/stop control of at least a magnification lens group along the optical axis in accordance with a detection result by said detection means; and
- inhibition means for inhibiting said control means from starting the stop control for a predetermined period when said detection means detects a stop of rotation of said ring member to continue the motion control of said magnification lens group based on the detection of the rotation of the ring member.

35. An image pickup apparatus according to claim 34, wherein the lens unit is removably and exchangeably mounted on a main body of the image pickup apparatus.

36. An image pickup apparatus comprising:
- a ring member disposed concentrically about a lens optical axis of a lens unit;
- detection means for detecting a change amount of rotation of said ring member;
- control means for controlling motion of a magnification lens group in accordance with an output of said detection means to perform motion start control of the magnification lens group along the optical axis; and
- change means for changing a sensitivity of motion start control of said control means relative to a detection result of said detection means so that said control means does not start the motion start control until an amount of rotation of said ring member, corresponding to the sensitivity, is detected by said detection means.

37. An image pickup apparatus according to claim 36, wherein said lens group is removably and exchangeably mounted on a main body of the image pickup apparatus.

38. An image pickup apparatus according to claim 36, wherein said change means changes the motion speed of the magnification lens group relative to an output of said detection means.

39. An image pickup apparatus having a magnification lens group, comprising:
- a ring member disposed concentrically about a lens optical axis;
- detection means for detecting a change amount of a rotation of said ring member;
- lens control means for determining motion direction and a speed of the magnification lens group in accordance with an output from said detection means, and for performing motion start/stop control of the magnification lens group along the optical axis; and
- control means for controlling said lens control means so as to automatically set a sensitivity of the motion start/stop control of the magnification lens group relative to a detection result of said detection means in accordance with a photographing state.

40. An image pickup apparatus according to claim 39, wherein said lens group is removably and exchangeably mounted on a main body of the image pickup apparatus.

41. An image pickup apparatus according to claim 39, wherein said control means changes the motion speed of the magnification lens group relative to an output of said detection means.

* * * * *

UNITED STATES PATENT AND TRADEMARK OFFICE
CERTIFICATE OF CORRECTION

PATENT NO. : 6,963,366 B2
APPLICATION NO. : 08/877728
DATED : November 8, 2005
INVENTOR(S) : Hiroto Okawara It is certified that error appears in the above-identified patent and that said Letters Patent is hereby corrected as shown below:

COLUMN 1
Line 59, "take" should read --take a--.

COLUMN 12
Line 55, "outer most" should read --outermost--.

COLUMN 18
Line 64, "microcomputer 216" should read --microcomputer 216,--.

COLUMN 19
Line 47, "degrees" should read --degrees,--.

COLUMN 21
Line 45, "of the like" should read --or the like--.

COLUMN 31
Line 4, "quick" should read --quickly--.

COLUMN 39
Line 37, "alto" should read --also--.
Line 56, "an user" should read --a user--.

COLUMN 41
Line 1, "permitted" should read --permitting--.

Signed and Sealed this

Ninth Day of October, 2007

JON W. DUDAS
*Director of the United States Patent and Trademark Office*